United States Patent
Kubo et al.

(10) Patent No.: US 7,292,300 B2
(45) Date of Patent: *Nov. 6, 2007

(54) LIQUID CRYSTAL DISPLAY WITH RADIALLY-INCLINED LIQUID CRYSTAL IN UNIT SOLID PORTIONS ARRANGED IN A SINGLE DIRECTION

(75) Inventors: Masumi Kubo, Ikoma (JP); Kiyoshi Ogishima, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/601,307

(22) Filed: Jun. 23, 2003

(65) Prior Publication Data

US 2004/0041770 A1    Mar. 4, 2004

Related U.S. Application Data

(63) Continuation-in-part of application No. 09/983,665, filed on Oct. 25, 2001, now Pat. No. 7,230,664.

(30) Foreign Application Priority Data

| Oct. 31, 2000 | (JP) | ............................. 2000-333802 |
| Sep. 19, 2001 | (JP) | ............................. 2001-284706 |
| Jun. 24, 2002 | (JP) | ............................. 2002-183427 |

(51) Int. Cl.
*G02F 1/1337* (2006.01)

(52) U.S. Cl. .................................................... 349/129

(58) Field of Classification Search ............... 385/96; 349/129, 138, 143, 113, 123, 96, 67
See application file for complete search history.

(56) References Cited

U.S. PATENT DOCUMENTS

| 5,179,456 A | 1/1993 | Aizawa et al. |
| 5,182,664 A | 1/1993 | Clerc |
| 5,309,264 A | 5/1994 | Lien et al. |
| 5,363,294 A | 11/1994 | Yamamoto et al. |
| 5,408,345 A | 4/1995 | Mitsui et al. |
| 5,434,687 A | 7/1995 | Kawata et al. |

(Continued)

FOREIGN PATENT DOCUMENTS

EP    0 884 626 A2    12/1998

(Continued)

*Primary Examiner*—David Nelms
*Assistant Examiner*—Phu Vu
(74) *Attorney, Agent, or Firm*—Nixon & Vanderhye P.C.

(57) ABSTRACT

A liquid crystal display device includes picture element regions defined each by a first electrode and a second electrode opposing the first electrode via the liquid crystal layer therebetween. The first electrode includes, in each picture element region, a plurality of unit solid portions arranged in a first direction, whereby the liquid crystal layer takes a vertical alignment in the absence of an applied voltage, and forms a liquid crystal domain taking a radially-inclined orientation in each unit solid portion by an inclined electric field produced around the unit solid portion in response to an applied voltage. The picture element regions are arranged in a matrix pattern including a rows extending in the second direction different from the first direction and columns extending in the first direction, and picture elements adjacent to each other in the second direction are driven with voltages of opposite polarities in each frame.

18 Claims, 34 Drawing Sheets

U.S. PATENT DOCUMENTS

| | | | |
|---|---|---|---|
| 5,473,450 A * | 12/1995 | Yamada et al. | 349/84 |
| 5,477,358 A | 12/1995 | Rosenblatt et al. | |
| 5,512,336 A | 4/1996 | Yamahara | |
| 5,558,927 A | 9/1996 | Aruga et al. | |
| 5,594,570 A | 1/1997 | Hirata et al. | |
| 5,602,662 A | 2/1997 | Rosenblatt et al. | |
| 5,636,043 A | 6/1997 | Uemura et al. | |
| 5,666,179 A | 9/1997 | Koma | |
| 5,668,651 A * | 9/1997 | Yamada et al. | 349/156 |
| 5,673,092 A * | 9/1997 | Horie et al. | 349/86 |
| 5,726,728 A | 3/1998 | Kondo et al. | |
| 5,995,176 A | 11/1999 | Sibahara | |
| 6,061,117 A | 5/2000 | Horie et al. | |
| 6,097,464 A | 8/2000 | Liu | |
| 6,115,098 A * | 9/2000 | Kume et al. | 349/156 |
| 6,141,077 A | 10/2000 | Hirata et al. | |
| 6,169,593 B1 | 1/2001 | Kanaya et al. | |
| 6,175,398 B1 | 1/2001 | Yamada et al. | |
| 6,195,140 B1 | 2/2001 | Kubo et al. | |
| 6,201,592 B1 | 3/2001 | Terashita et al. | |
| 6,222,599 B1 | 4/2001 | Yoshida et al. | |
| 6,256,082 B1 | 7/2001 | Suzuki et al. | |
| 6,266,122 B1 | 7/2001 | Kishimoto et al. | |
| 6,287,649 B1 | 9/2001 | Fukushima et al. | |
| 6,330,047 B1 | 12/2001 | Kubo et al. | |
| 6,335,780 B1 | 1/2002 | Kurihara et al. | |
| 6,339,462 B1 * | 1/2002 | Kishimoto et al. | 349/156 |
| 6,342,876 B1 * | 1/2002 | Kim | 345/87 |
| 6,342,938 B1 * | 1/2002 | Song et al. | 349/143 |
| 6,384,887 B1 | 5/2002 | Yasuda et al. | |
| 6,384,889 B1 | 5/2002 | Miyachi et al. | |
| 6,512,564 B1 | 1/2003 | Yoshida et al. | |
| 6,542,212 B2 | 4/2003 | Yoshida et al. | |
| 6,577,366 B1 * | 6/2003 | Kim et al. | 349/139 |
| 6,630,975 B1 | 10/2003 | Terashita | |
| 6,661,488 B1 * | 12/2003 | Takeda et al. | 349/117 |
| 6,710,825 B2 * | 3/2004 | Kubo et al. | 349/48 |
| 6,774,967 B2 | 8/2004 | Kim et al. | |
| 6,812,986 B2 | 11/2004 | Suzuki et al. | |
| 2001/0024257 A1 | 9/2001 | Kubo et al. | |
| 2002/0036740 A1 * | 3/2002 | Kubo et al. | 349/129 |
| 2002/0036744 A1 | 3/2002 | Kubo et al. | |
| 2002/0075436 A1 * | 6/2002 | Kubo et al. | 349/129 |
| 2002/0085152 A1 * | 7/2002 | Chuang et al. | 349/123 |
| 2002/0149728 A1 | 10/2002 | Kubo et al. | |
| 2003/0107695 A1 | 6/2003 | Kubo et al. | |

FOREIGN PATENT DOCUMENTS

| | | |
|---|---|---|
| JP | 03-209440 | 9/1991 |
| JP | 04-139402 | 5/1992 |
| JP | 04-318816 | 11/1992 |
| JP | 06-043461 | 2/1994 |
| JP | 06-075238 | 3/1994 |
| JP | 6-301036 A | 10/1994 |
| JP | 07-281176 | 10/1995 |
| JP | 07-311383 | 11/1995 |
| JP | 08-292423 | 11/1996 |
| JP | 09-258266 | 10/1997 |
| JP | 10-186330 | 7/1998 |
| JP | 10-301114 | 11/1998 |
| JP | 11-242225 | 9/1999 |
| JP | 2000-47253 | 1/2000 |
| JP | 2000-47217 | 2/2000 |
| JP | 2000-305110 | 11/2000 |

* cited by examiner

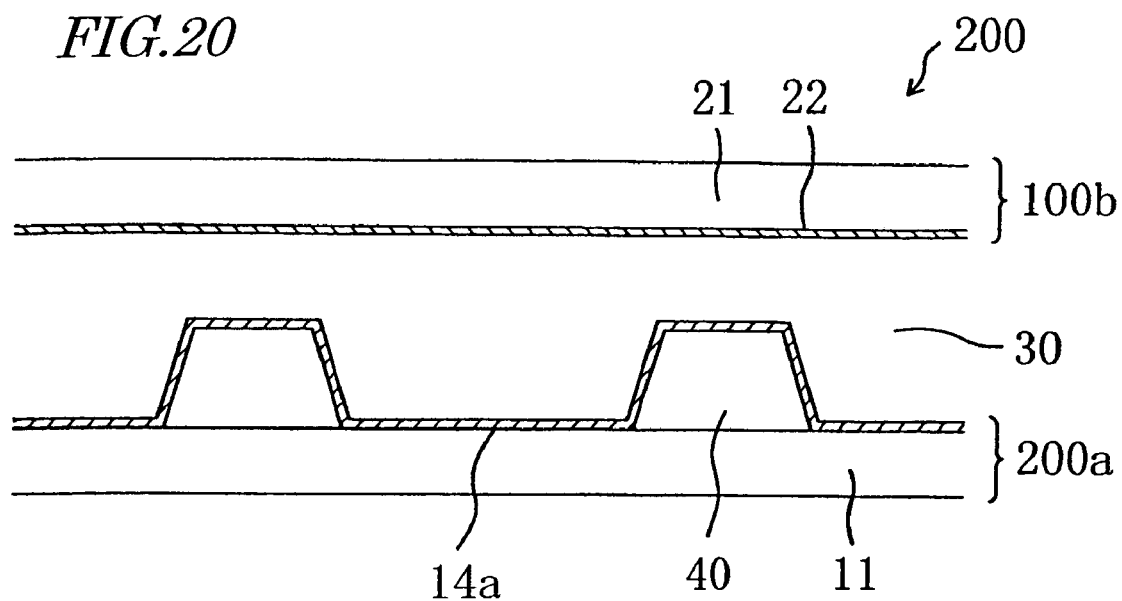

LIQUID CRYSTAL DISPLAY WITH RADIALLY-INCLINED LIQUID CRYSTAL IN UNIT SOLID PORTIONS ARRANGED IN A SINGLE DIRECTION

This is a continuation-in-part application of a U.S. patent application Ser. No. 09/983,665 filed on Oct. 25, 2001 now U.S. Pat. No. 7,230,664. The contents of U.S. patent application Ser. No. 09/983,665 are incorporated herein by reference.

FIELD OF THE INVENTION

The present invention relates to a liquid crystal display device, and more particularly to a liquid crystal display device having a wide viewing angle characteristic and being capable of producing a high quality display.

BACKGROUND OF THE INVENTION

In recent years, liquid crystal display devices, which are thin and light in weight, are used as personal computer displays and PDA (personal digital assistance) displays. However, conventional twisted nematic (TN) type and super twisted nematic (STN) type liquid crystal display devices have a narrow viewing angle. Various technical developments have been undertaken to solve the problem.

A typical technique for improving the viewing angle characteristic of a TN or STN type liquid crystal display device is to add an optical compensation plate thereto. Another approach is to employ a transverse electric field mode in which a horizontal electric field with respect to the substrate plane is applied across the liquid crystal layer. Transverse electric field mode liquid crystal display devices have been attracting public attention and are mass-produced in recent years. Still another technique is to employ a DAP (deformation of vertical aligned phase) mode in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly lower production margin than that of a normal TN type device, whereby it is difficult to realize stable production of the device. This is because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to be able to precisely control these factors and thus to realize stable production of the device.

In order to realize a uniform display without display non-uniformity with a DAP mode liquid crystal display device, it is necessary to control orientation. For controlling the orientation, an alignment treatment is carried out by rubbing the surface of an alignment film. However, when a vertical alignment film is subjected to a rubbing treatment, rubbing streaks are likely to appear in the displayed image, and it is not suitable for mass-production.

In view of this, some of the present inventors, along with others, have proposed in the art yet another approach for controlling the orientation without a rubbing treatment, in which one of a pair of electrodes opposing each other via a liquid crystal layer therebetween is provided as a two-layer electrode including a lower electrode, an upper electrode including openings therein, and a dielectric layer therebetween, so that the orientation direction is controlled by an inclined electric field produced at the edge portion of the opening in the upper electrode (see, for example, Japanese Laid-Open Patent Publication No. 2002-55343). With this approach, a stable orientation with a sufficient degree of continuity in the orientation of the liquid crystal molecules can be obtained across the entirety of each picture element, thereby improving the viewing angle and realizing a high-quality display.

More recently, however, there is a demand for a further increase in the aperture ratio to produce a brighter display, in addition to the demand for an increase in the viewing angle and the display quality. No particular approach has been established in the art for further improving the aperture ratio in a case where an orientation control is done by using an inclined electric field.

SUMMARY OF THE INVENTION

The present invention was devised to overcome the aforementioned disadvantages, and an object of the invention is to provide a liquid crystal display device having a wide viewing angle characteristic, a high display quality, and a high aperture ratio, and being capable of producing a bright display.

An inventive liquid crystal display device includes: a first substrate; a second substrate; and a liquid crystal layer provided between the first substrate and the second substrate, wherein: a plurality of picture element regions are defined by a first electrode provided on one side of the first substrate that is closer to the liquid crystal layer and a second electrode provided on the second substrate so as to oppose the first electrode via the liquid crystal layer therebetween; the first electrode includes, in each of the plurality of picture element regions, a plurality of unit solid portions arranged in a first direction, whereby the liquid crystal layer takes a vertical alignment in the absence of an applied voltage between the first electrode and the second electrode, and forms a plurality of liquid crystal domains in the plurality of unit solid portions of the first electrode by inclined electric fields produced around the plurality of unit solid portions in response to a voltage applied between the first electrode and the second electrode, each of the plurality of liquid crystal domains taking a radially-inclined orientation; the plurality of picture element regions are arranged in a matrix pattern including a plurality of rows extending in the second direction different from the first direction and a plurality of columns extending in the first direction; and a polarity of a voltage applied across the liquid crystal layer in a first picture element region among the plurality of picture element regions is different from a polarity of a voltage applied across the liquid crystal layer in a second picture element region among the plurality of picture element regions that belongs to the same row as that of the first picture element region and belongs to a column adjacent to a column to which the first picture element region belongs in each frame.

In a preferred embodiment, the plurality of picture element regions each have a shape whose longitudinal direction is defined in the first direction and whose width direction is defined in the second direction.

In a preferred embodiment, a polarity of a voltage applied across the liquid crystal layer in a plurality of picture element regions belonging to one column among the plurality of picture element regions is reversed for every n rows (where n is an integer of 1 or more) in each frame.

In a preferred embodiment, a polarity of a voltage applied across the liquid crystal layer in the first picture element region is different from a polarity of a voltage applied across the liquid crystal layer in a third picture element region that belongs to the same column as that of the first picture element region and belongs to a row adjacent to a row to which the first picture element region belongs in each frame.

In a preferred embodiment, a shape of each of the plurality of unit solid portions has rotational symmetry. For example, each of the plurality of unit solid portions may have a generally circular shape, or each of the plurality of unit solid portions may have a generally rectangular shape with generally arc-shaped corner portions. Alternatively, each of the plurality of unit solid portions may have a shape with acute angle corners.

In a preferred embodiment, the second substrate includes, in a region corresponding to at least one of the plurality of liquid crystal domains, an orientation-regulating structure that exerts an orientation-regulating force for orienting liquid crystal molecules in the at least one liquid crystal domain into a radially-inclined orientation at least in the presence of an applied voltage.

In a preferred embodiment, the orientation-regulating structure is provided in each of regions corresponding to the plurality of liquid crystal domains.

In a preferred embodiment, the orientation-regulating structure is provided in a region in the vicinity of a center of the at least one liquid crystal domain.

In a preferred embodiment, in the at least one liquid crystal domain, the direction of orientation regulation by the orientation-regulating structure is aligned with the direction of the radially-inclined orientation formed by the inclined electric field produced around each of the unit solid portions of the first electrode.

In a preferred embodiment, the orientation-regulating structure exerts an orientation-regulating force for orienting the liquid crystal molecules into a radially-inclined orientation even in the absence of an applied voltage. For example, the orientation-regulating structure may be a first protrusion protruding from the second substrate into the liquid crystal layer, and a thickness of the liquid crystal layer may be defined by the first protrusion protruding from the second substrate into the liquid crystal layer. In a preferred embodiment, the first protrusion has a side surface that is inclined by an angle less than 90° with respect to the substrate plane of the second substrate. Alternatively, the orientation-regulating structure may include a horizontal orientation surface provided on one side of the second substrate that is closer to the liquid crystal layer.

In a preferred embodiment, the orientation-regulating structure exerts an orientation-regulating force for orienting the liquid crystal molecules into a radially-inclined orientation only in the presence of an applied voltage. For example, the orientation-regulating structure may include an opening provided in the second electrode.

In a preferred embodiment, the first substrate includes a plurality of open regions that do not overlap with the first electrode; and when a voltage is applied between the first electrode and the second electrode, the liquid crystal layer forms a plurality of additional liquid crystal domains in the plurality of open regions by the inclined electric fields, each of the additional liquid crystal domains taking a radially-inclined orientation.

In a preferred embodiment, at least some of the plurality of open regions have substantially the same shape and substantially the same size, and form a plurality of unit lattices that are arranged so as to have rotational symmetry.

In a preferred embodiment, a shape of each of the at least some of the plurality of open regions has rotational symmetry.

In a preferred embodiment, each of the at least some of the plurality of open regions has a generally circular shape.

In a preferred embodiment, the liquid crystal display device further includes a second protrusion within each of the plurality of open regions of the first substrate, wherein a side surface of the protrusion exerts, for liquid crystal molecules of the liquid crystal layer, an orientation-regulating force of the same direction as a direction of orientation regulation by the inclined electric field.

In a preferred embodiment, the first substrate further includes a plurality of switching elements provided respectively for the plurality of picture element regions; and the first electrode includes a plurality of picture element electrodes provided respectively for the plurality of picture element regions and switched respectively by the switching elements, and the second electrode is at least one counter electrode opposing the plurality of picture element electrodes. Typically, the counter electrode is formed as a single electrode extending across the entire display area.

Functions of the present invention will now be described.

In the liquid crystal display device of the present invention, one of a pair of electrodes for applying a voltage across the liquid crystal layer of a picture element region includes a plurality of unit solid portions that are arranged in a predetermined direction (hereinafter referred to as "first direction"). The liquid crystal layer takes a vertical alignment in the absence of an applied voltage, and forms a plurality of liquid crystal domains by inclined electric fields produced around the plurality of unit solid portions of the electrode in the presence of an applied voltage, each of the plurality of liquid crystal domains taking a radially-inclined orientation. Thus, the outer shape of one of the pair of electrodes is defined so that inclined electric fields are produced around the plurality of unit solid portions to form a plurality of liquid crystal domains each taking a radially-inclined orientation in response to a voltage applied between the pair of electrodes. Typically, the liquid crystal layer is made of a liquid crystal material having a negative dielectric anisotropy, and the orientation of the liquid crystal layer is controlled by vertical alignment films provided on the opposing sides thereof.

The liquid crystal domains are formed by the inclined electric fields in regions corresponding to the unit solid portions, and the orientation of each liquid crystal domain changes according to the applied voltage, thereby producing a display. Since each liquid crystal domain takes a radially-inclined orientation, an axially symmetrical orientation, there is little viewing angle dependence of the display quality, and thus a wide viewing angle characteristic is realized.

Herein, a portion of an electrode where a conductive film exists is referred to as a "solid portion", and a portion of the solid portion that produces an electric field for forming a single liquid crystal domain is referred to as a "unit solid portion". Each solid portion is typically made of a continuous conductive film.

In the liquid crystal display device of the present invention, each picture element electrode includes a plurality of unit solid portions as sub-picture element electrodes, whereby it is possible to realize a stable radially-inclined orientation in a picture element region, without being restricted by the shape and size, etc., of the picture element region, by appropriately arranging the plurality of unit solid portions in the picture element region according to the shape and size, etc., of the picture element region.

Moreover, a plurality of unit solid portions are arranged (in a line) in a predetermined direction in each picture element region, whereby it is possible to increase the area ratio of the unit solid portion in the picture element region, thereby improving the aperture ratio, as compared with a case where the unit solid portions are arranged in two or more lines.

The plurality of picture element regions are arranged in a matrix pattern including a plurality of rows extending in the second direction different from the first direction and a plurality of columns extending in the first direction. In the liquid crystal display device of the present invention, the polarity of the voltage applied across the liquid crystal layer in a first picture element among the plurality of picture element regions is different from the polarity of the voltage applied across the liquid crystal layer in a second picture element among the plurality of picture element regions that belongs to the same row as that of the first picture element and belongs to a column adjacent to the column to which the first picture element belongs in each frame. Thus, picture elements that are adjacent to each other in the row direction (second direction) are driven with voltages of opposite polarities during a period in which data is written to all the picture elements (i.e., one frame).

Therefore, it is possible to produce an inclined electric field having a sharp potential gradient between picture elements that are adjacent to each other in the row direction, as compared with a case where picture elements that are adjacent to each other in the row directions are not driven with voltages of opposite polarities. Thus, it is possible to form a sufficiently stable radially-inclined orientation even when employing an arrangement in which the inter-electrode distance between picture elements adjacent to each other in the row direction is short, and the aperture ratio is high.

Typically, the picture element region has a shape whose longitudinal direction is defined in the first direction (the direction in which the unit solid portions are arranged) and whose width direction is defined in the second direction. When the picture element region has such a shape, it is possible to effectively improve the aperture ratio. For example, the picture element region has a generally rectangular shape whose long side extends in the first direction and whose short side extends in the second direction.

It is possible to suppress flicker by reversing the polarity of the applied voltage for every n rows (where n is an integer of 1 or more) of picture elements, i.e., for every n picture elements in the column direction (in other words, by reversing the polarity of the voltage applied across the liquid crystal layer in picture element regions of the same column for every n rows), while driving picture elements that are adjacent to each other in the row direction with voltages of opposite polarities in each frame.

Particularly, when picture elements that are adjacent to each other in the column direction are driven with voltages of opposite polarities, i.e., when the polarity of the voltage applied across the liquid crystal layer in a first picture element region among the plurality of picture element regions is different from the polarity of the voltage applied across the liquid crystal layer in a third picture element region that belongs to the same column as that of the first picture element region and belongs to a row adjacent to the row to which the first picture element region belongs in each frame, it is possible to produce an inclined electric field having a sharp potential gradient also between picture elements that are adjacent to each other in the column direction, whereby it is possible to reduce the inter-electrode distance between picture elements adjacent to each other in the column direction and thus to further improve the aperture ratio.

It is preferred that the shape of each of the plurality of unit solid portions has rotational symmetry. When the shape of the unit solid portion has rotational symmetry, the radially-inclined orientation of the liquid crystal domain to be formed will also be an orientation having rotational symmetry, i.e., an axially symmetrical orientation, thereby improving the viewing angle characteristic.

When each of the plurality of unit solid portions has a generally circular shape or a generally elliptical shape, the continuity of the orientation of liquid crystal molecules in a radially-inclined orientation is increased, thereby improving the orientation stability.

In contrast, when each of the plurality of unit solid portions has a generally rectangular shape, the area ratio (effective aperture ratio) of the unit solid portion in the picture element region is increased, thereby improving the optical characteristics (e.g., the transmittance) that are exhibited in response to a voltage applied across the liquid crystal layer.

Moreover, when each of the plurality of unit solid portions has a generally rectangular shape with generally arc-shaped corner portions, it is possible to improve both the orientation stability and the optical characteristics.

Furthermore, when each of the plurality of unit solid portions has a shape with acute angle corners, the total length of the sides of an electrode along which an inclined electric field is produced is increased, whereby the inclined electric field can be acted upon more liquid crystal molecules. Thus, the response speed is improved.

It is preferred that the other substrate (i.e., the substrate opposing the substrate including the electrode having unit solid portions) includes, in a region corresponding to at least one of the plurality of liquid crystal domains, an orientation-regulating structure that exerts an orientation-regulating force for orienting liquid crystal molecules in the at least one liquid crystal domain into a radially-inclined orientation at least in the presence of an applied voltage. Then, at least in the presence of an applied voltage, the orientation-regulating force from the electrode having unit solid portions and that from the orientation-regulating structure act upon the liquid crystal molecules in the liquid crystal domain, thereby stabilizing the radially-inclined orientation of the liquid crystal domain and suppressing the deterioration in the display quality due to the application of a stress on the liquid crystal layer (e.g., occurrence of an after image phenomenon).

When the orientation-regulating structure is provided in each of regions corresponding to the plurality of liquid crystal domains, it is possible to stabilize the radially-inclined orientation of all the liquid crystal domains.

When the orientation-regulating structure is provided in a region in the vicinity of the center of the liquid crystal domain that is formed by the orientation-regulating structure and takes a radially-inclined orientation, it is possible to fix the position of the central axis of the radially-inclined orientation, thereby effectively improving the resistance of the radially-inclined orientation to the stress.

When the direction of orientation regulation by the orientation-regulating structure is aligned with the direction of the radially-inclined orientation formed by the inclined electric field produced around each of the unit solid portions, the continuity and the stability of the orientation increase, thereby improving the display quality and the response characteristic.

While the effect of stabilizing the orientation can be obtained as long as the orientation-regulating force is exerted at least in the presence of an applied voltage, there is obtained a further advantage that the orientation can be stabilized irrespective of the level of the applied voltage if an arrangement such that the orientation-regulating force is exerted even in the absence of an applied voltage is employed. Note however that since the liquid crystal display device of the present invention employs a vertical alignment type liquid crystal layer in which the liquid crystal molecules are aligned substantially vertical to the substrate plane in the absence of an applied voltage, the display quality may deteriorate when employing an orientation-regulating structure that exerts an orientation-regulating force even in the absence of an applied voltage. Nevertheless, since even a relatively weak orientation-regulating force of an orientation-regulating structure gives an intended effect, as will be described later, even a small structure with respect to the size of a picture element can still stabilize the orientation sufficiently. With such a small structure, the deterioration in the display quality in the absence of an applied voltage may be practically insignificant. An orientation-regulating structure that exerts a relatively strong orientation-regulating force is provided in some cases depending on the application of the liquid crystal display device (e.g., the level of the stress to be applied externally) or the structure of the electrode (the strength of the orientation-regulating force from the electrode having unit solid portions). In such cases, a light blocking layer may be provided in order to suppress the deterioration in the display quality due to the orientation-regulating structure. Any of various structures may be employed for the orientation-regulating structure because the orientation-regulating structure is only required to exert an orientation-regulating force that is weaker than that from the electrode having unit solid portions.

The orientation-regulating structure provided on the other substrate may be, for example, a protrusion protruding from the second substrate into the liquid crystal layer, or may include a horizontal orientation surface provided on one side of the substrate that is closer to the liquid crystal layer. Alternatively, the orientation-regulating structure may be an opening provided in the electrode. These structures can be produced by a method known in the art.

Typically, the substrate including the electrode having unit solid portions includes a plurality of open regions that do not overlap with the electrode (i.e., the conductive film to be the electrode is not formed in the open regions). The liquid crystal display device of the present invention may employ an arrangement such that a liquid crystal domain that takes a radially-inclined orientation is formed also in the open region.

The liquid crystal domain formed in the open region and the liquid crystal domain formed in the unit solid portion are both formed by an inclined electric field produced at the edge portion of the open region (i.e., along the periphery of the unit solid portion), whereby these liquid crystal domains are alternately formed adjacent to each other, and the orientation of the liquid crystal molecules is essentially continuous between the adjacent liquid crystal domains. Therefore, no disclination line is formed along the boundary between the liquid crystal domain formed in the open region and the liquid crystal domain formed in the unit solid portion, and the display quality is not deteriorated by a disclination line, and the stability of the orientation of the liquid crystal molecules is high.

When the liquid crystal molecules take a radially-inclined orientation not only in a region corresponding to the unit solid portion of the electrode but also in a region corresponding to the open region, a stable orientation is realized with a high degree of continuity of the orientation of the liquid crystal molecules, thereby obtaining a uniform display without display non-uniformity. Particularly, in order to realize a desirable response characteristic (i.e., a high response speed), it is necessary that the inclined electric field for controlling the orientation of the liquid crystal molecules is acted upon many liquid crystal molecules, which requires that the total area of the open region (the total length of the edge portion thereof) be large. When a liquid crystal domain having a stable radially-inclined orientation is formed corresponding to the open region, it is possible to suppress the deterioration of the display quality (occurrence of display nonuniformity) even if the total area of the open region is increased in order to improve the response characteristic.

When at least some of the plurality of openings have substantially the same shape and substantially the same size, and form at least one unit lattice arranged so as to have rotational symmetry, a plurality of liquid crystal domains can be arranged with a high degree of symmetry for each unit lattice, whereby it is possible to improve the viewing angle dependence of the display quality.

When the shape of each of at least some of the plurality of open regions (typically those that form unit lattices) has rotational symmetry, it is possible to increase the stability of the radially-inclined orientation of the liquid crystal domains formed in the open regions. For example, the shape of each open region (as viewed in the substrate normal direction) is preferably a circular shape or a polygonal shape (e.g., square). Note that a shape that does not have rotational symmetry (e.g., an ellipse) may be employed depending on the shape (aspect ratio) of the picture element.

In order to stabilize the radially-inclined orientation of the liquid crystal domain formed in the open region, it is preferred that the liquid crystal domain formed in the open region has a generally circular shape. In other words, the shape of the open region can be designed so that the liquid crystal domain formed in the open region will have a generally circular shape.

As described above, when liquid crystal domains are formed both in the open regions and in the unit solid portions, the radially-inclined orientation of all the liquid crystal domains can be stabilized by providing orientation-regulating structures on the other substrate so as to correspond to the liquid crystal domains to be formed. However, it is possible to obtain a practically sufficient level of stability (stress resistance) by providing the orientation-regulating structures only for the liquid crystal domains that are formed in the unit solid portions.

Particularly, it is preferred, in view of productivity, to employ an orientation-regulating structure exerting an orientation-regulating force that conforms with the radially-inclined orientation formed in a unit solid portion of the electrode because such an orientation-regulating structure can be made by a simpler process than an orientation-regulating structure exerting an orientation-regulating force that conforms with the radially-inclined orientation formed in an open region. While it is preferred that the orientation-regulating structure is provided for every unit solid portion, a practically sufficient level of orientation stability may be obtained in some cases by providing the orientation-regulating structures only for some unit solid portions depending on the electrode structure (e.g., the number of unit solid portions and the arrangement thereof). This is because the radially-inclined orientation formed in the liquid crystal layer of the liquid crystal display device of the present invention is essentially continuous.

Moreover, in order to improve the resistance to a stress, a protrusion having a side surface that exerts, for liquid crystal molecules of the liquid crystal layer, an orientation-regulating force of the same direction as the direction of orientation regulation by the inclined electric field may be provided within each open region. It is preferred that the protrusion has the same cross-sectional shape in the plane of the substrate as the shape of the open region and has rotational symmetry as does the shape of the open region. Note however that since those liquid crystal molecules whose orientation is regulated by the orientation-regulating force from the side surface of the protrusion are less responsive to an applied voltage (the retardation of these liquid crystal molecules changes less in response to an applied voltage), the display contrast ratio may decrease. Therefore, it is preferred that the size, the height and the number of protrusions are determined so as not to deteriorate the display quality.

The liquid crystal display device of the present invention is, for example, an active matrix type including a switching element such as a TFT for each picture element region. The electrode including openings therein as described above is the picture element electrode connected to the switching element, and the other electrode is at least one counter electrode opposing a plurality of picture element electrodes.

BRIEF DESCRIPTION OF THE DRAWINGS

FIG. 1A and FIG. 1B schematically illustrate a structure of one picture element region of a liquid crystal display device 100 according to Embodiment 1 of the present invention, wherein FIG. 1A is a plan view, and FIG. 1B is a cross-sectional view taken along line 1B-1B' of FIG. 1A.

Each of FIG. 4A to FIG. 4D schematically illustrates the relationship between an electric force line and an orientation of a liquid crystal molecule.

Figure 5A:
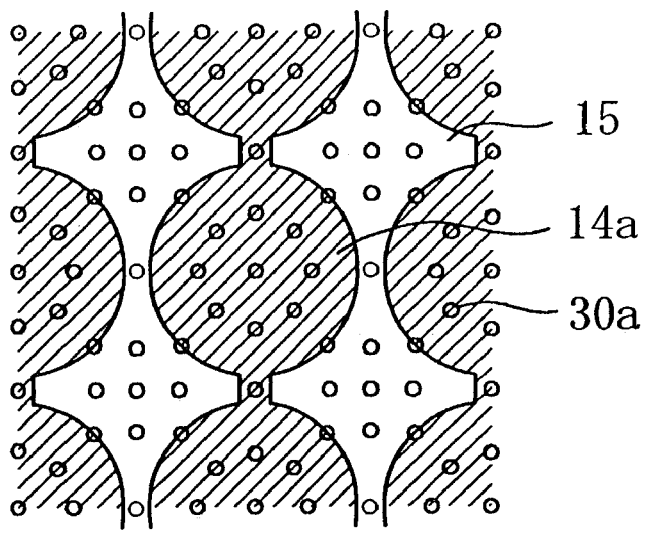
Figure 5B:
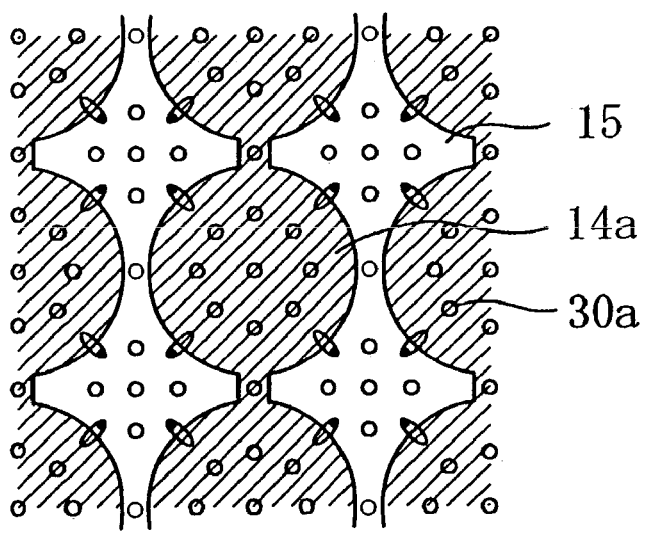
Figure 5C:
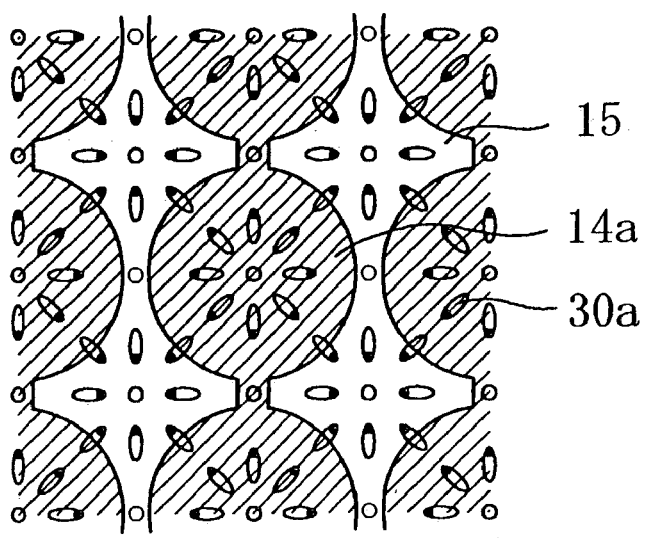

Each of FIG. 5A to FIG. 5C schematically illustrates an orientation of liquid crystal molecules in the liquid crystal display device 100 as viewed in a substrate normal direction.

Figure 6A:
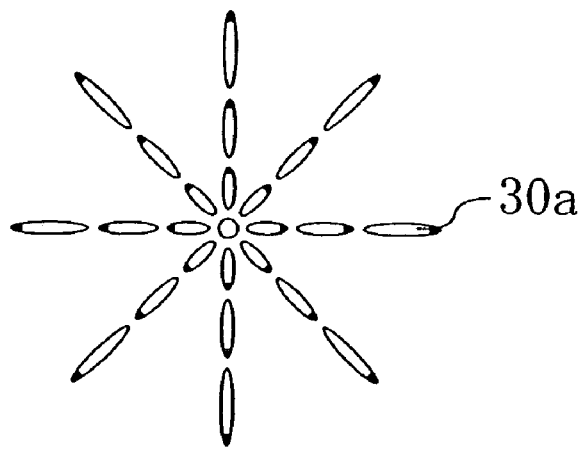
Figure 6B:
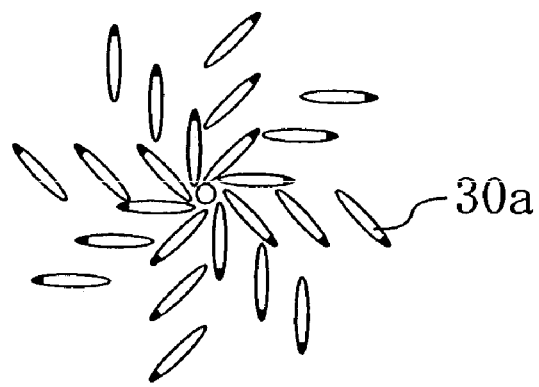
Figure 6C:
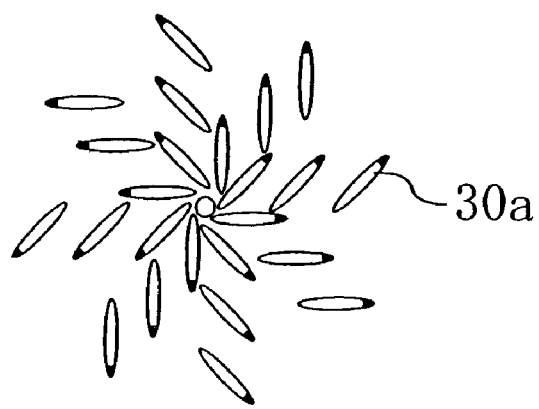

FIG. 6A to FIG. 6C schematically illustrate exemplary radially-inclined orientations of liquid crystal molecules.

Figure 7A:
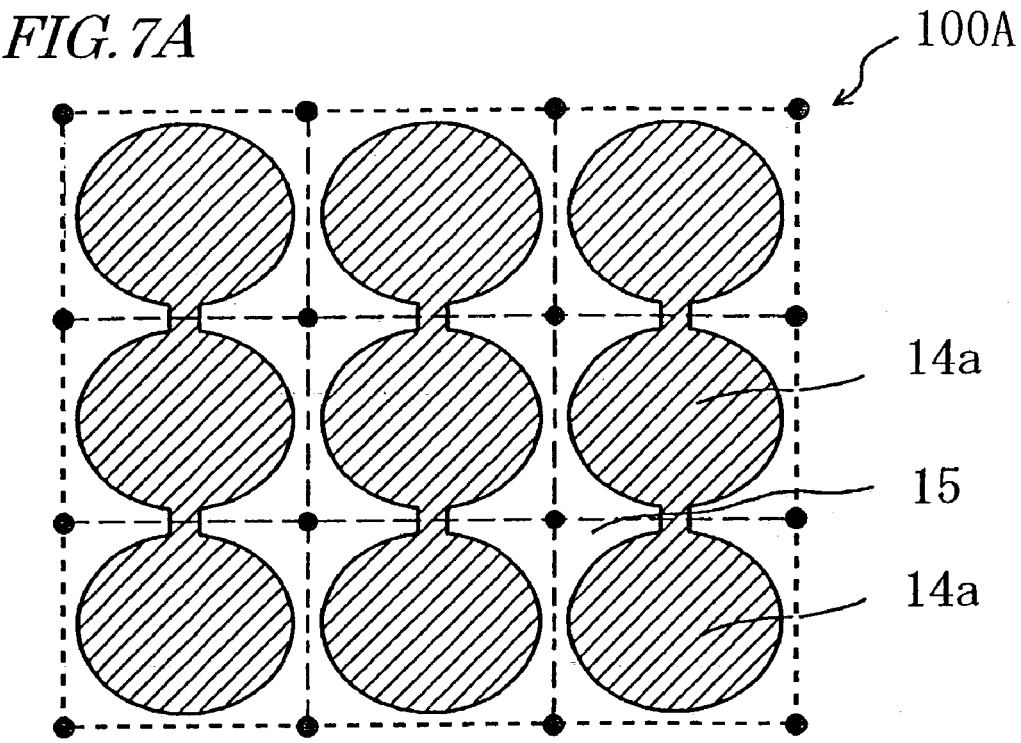
Figure 7B:
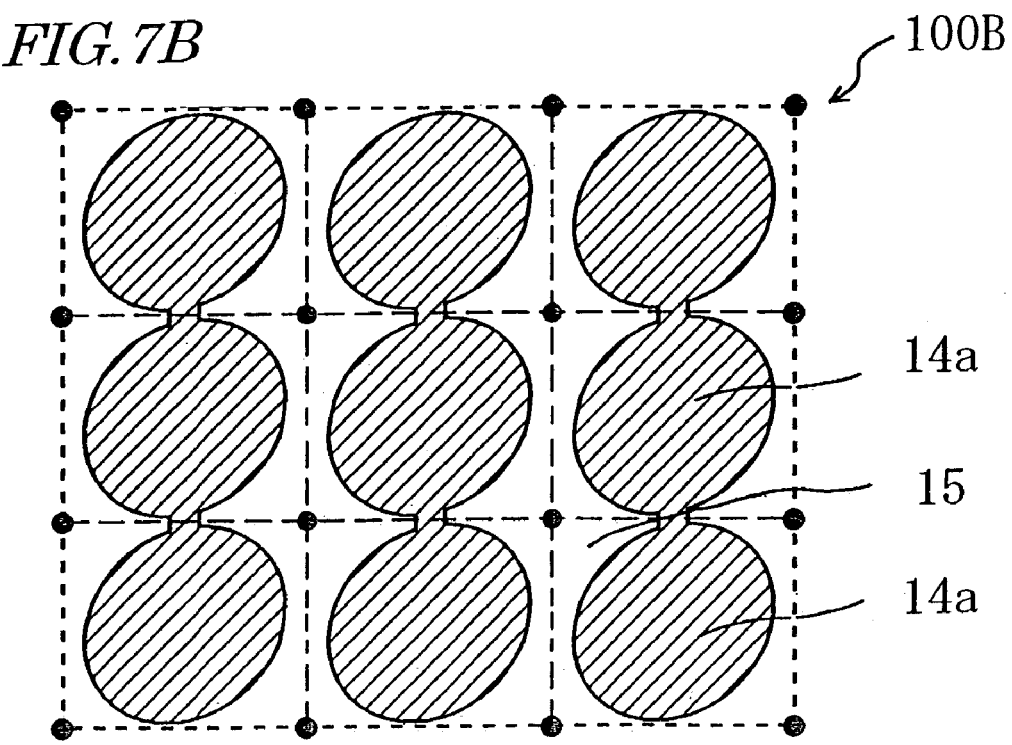

FIG. 7A and FIG. 7B are plan views schematically illustrating other liquid crystal display devices 100A and 100B according to Embodiment 1 of the present invention.

Figure 8A:
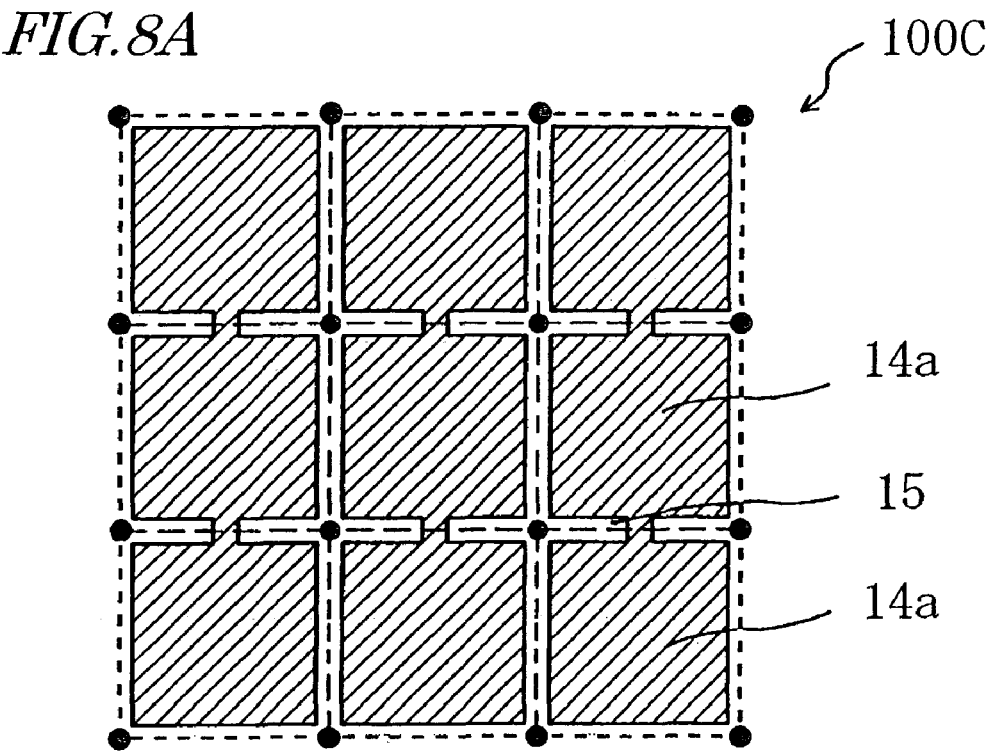
Figure 8B:
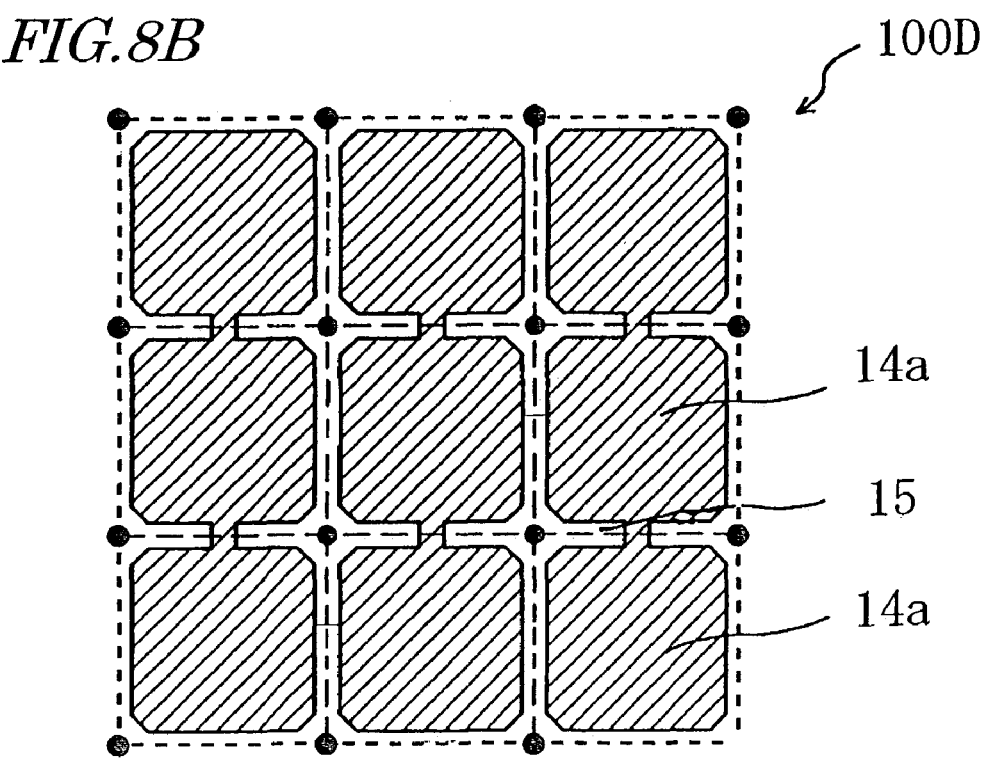

FIG. 8A and FIG. 8B are plan views schematically illustrating still other liquid crystal display devices 100C and 100D according to Embodiment 1 of the present invention.

Figure 9:
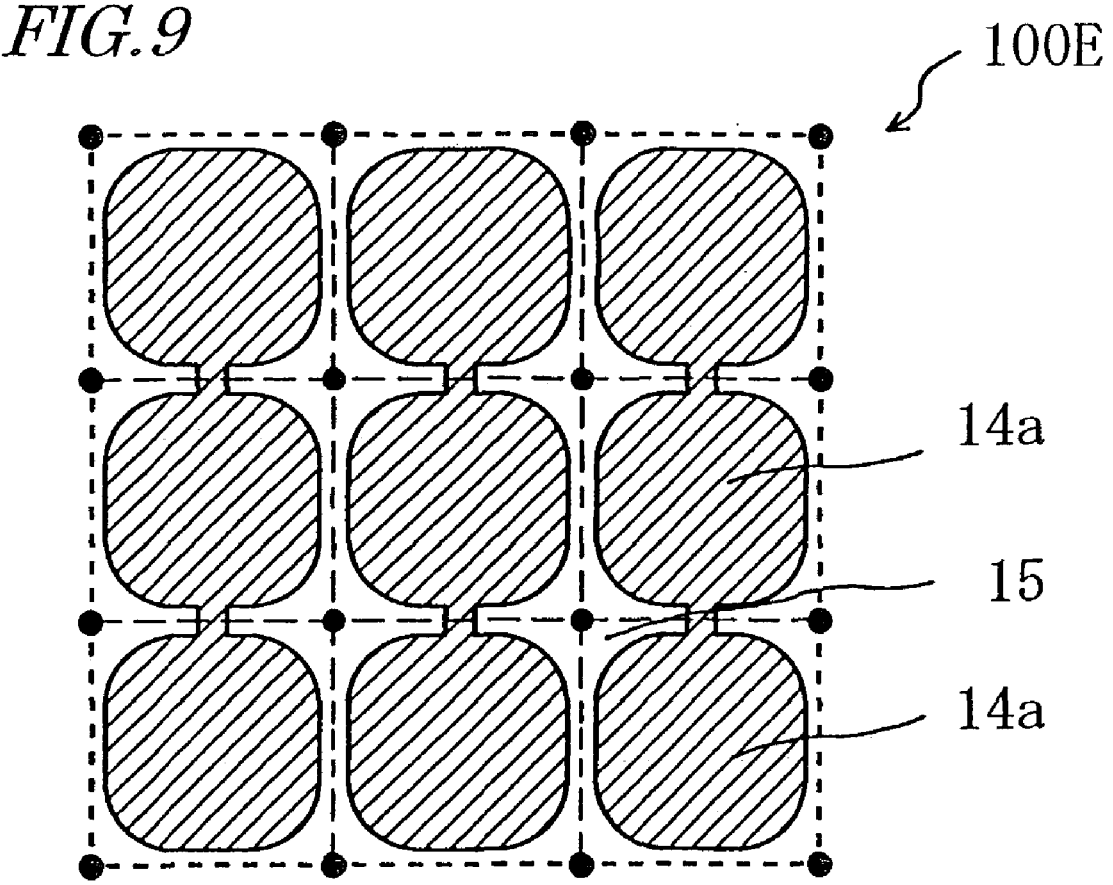

FIG. 9 is a plan view schematically illustrating still another liquid crystal display device 100E according to Embodiment 1 of the present invention.

Figure 10:
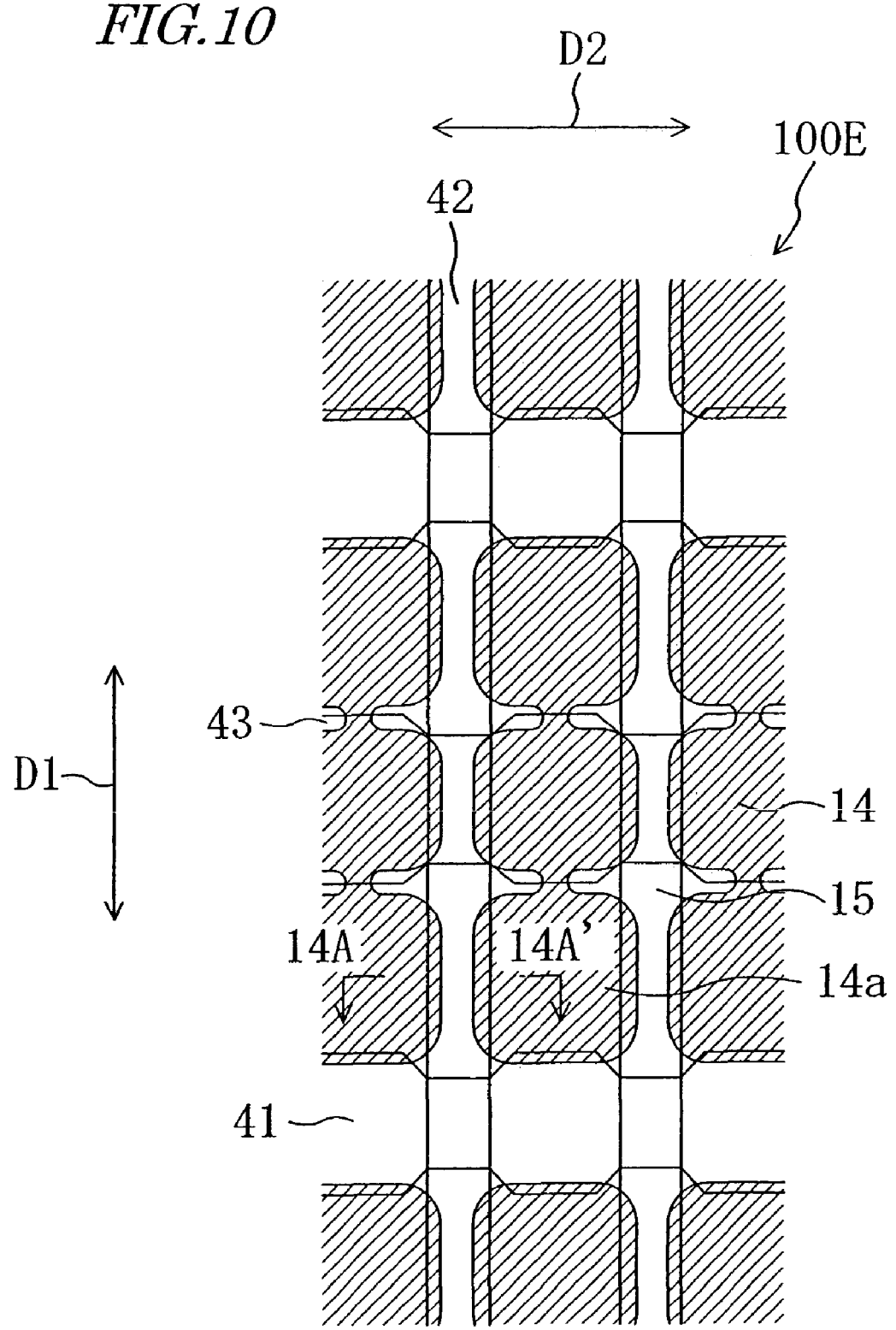

FIG. 10 is a plan view schematically illustrating still another liquid crystal display device 100E according to Embodiment 1 of the present invention.

Figure 11:
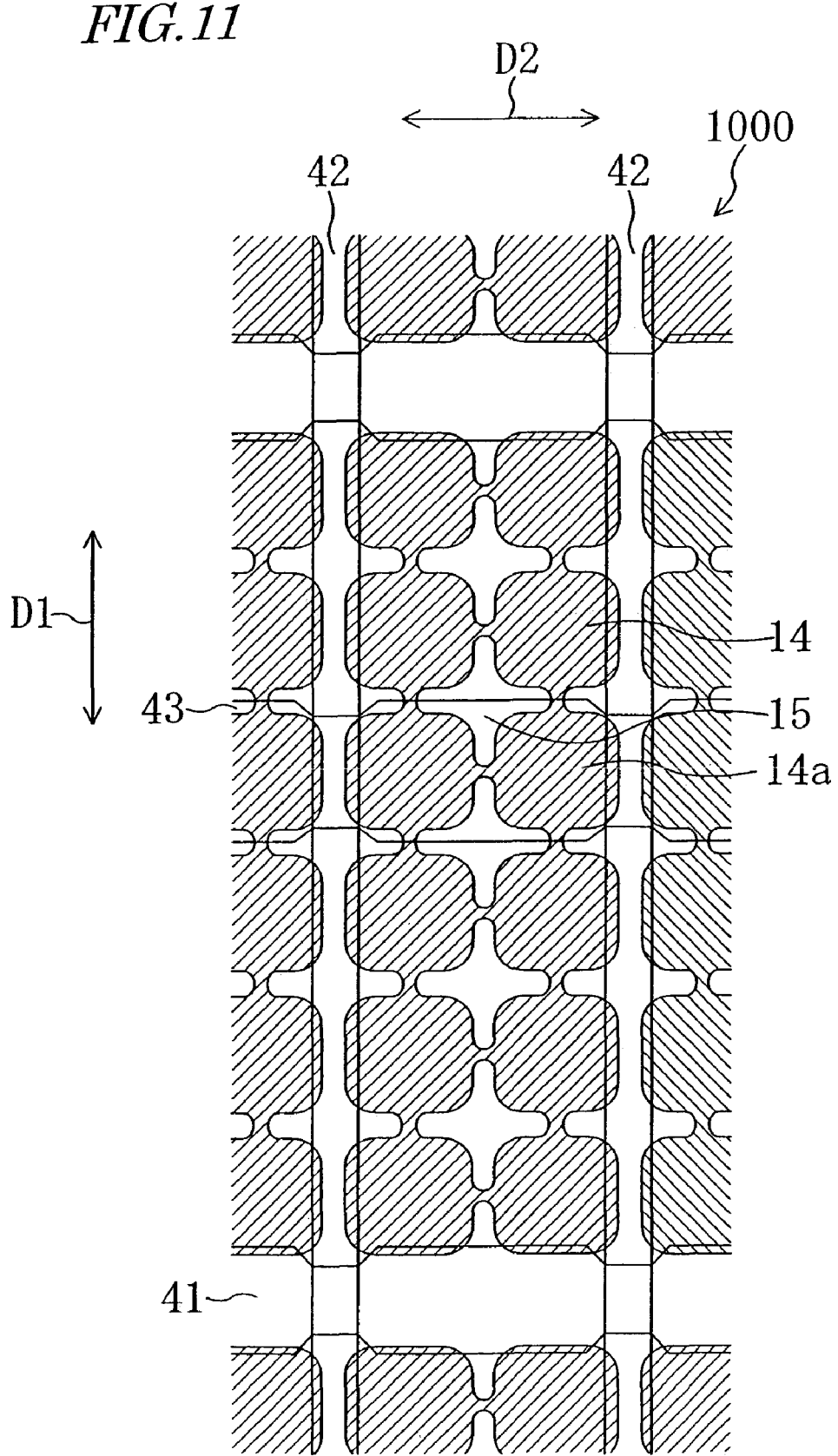

FIG. 11 is a plan view schematically illustrating a liquid crystal display device 1000 of a comparative example.

Figure 12:
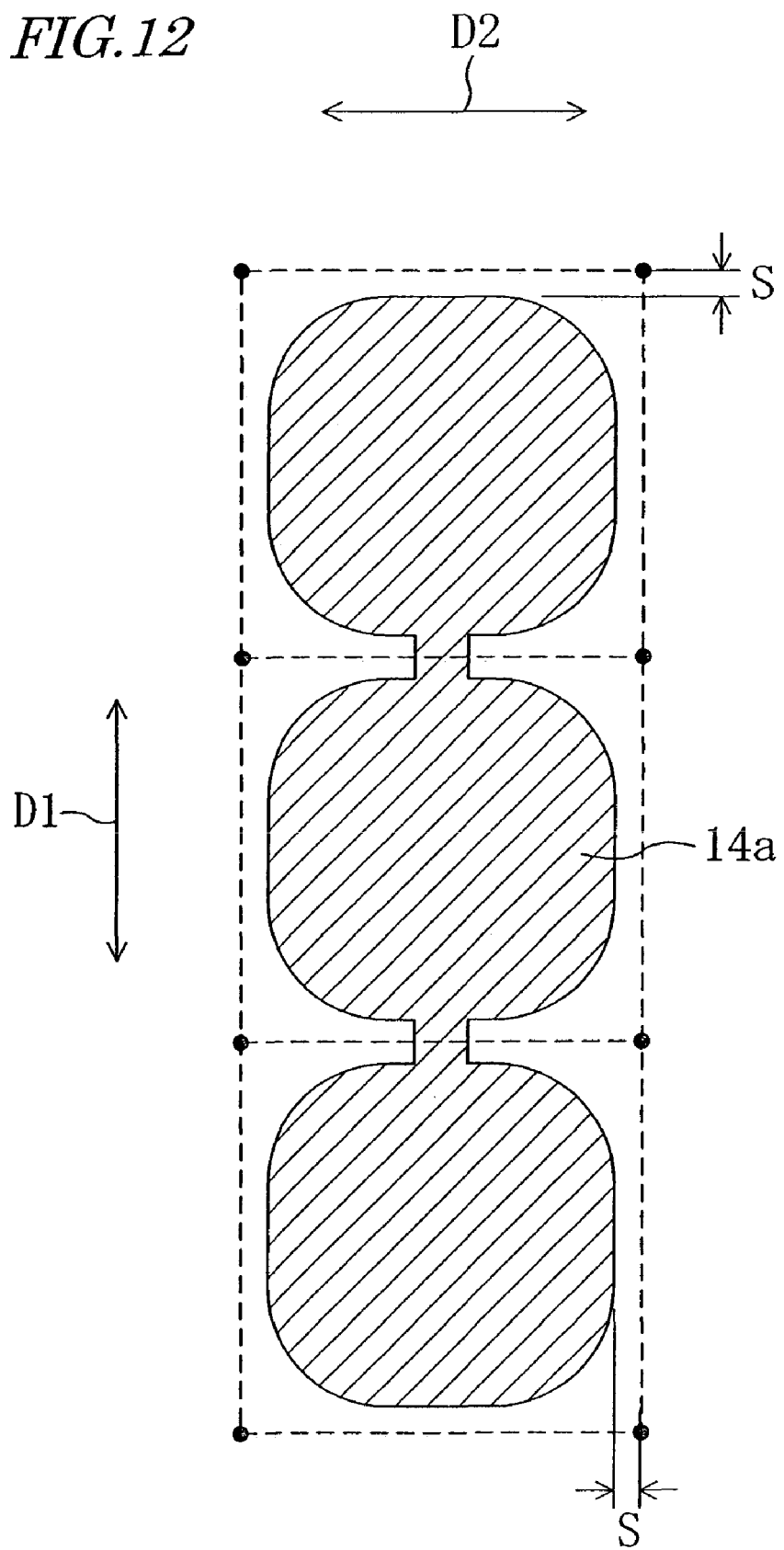

FIG. 12 is a plan view schematically illustrating a picture element electrode used in the liquid crystal display device of Embodiment 1 of the present invention.

Figure 13A:
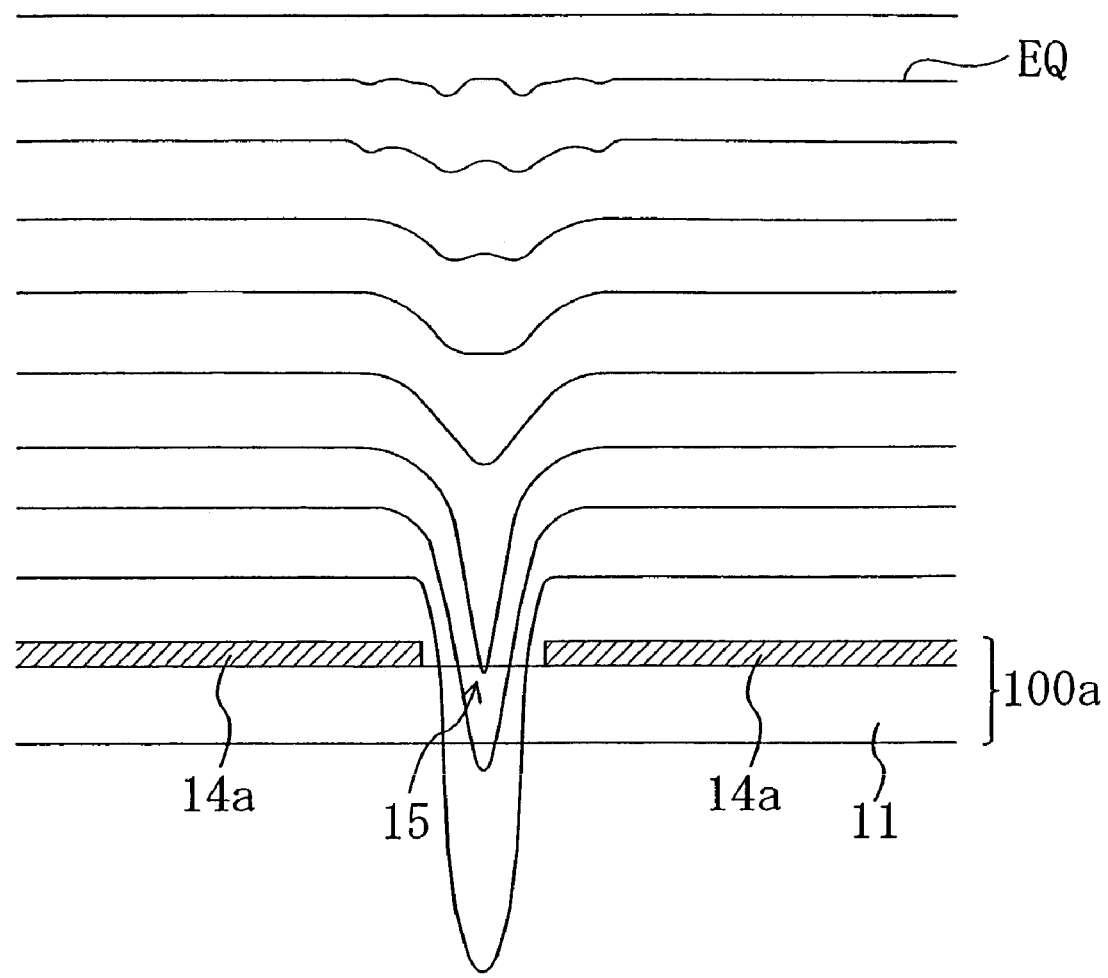

FIG. 13A schematically illustrates equipotential lines EQ produced when voltages of the same polarity are applied to two picture element regions that are adjacent to each other in the row direction.

Figure 13B:
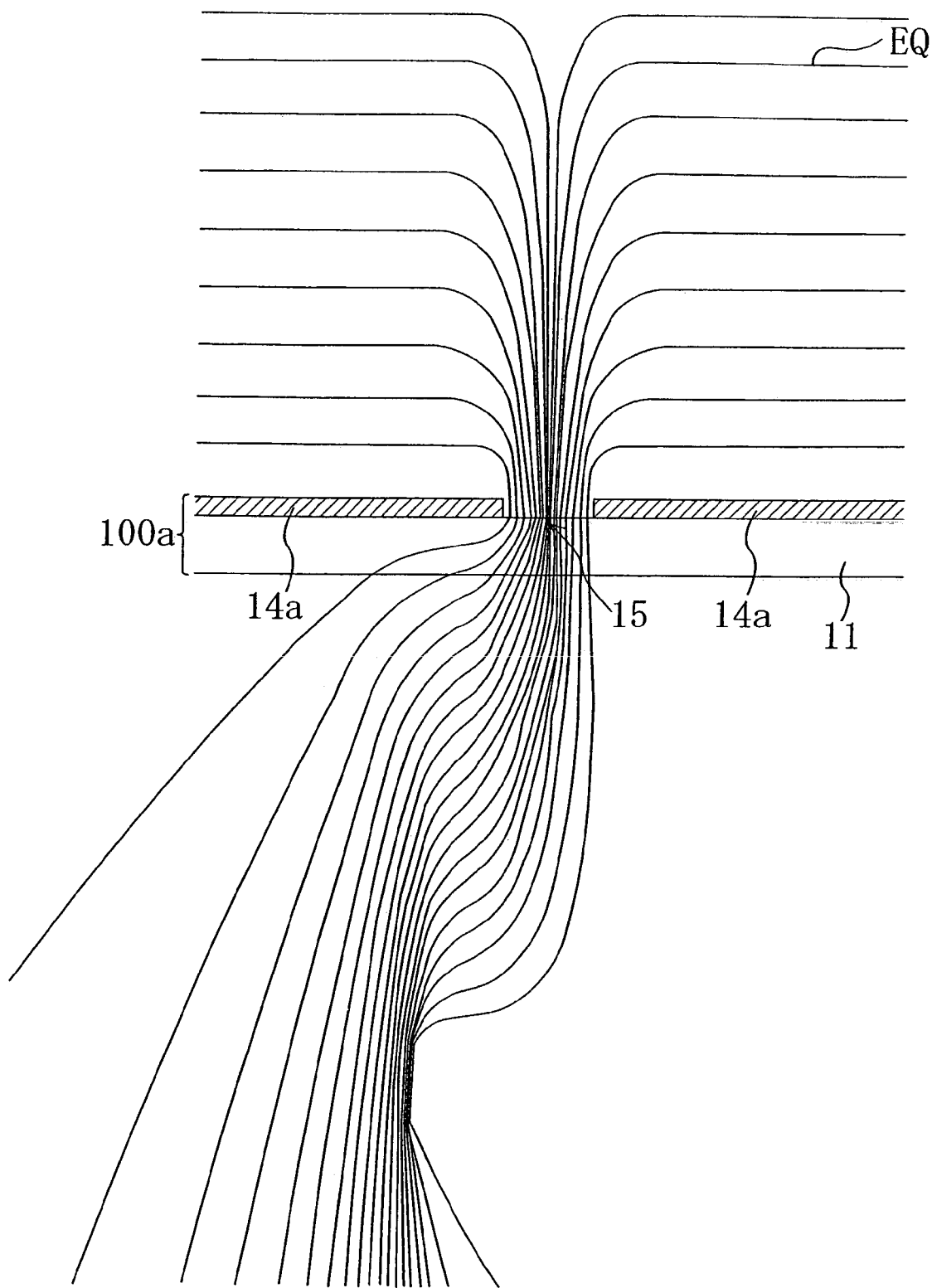

FIG. 13B schematically illustrates equipotential lines EQ produced when voltages of different polarities are applied to two picture element regions that are adjacent to each other in the row direction.

Figure 14A:
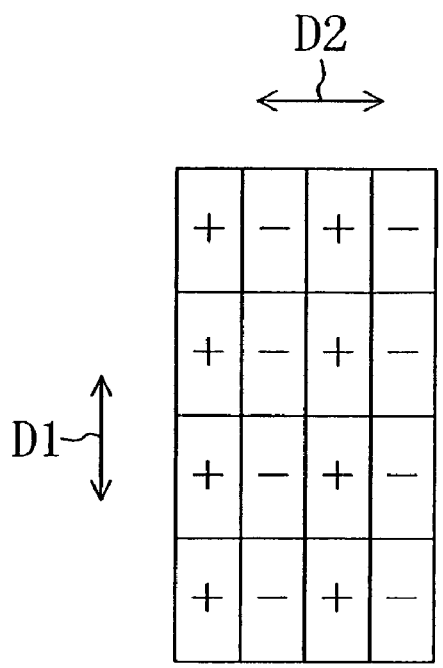
Figure 14B:
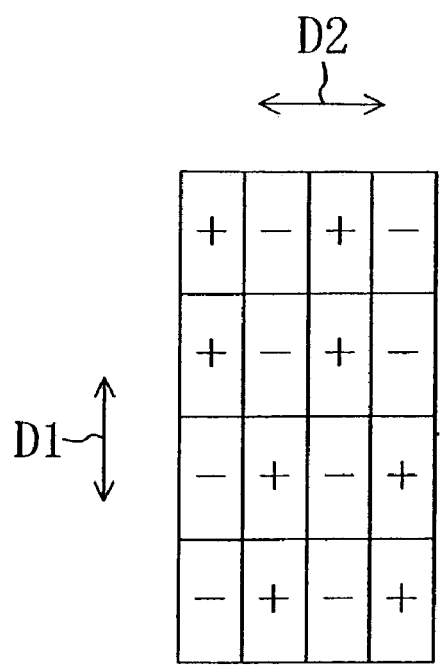
Figure 14C:
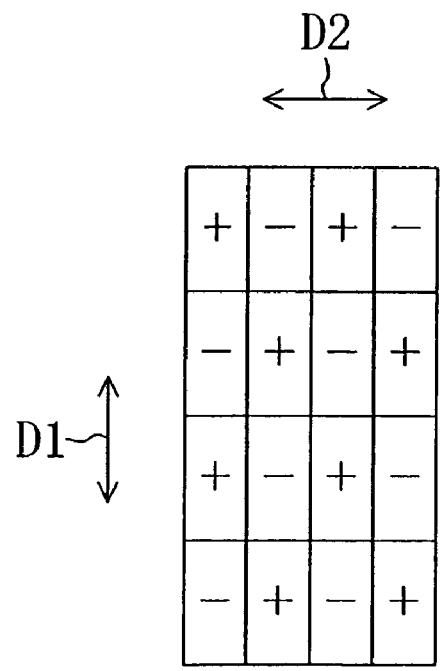

Each of FIG. 14A, FIG. 14B and FIG. 14C illustrates a driving method for use with the liquid crystal display device of Embodiment 1 of the present invention.

Figure 15:
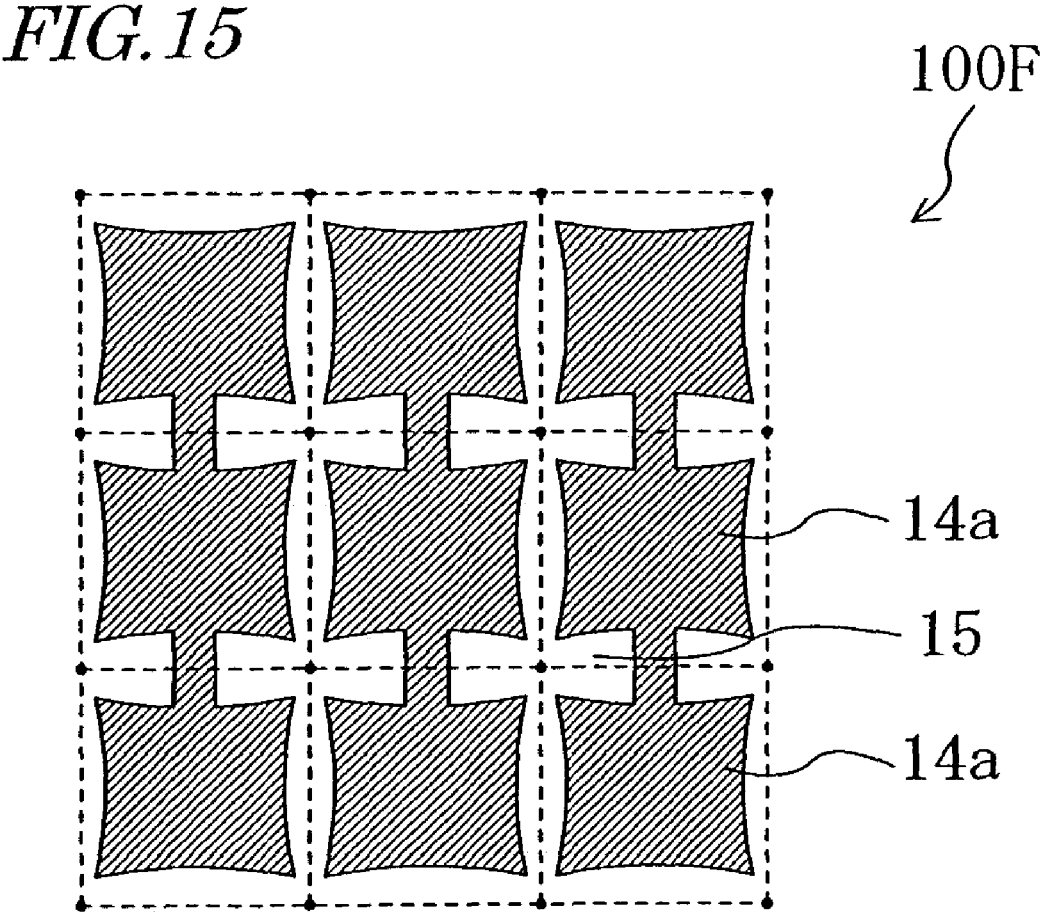

FIG. 15 is a plan view schematically illustrating still another liquid crystal display device 100F according to Embodiment 1 of the present invention.

Figure 16A:
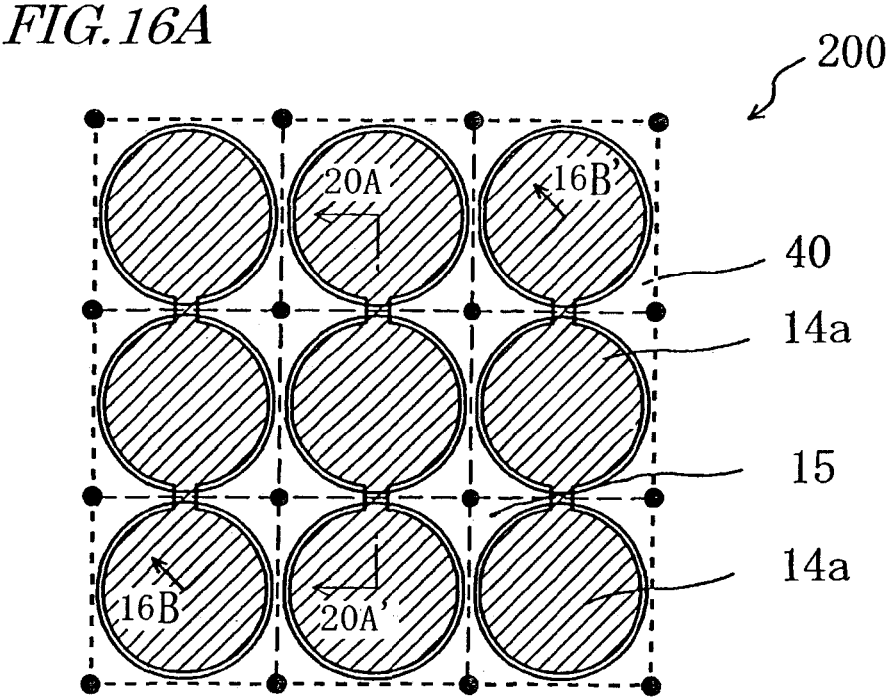
Figure 16B:
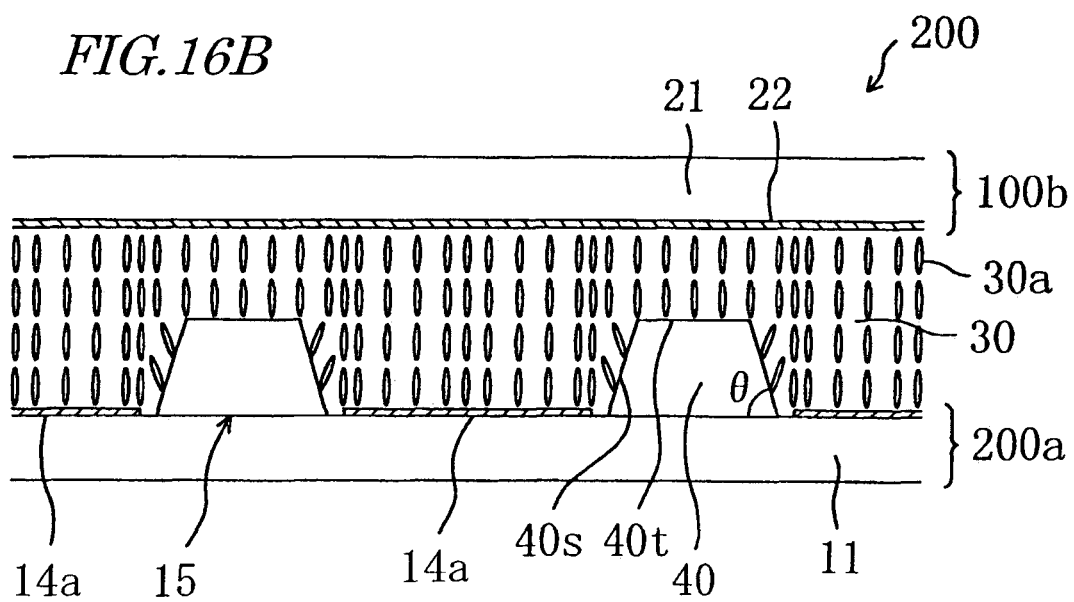

FIG. 16A and FIG. 16B schematically illustrate a structure of one picture element region of a liquid crystal display device 200 according to Embodiment 2 of the present invention, wherein FIG. 16A is a plan view, and FIG. 16B is a cross-sectional view taken along line 16B-16B' of FIG. 16A.

FIG. 17A to FIG. 17D are schematic diagrams illustrating the relationship between an orientation of liquid crystal molecules 30a and a surface configuration having a vertical alignment power.

Figure 18A:
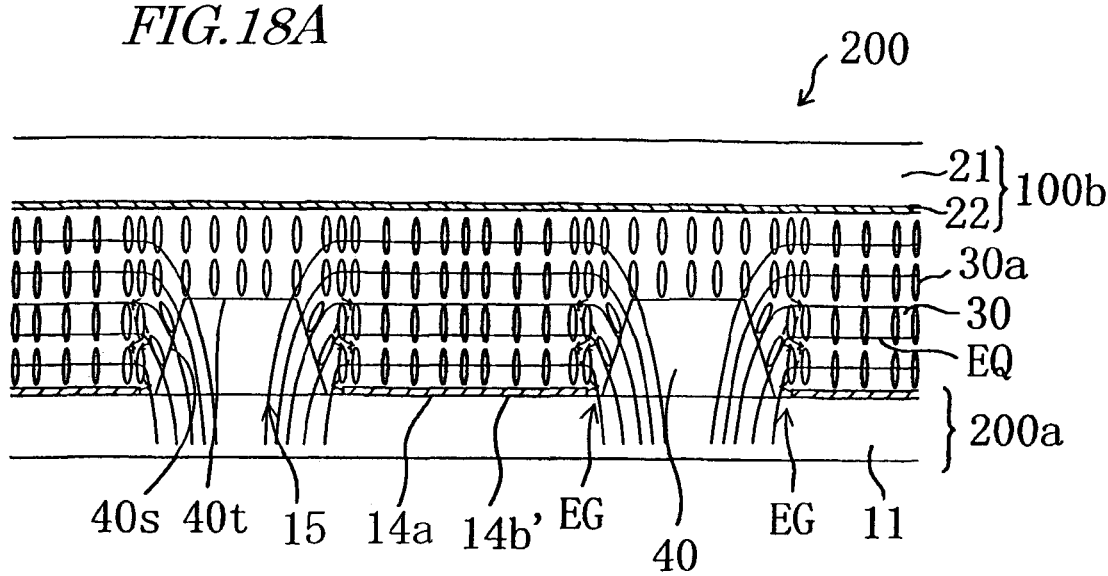
Figure 18B:
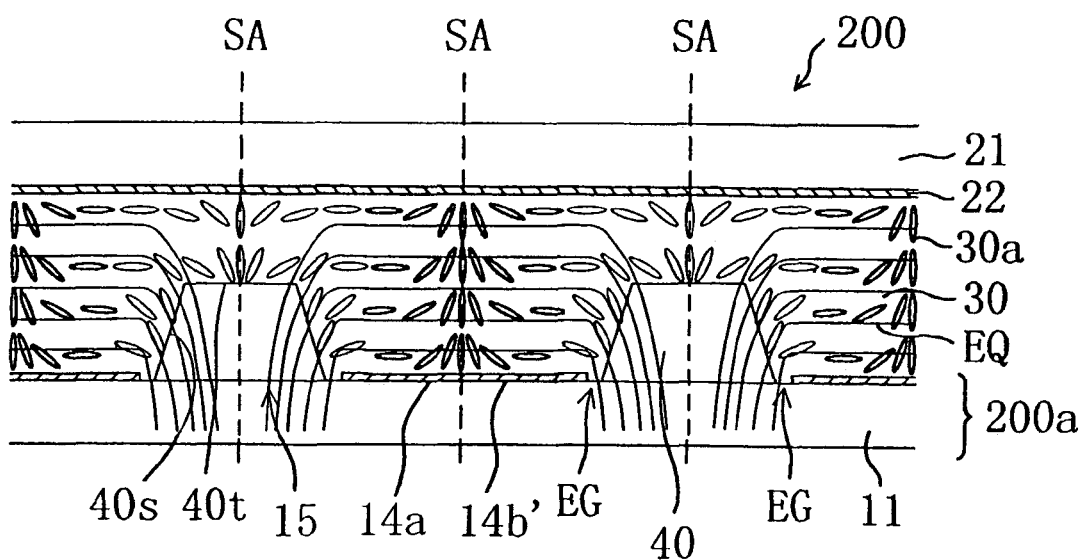

FIG. 18A and FIG. 18B illustrate the liquid crystal layer 30 of the liquid crystal display device 200 in the presence of an applied voltage thereacross, wherein FIG. 18A schematically illustrates a state where an orientation has just started to change (initial ON state), and FIG. 18B schematically illustrates a steady state.

Figure 19A:
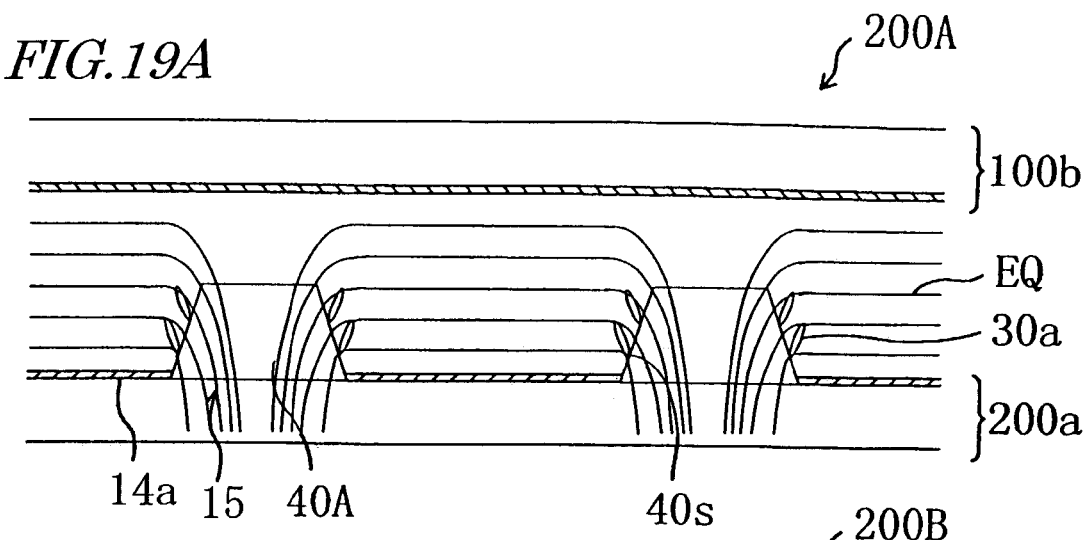
Figure 19B:
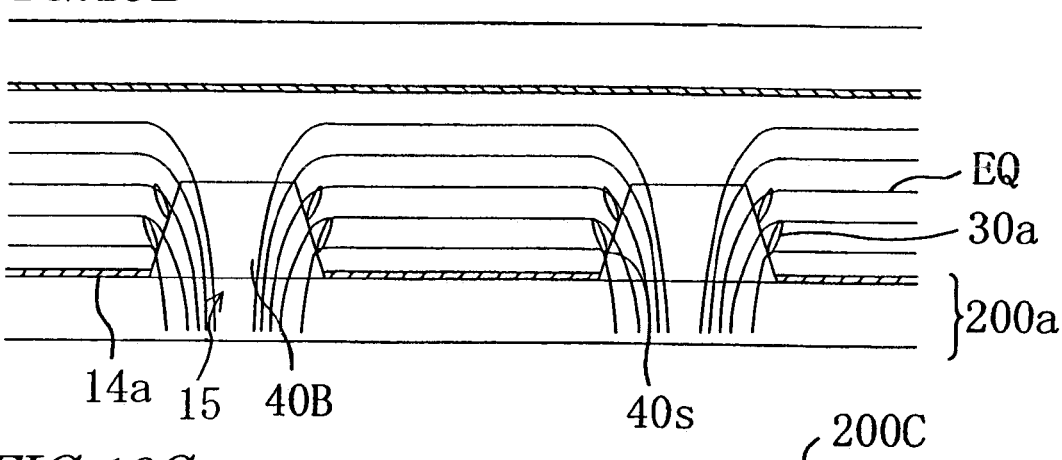
Figure 19C:
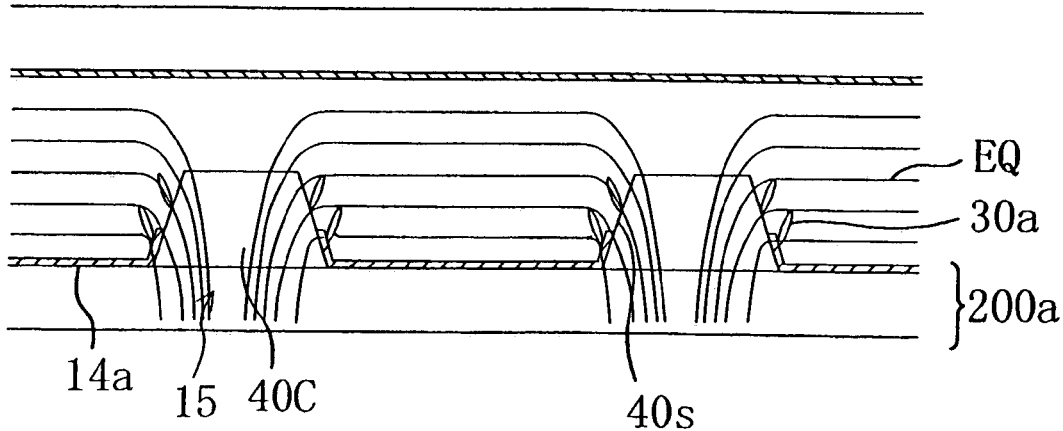

FIG. 19A to FIG. 19C are cross-sectional views schematically illustrating liquid crystal display devices 200A, 200B and 200C, respectively, of Embodiment 2, having different positional relationships between an opening and a protrusion.

FIG. 20 is a cross-sectional view schematically illustrating the liquid crystal display device 200 taken along line 20A-20A' of FIG. 16A.

Figure 21A:
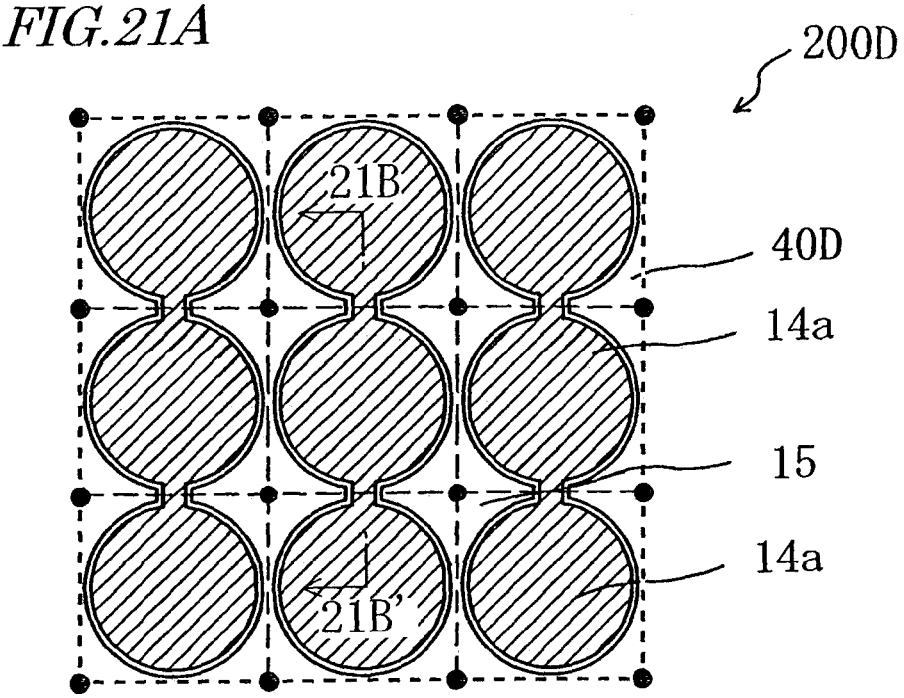
Figure 21B:
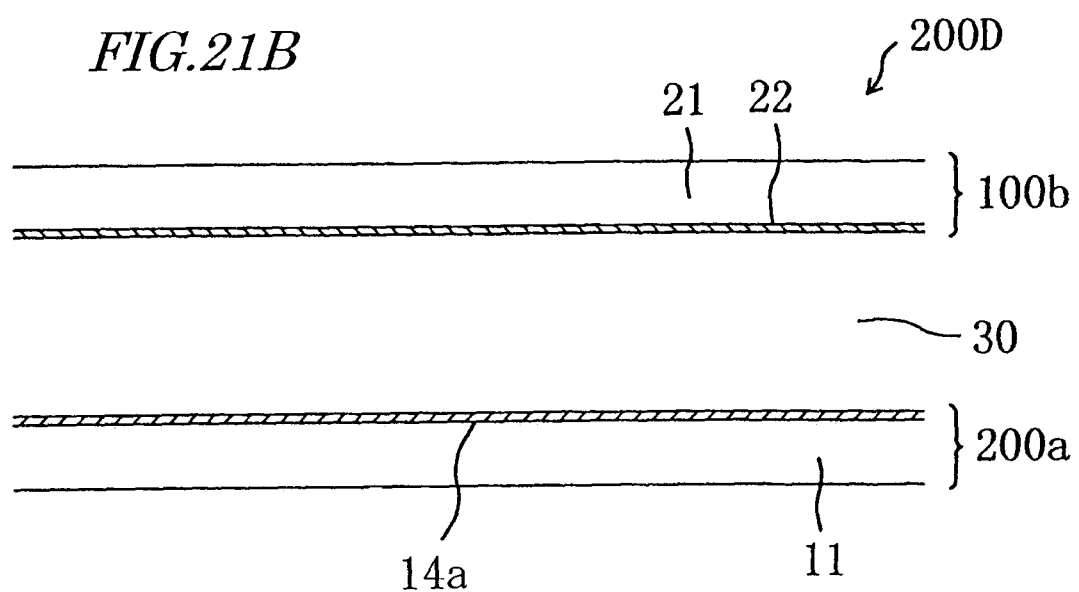

FIG. 21A and FIG. 21B schematically illustrate a structure of one picture element region of a liquid crystal display device 200D, wherein FIG. 21A is a plan view, and FIG. 21B is a cross-sectional view taken along line 21B-21B' of FIG. 21A.

FIG. 22A to FIG. 22E each schematically illustrate a counter substrate 300b including an orientation-regulating structure 28.

Figure 23A:
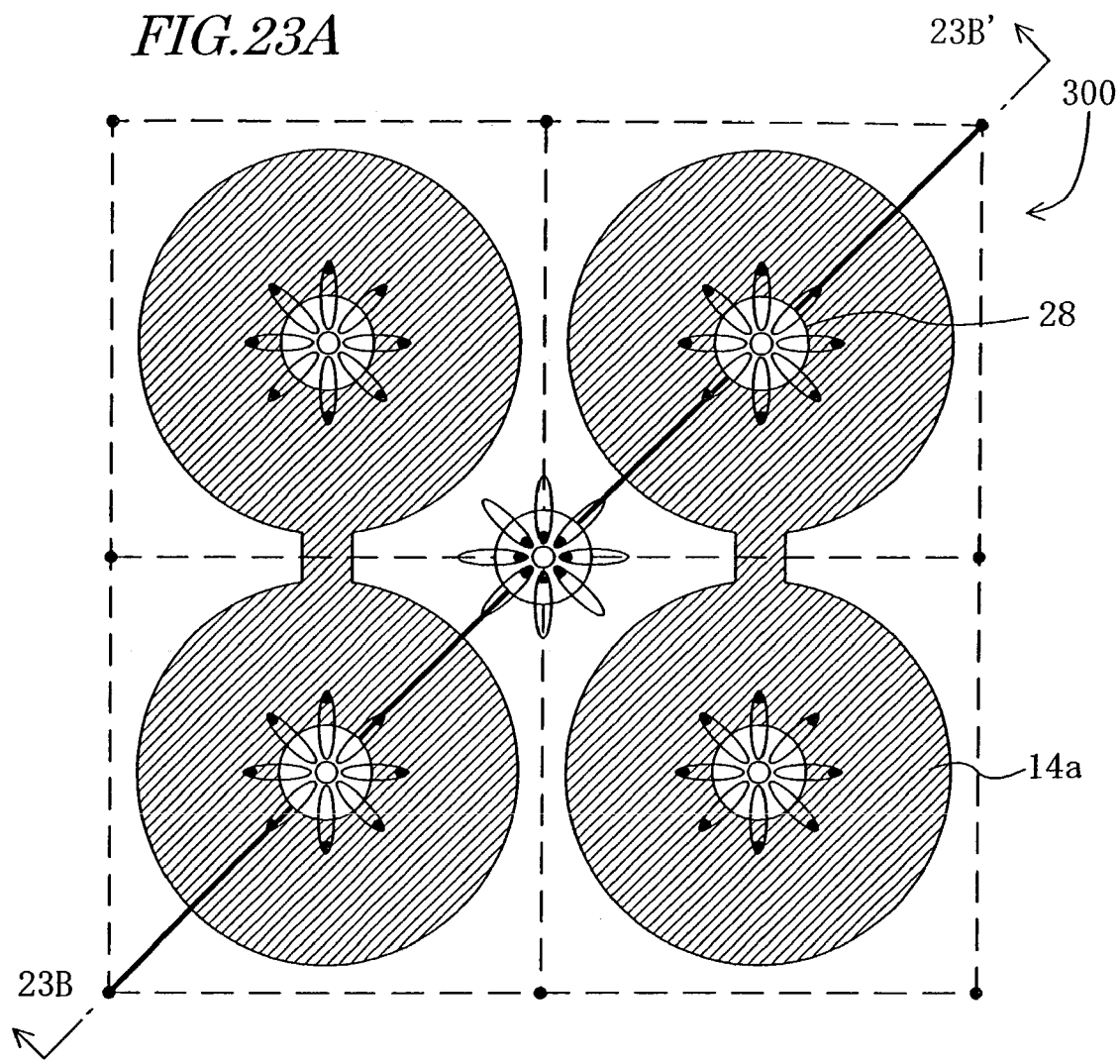
Figure 23B:
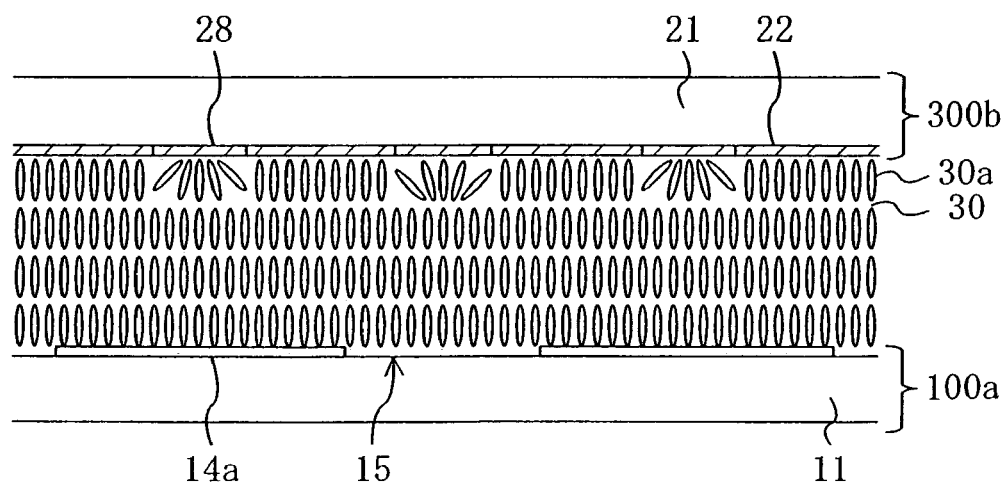

FIG. 23A and FIG. 23B schematically illustrate a structure of one picture element region of a liquid crystal display device 300 according to Embodiment 3 of the present invention, wherein FIG. 23A is a plan view, and FIG. 23B is a cross-sectional view taken along line 23B-23B' of FIG. 23A.

Figure 24A:
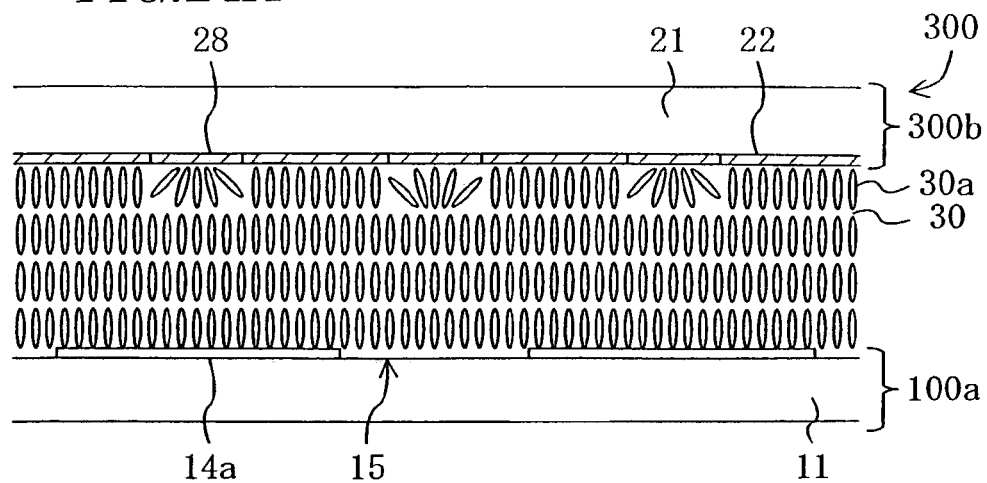
Figure 24B:
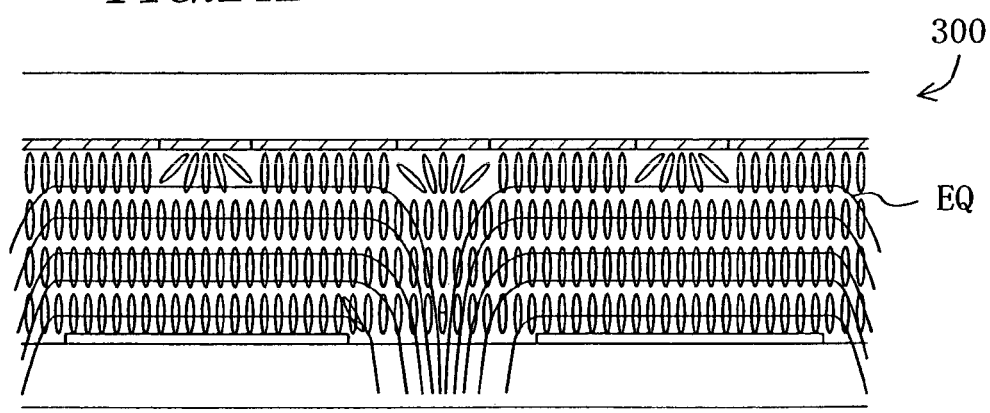
Figure 24C:
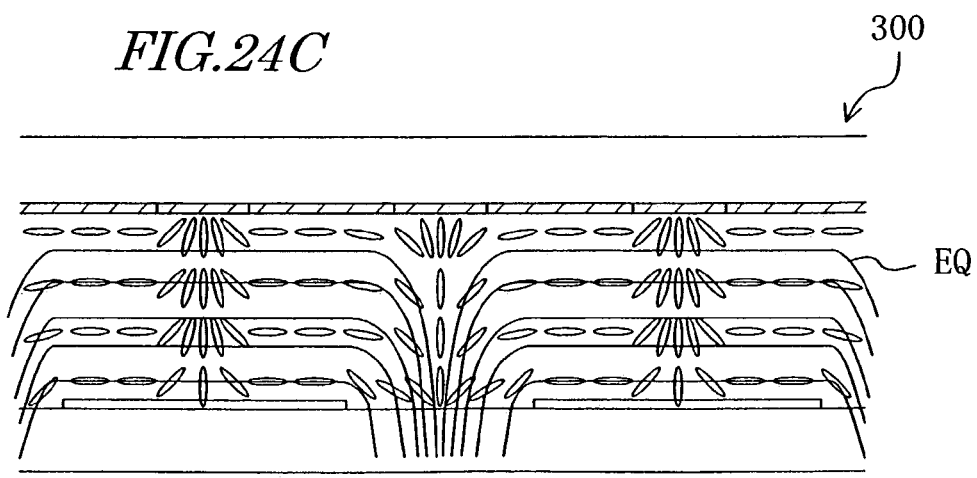

FIG. 24A to FIG. 24C are cross-sectional views schematically illustrating one picture element region of the liquid crystal display device 300, wherein FIG. 24A illustrates a state in the absence of an applied voltage, FIG. 24B illustrates a state where an orientation has just started to change (initial ON state), and FIG. 24C illustrates a steady state.

Figure 25A:
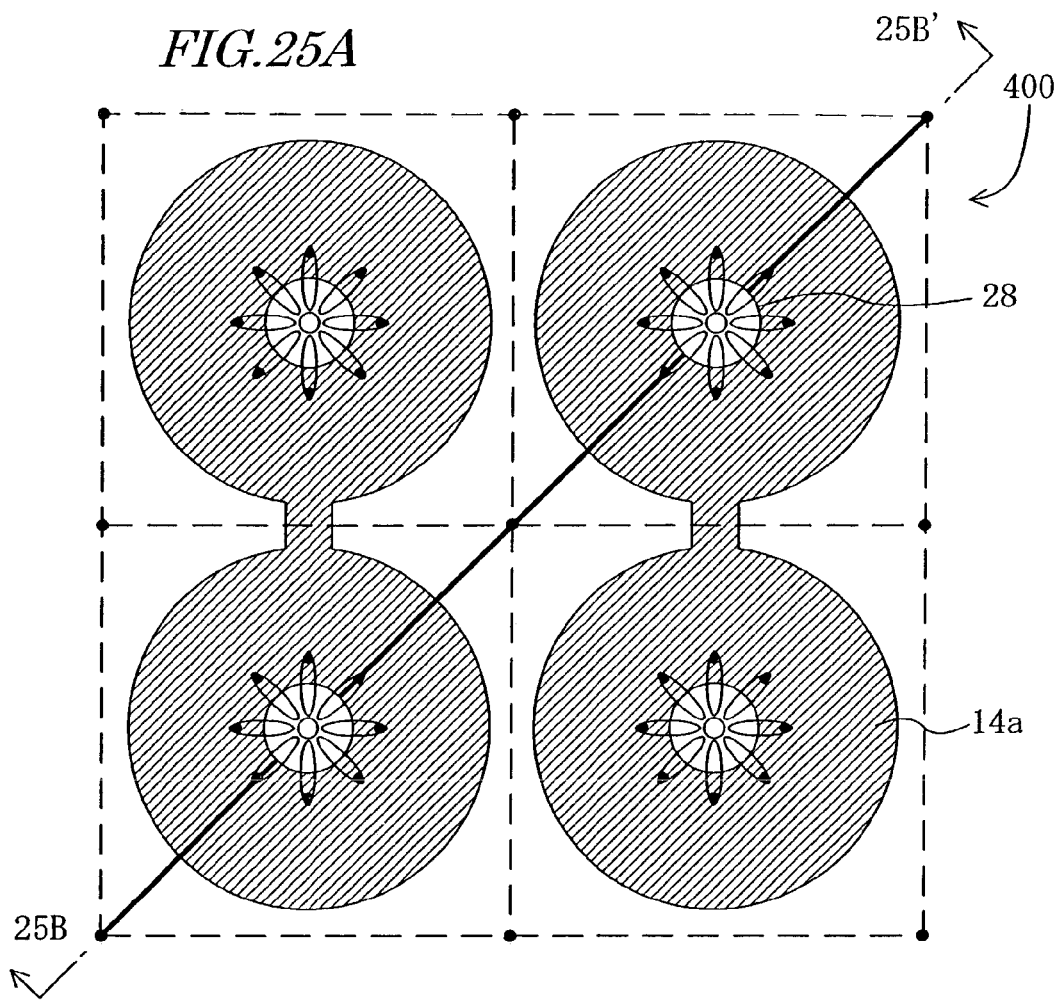
Figure 25B:
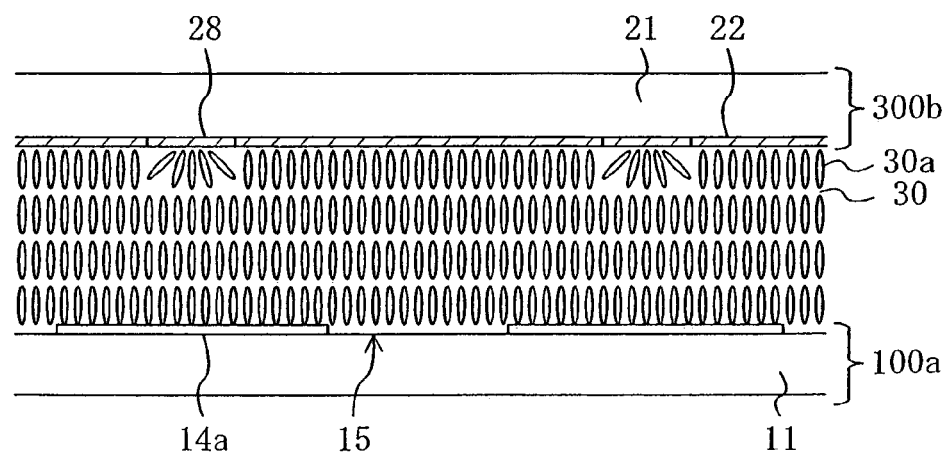

FIG. 25A and FIG. 25B schematically illustrate a structure of one picture element region of another liquid crystal display device 400 according to Embodiment 3 of the present invention, wherein FIG. 25A is a plan view, and FIG. 25B is a cross-sectional view taken along line 25B-25B' of FIG. 25A.

Figure 26A:
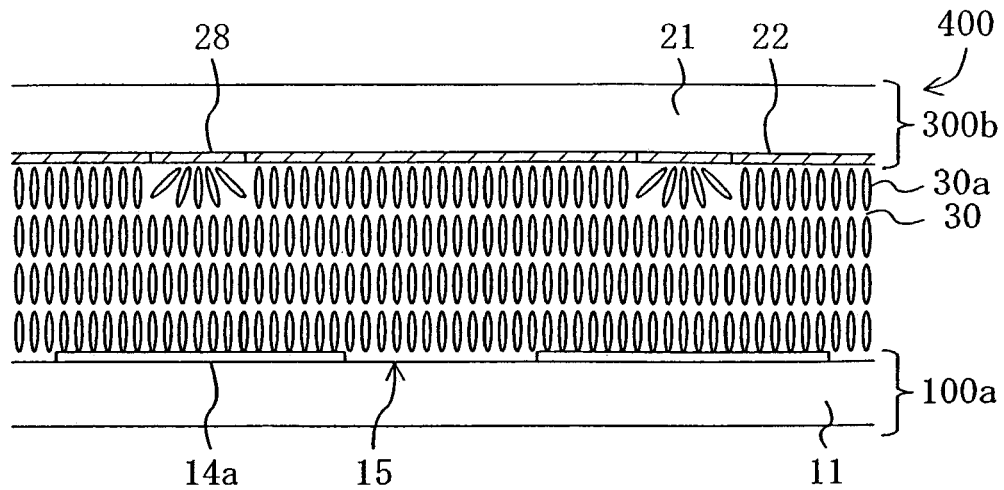
Figure 26B:
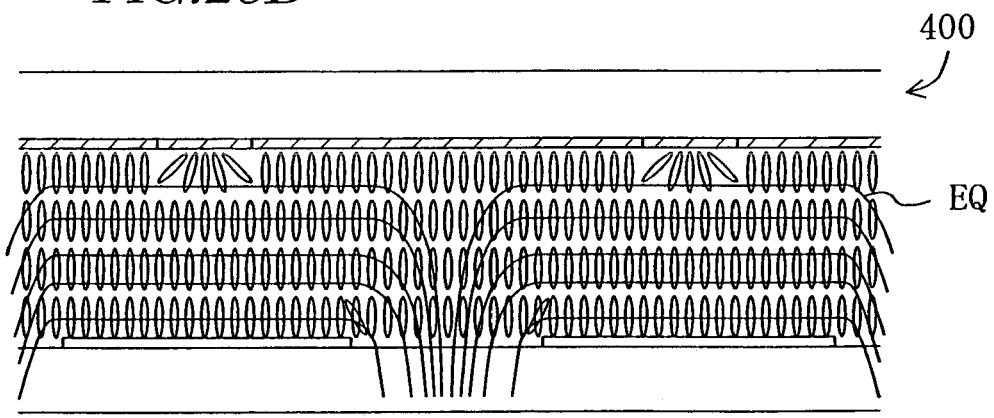
Figure 26C:
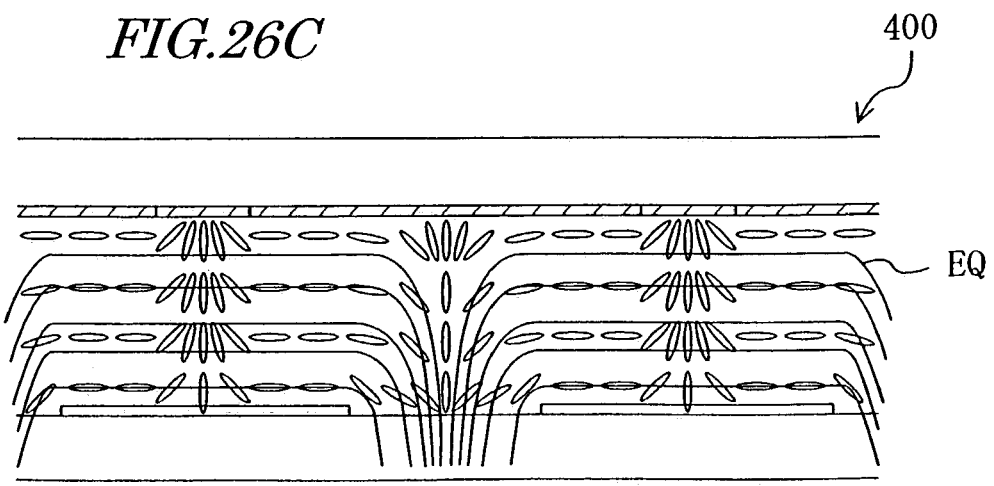

FIG. 26A to FIG. 26C are cross-sectional views schematically illustrating one picture element region of the liquid crystal display device 400, wherein FIG. 26A illustrates a state in the absence of an applied voltage, FIG. 26B illustrates a state where an orientation has just started to change (initial ON state), and FIG. 26C illustrates a steady state.

Figure 27A:
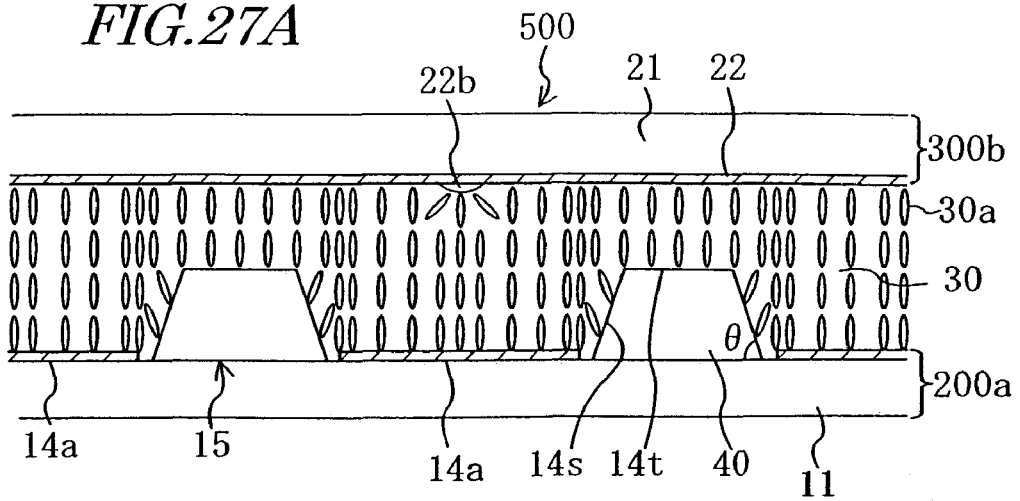
Figure 27B:
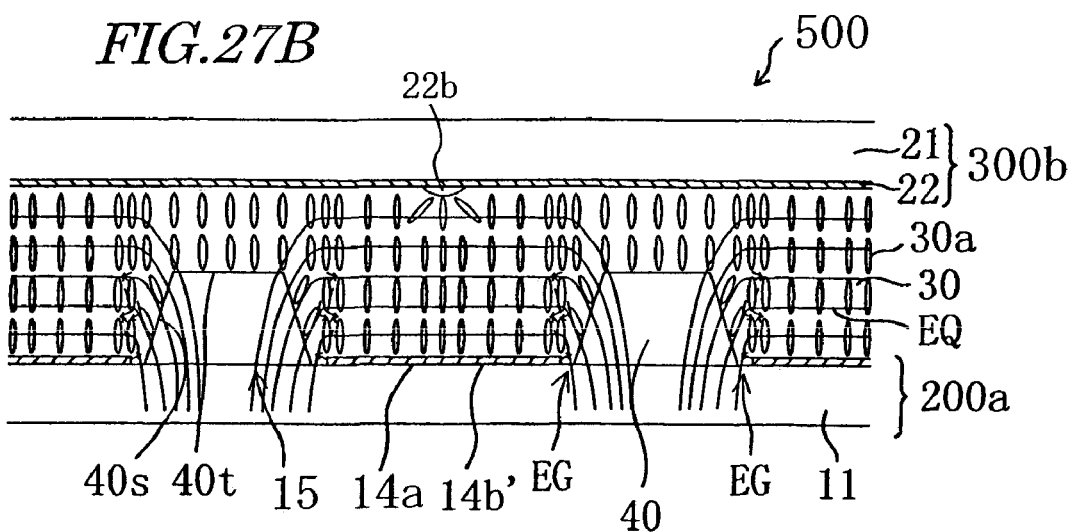
Figure 27C:
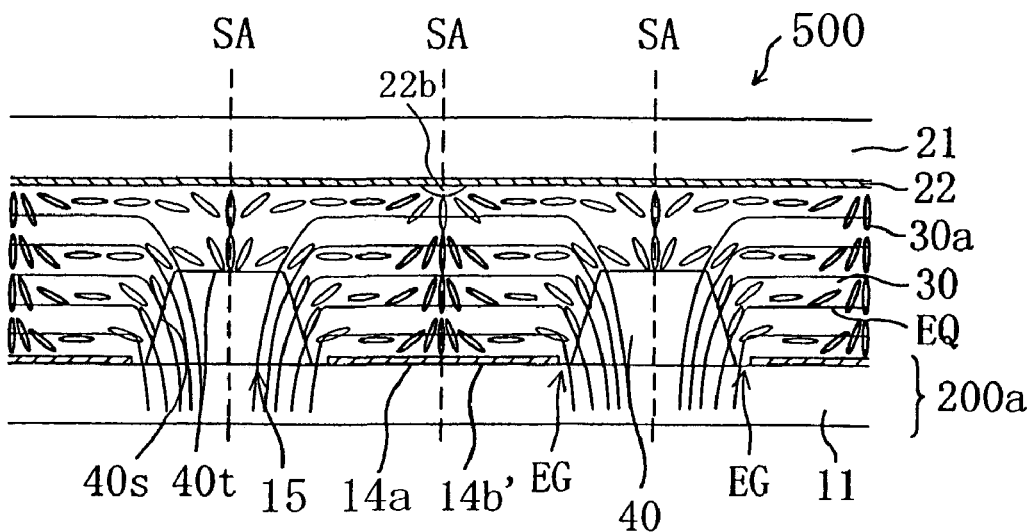

FIG. 27A to FIG. 27C are cross-sectional views schematically illustrating one picture element region of still another liquid crystal display device 500 according to Embodiment 3 of the present invention, wherein FIG. 27A illustrates a state in the absence of an applied voltage, FIG. 27B illustrates a state where an orientation has just started to change (initial ON state), and FIG. 27C illustrates a steady state.

Figure 28A:
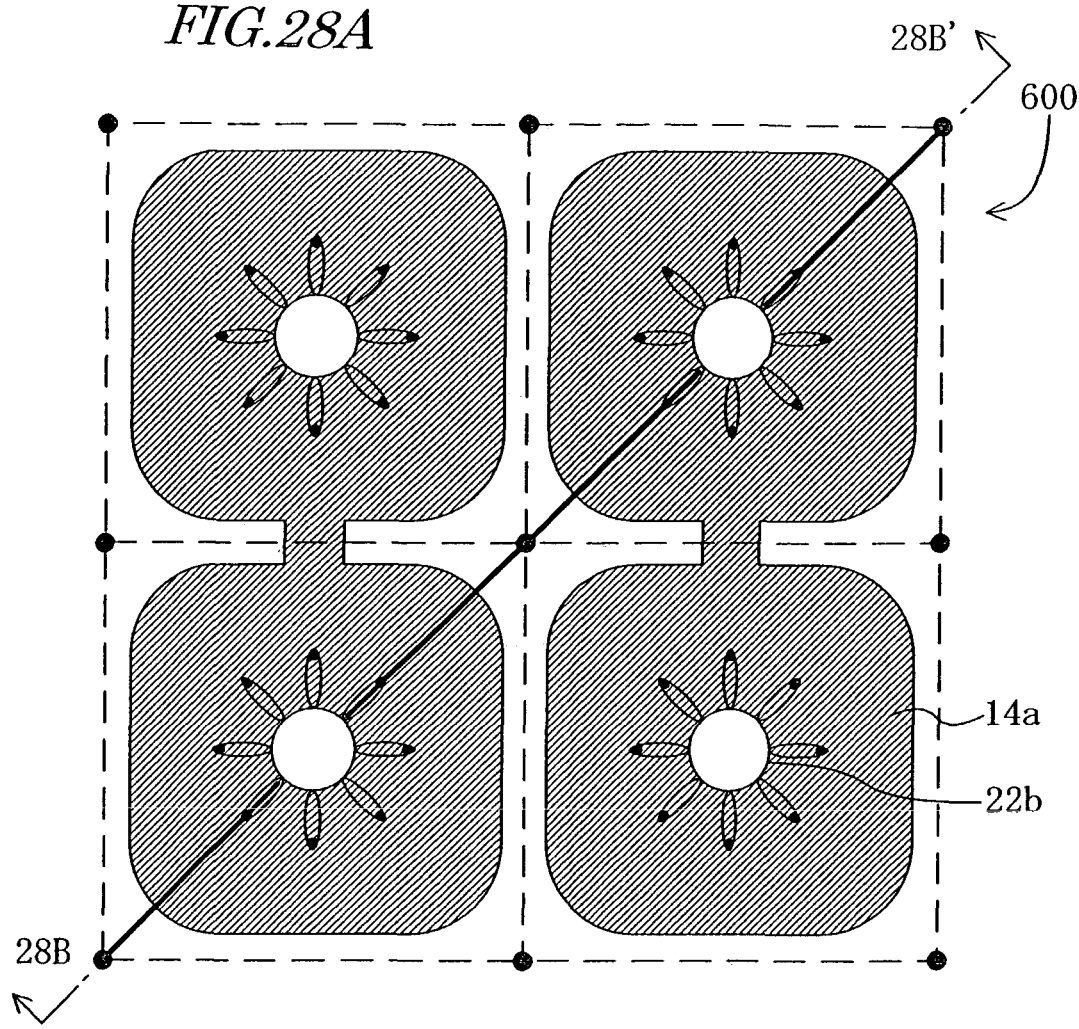
Figure 28B:
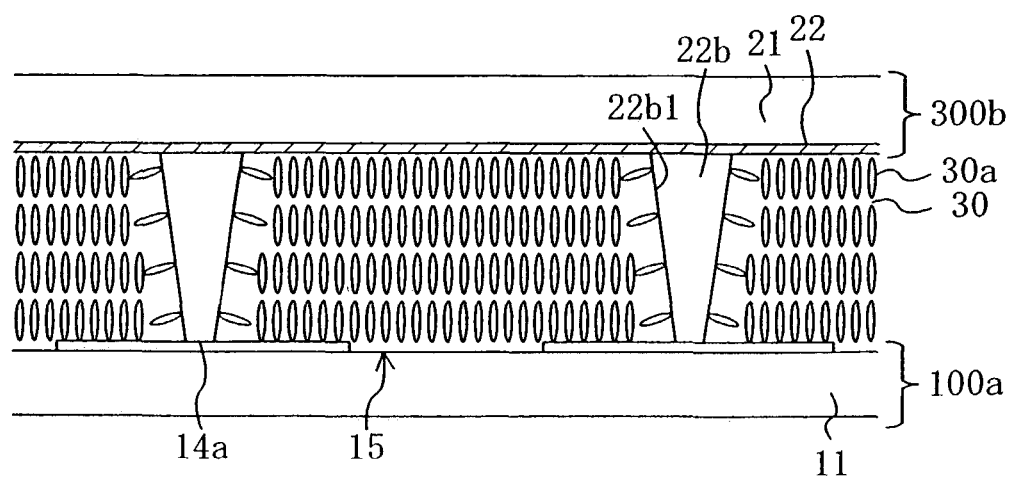

FIG. 28A and FIG. 28B schematically illustrate a liquid crystal display device 600 including a protrusion that functions as a spacer, wherein FIG. 28A is a plan view, and FIG. 28B is a cross-sectional view taken along line 28B-28B' of FIG. 28A.

Figure 29A:
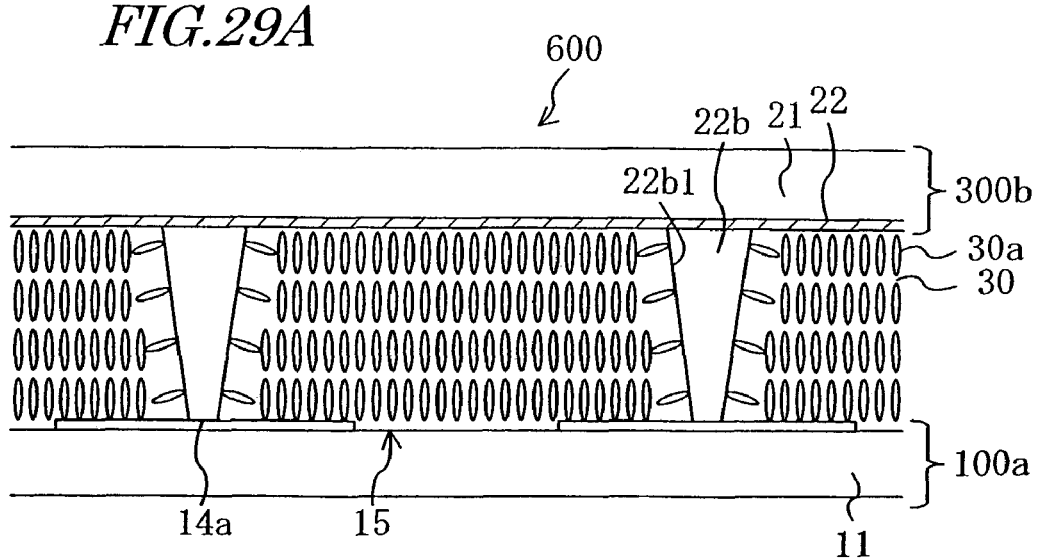
Figure 29B:
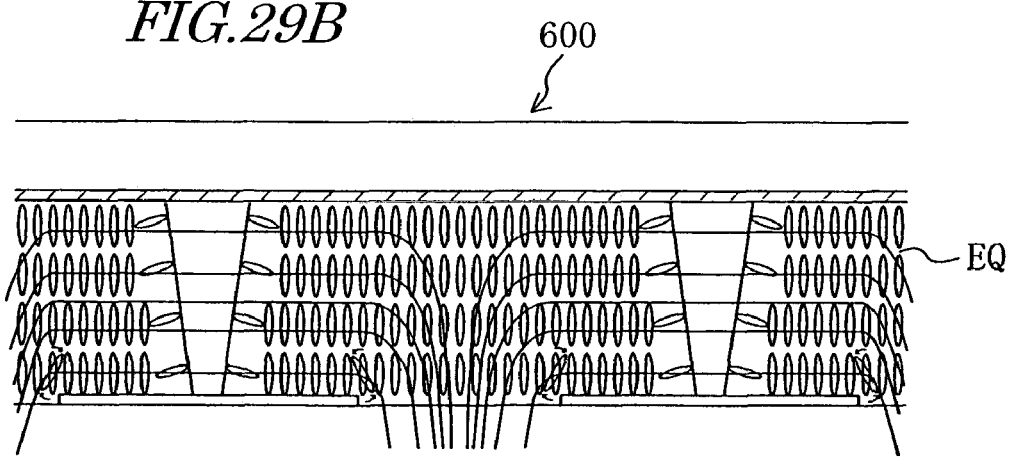
Figure 29C:
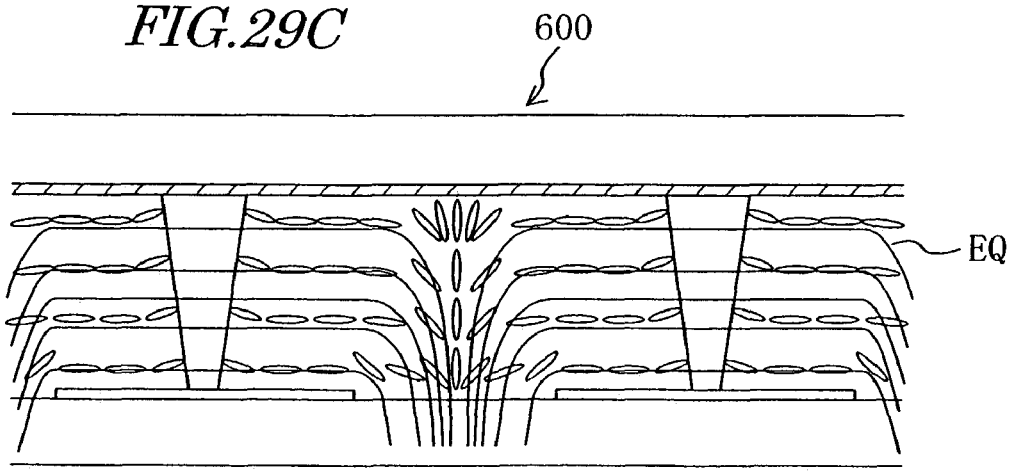

FIG. 29A to FIG. 29C are cross-sectional views schematically illustrating one picture element region of the liquid crystal display device 600, wherein FIG. 29A illustrates a state in the absence of an applied voltage, FIG. 29B illustrates a state where an orientation has just started to change (initial ON state), and FIG. 29C illustrates a steady state.

Figure 30:
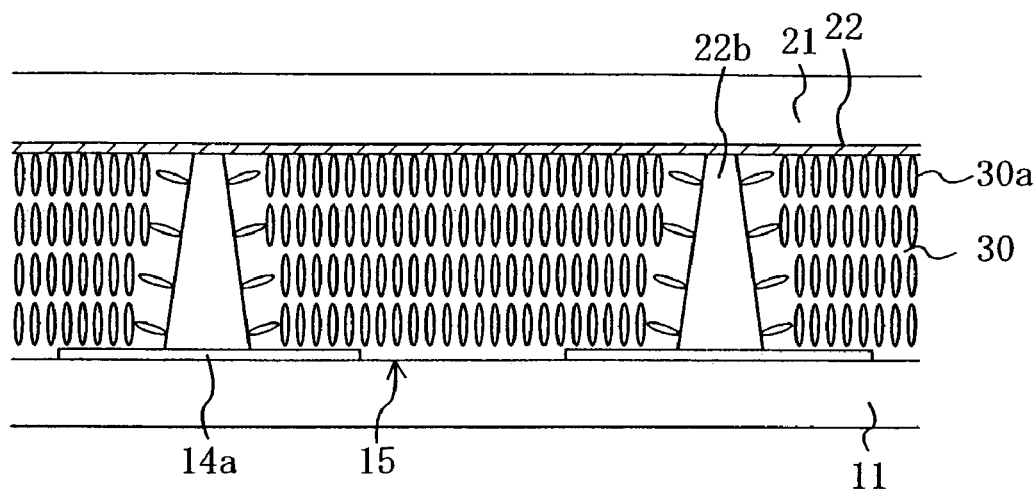

FIG. 30 is a cross-sectional view schematically illustrating a protrusion having a side surface whose inclination angle with respect to the substrate plane substantially exceeds 90°.

Figure 31:
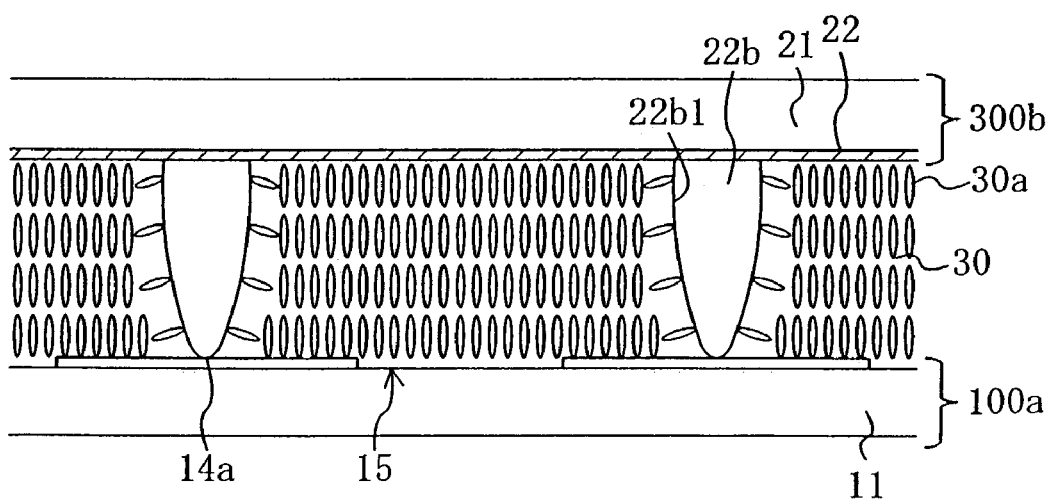

FIG. 31 is a cross-sectional view schematically illustrating a variation of a protrusion that functions as a spacer.

Figure 32:
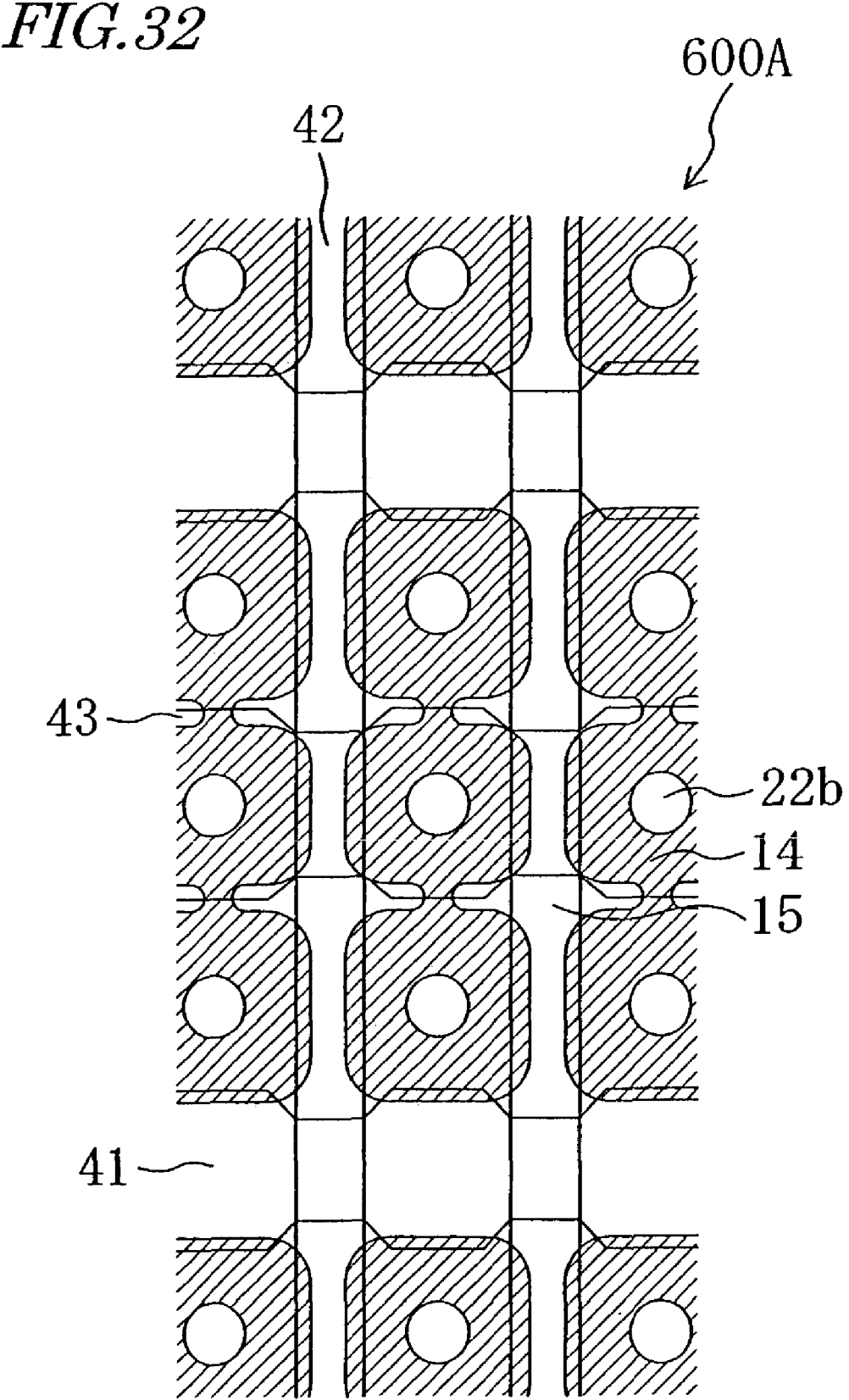

FIG. 32 is a plan view schematically illustrating still another liquid crystal display device 600A according to Embodiment 3 of the present invention.

Figure 33:
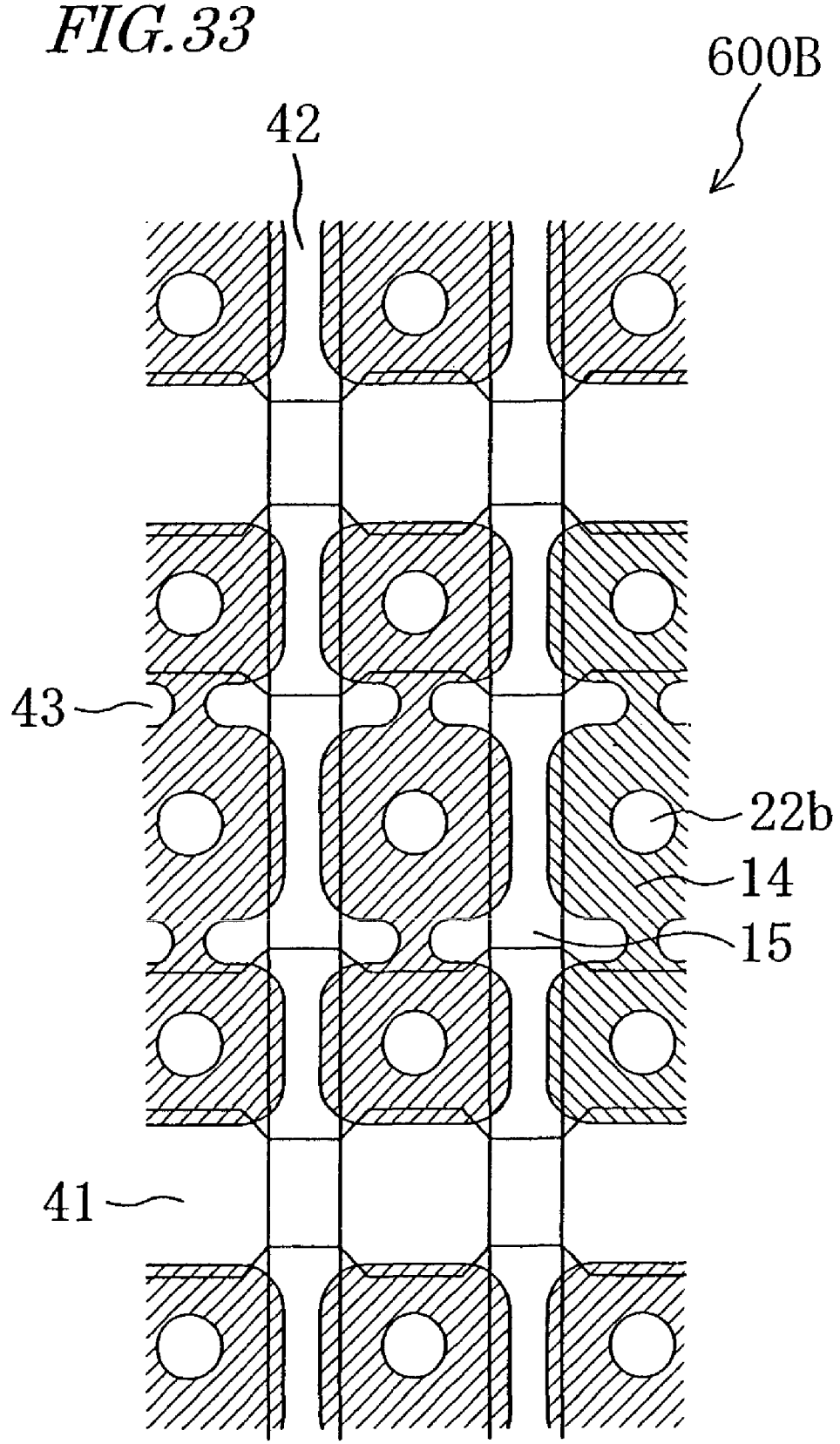

FIG. 33 is a plan view schematically illustrating still another liquid crystal display device 600B according to Embodiment 3 of the present invention.

Figure 34:
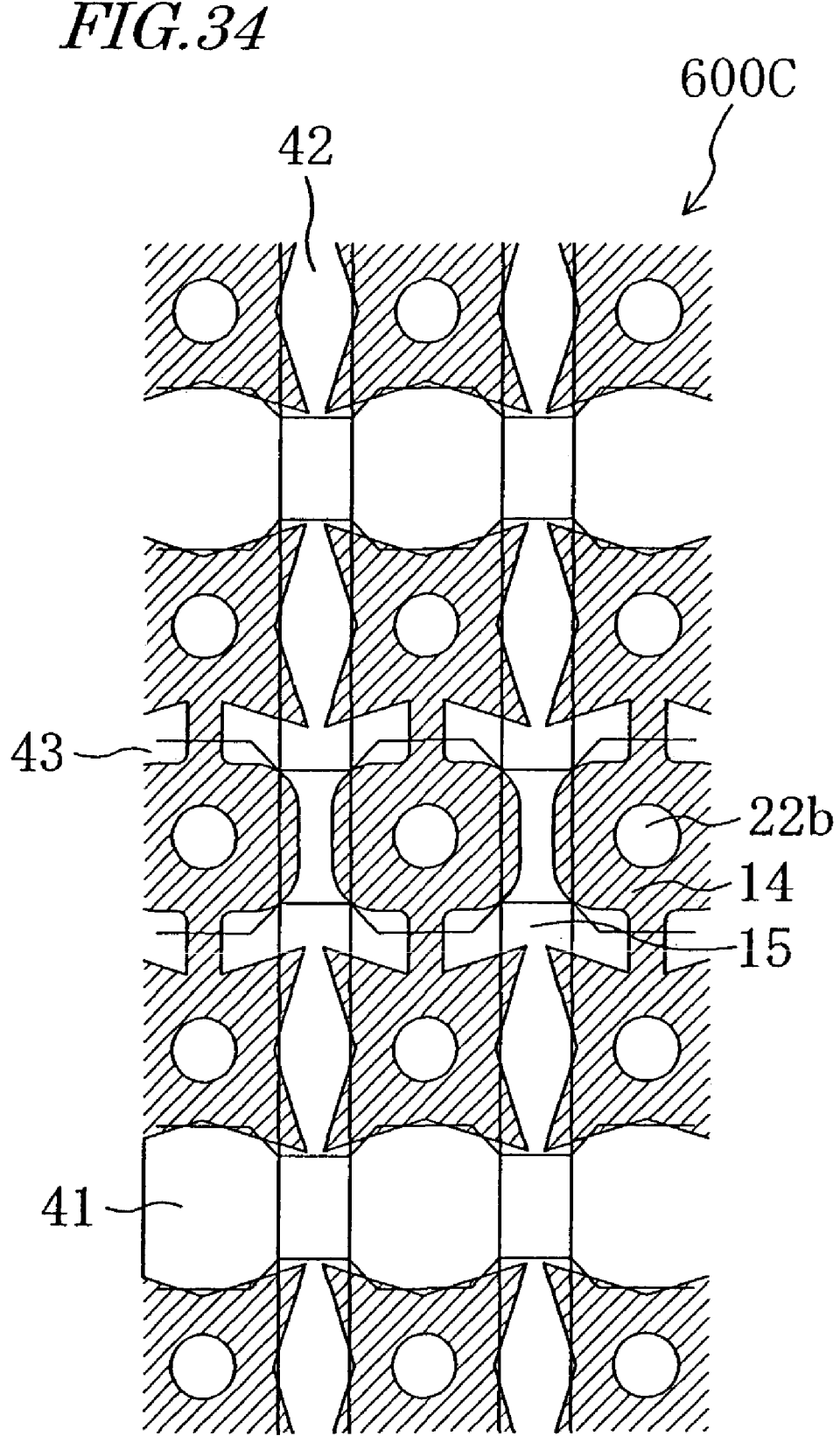

FIG. 34 is a plan view schematically illustrating still another liquid crystal display device 600C according to Embodiment 3 of the present invention.

DESCRIPTION OF THE PREFERRED EMBODIMENTS

Embodiments of the present invention will now be described with reference to the drawings.

Embodiment 1

First, the electrode structure of the liquid crystal display device of the present invention and the function thereof will be described. The liquid crystal display device of the present invention has desirable display characteristics and thus can be suitably used as an active matrix type liquid crystal display device. An embodiment of the present invention will now be described with respect to an active matrix type liquid crystal display device using thin film transistors (TFTs). The present invention is not limited thereto, but may alternatively be used with an active matrix type liquid crystal display device using an MIM structure. Moreover, while the embodiment of the present invention will be described with respect to a transmission type liquid crystal display device, the present invention is not limited thereto, but may alternatively be used with a reflection type liquid crystal display device or even a transmission-reflection liquid crystal display device to be described later.

Note that in the present specification, a region of a liquid crystal display device corresponding to a "picture element", which is the minimum unit of display, will be referred to as a "picture element region". In a color liquid crystal display device, R, G and B "picture elements" correspond to one "pixel". In an active matrix type liquid crystal display device, a picture element region is defined by a picture element electrode and a counter electrode opposing the picture element electrode. In a passive matrix type liquid crystal display device, a picture element region is defined as a region where one of column electrodes arranged in a stripe pattern crosses one of row electrodes also arranged in a stripe pattern perpendicular to the column electrodes. In an arrangement with a black matrix, strictly speaking, a picture element region is a portion of each region across which a voltage is applied according to the intended display state that corresponds to an opening of the black matrix.

Figure 1A:
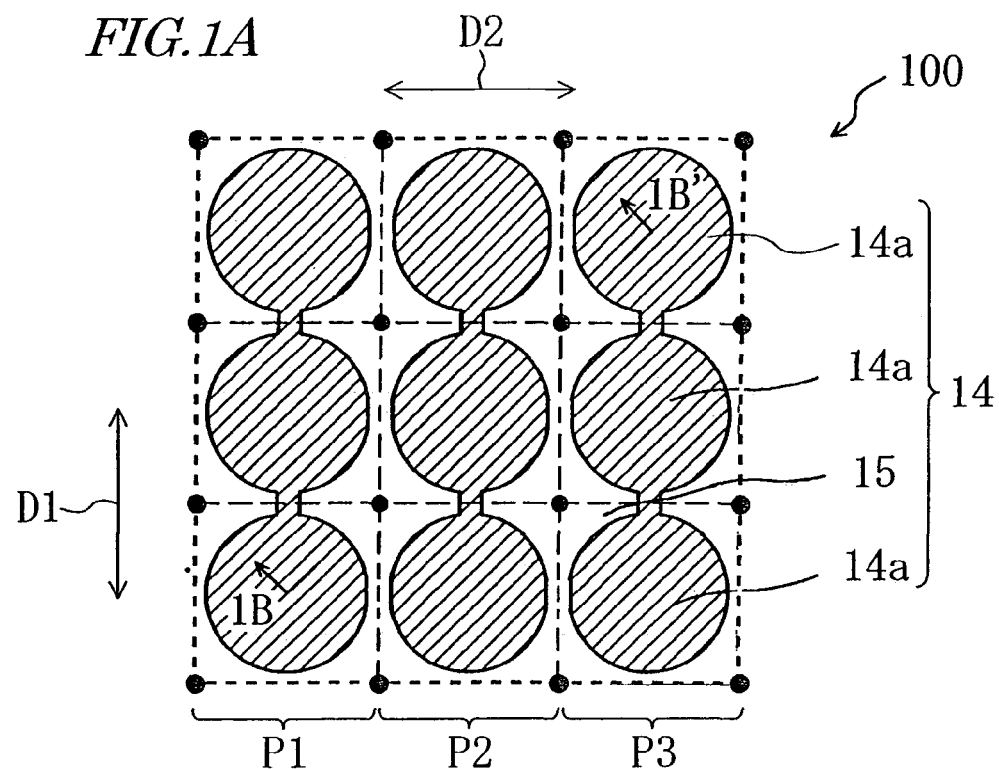
Figure 1B:
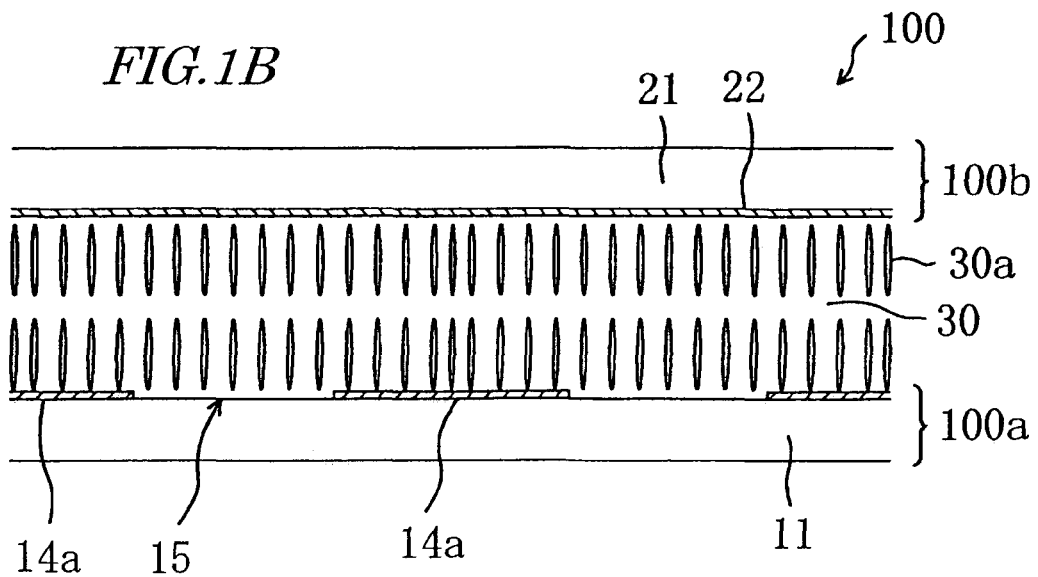

The structure of each of three picture element regions P1, P2 and P3 of a liquid crystal display device 100 according to Embodiment 1 of the present invention will be described with reference to FIG. 1A and FIG. 1B. In the following description, a color filter and a black matrix are omitted for the sake of simplicity. Moreover, in subsequent figures, each element having substantially the same function as the corresponding element in the liquid crystal display device 100 will be denoted by the same reference numeral and will not be further described below. FIG. 1A is a plan view as viewed in the substrate normal direction, and FIG. 1B is a cross-sectional view taken along line 1B-1B' of FIG. 1A. FIG. 1B illustrates a state where no voltage is applied across a liquid crystal layer.

The liquid crystal display device 100 includes an active matrix substrate (hereinafter referred to as a "TFT substrate") 100*a*, a counter substrate (referred to also as a "color filter substrate") 10*b*, and a liquid crystal layer 30 provided between the TFT substrate 100*a* and the counter substrate 100*b*. Liquid crystal molecules 30*a* of the liquid crystal layer 30 have a negative dielectric anisotropy, and are aligned vertical to the surface of a vertical alignment film (not shown), as illustrated in FIG. 1B, in the absence of an applied voltage across the liquid crystal layer 30 by virtue of the vertical alignment film, as a vertical alignment layer provided on one surface of each of the TFT substrate 100*a* and the counter substrate 100*b* that is closer to the liquid crystal layer 30. This state is described as the liquid crystal layer 30 being in a vertical alignment. Note, however, that the liquid crystal molecules 30*a* of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial direction") is oriented at an angle of about 85° or more with respect to the surface of the vertical alignment film.

The TFT substrate 100*a* of the liquid crystal display device 100 includes a transparent substrate (e.g., a glass substrate) 11 and a picture element electrode 14 provided on the surface of the transparent substrate 11. The counter substrate 100*b* includes a transparent substrate (e.g., a glass substrate) 21 and a counter electrode 22 provided on the surface of the transparent substrate 21. The orientation of the liquid crystal layer 30 changes for each picture element region according to the voltage applied between the picture element electrode 14 and the counter electrode 22, which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

The TFT substrate 100a includes therein a plurality of open regions 15 that do not overlap with the picture element electrode 14 made of a conductive film (e.g., an ITO film) (the picture element electrode 14 is not provided in the open regions 15).

The open regions 15 are arranged so that the respective centers thereof form a square lattice, and a portion 14a of the picture element electrode 14 is substantially surrounded by four open regions 15 whose respective centers are located at the four lattice points that form one unit lattice. The portion 14a of the picture element electrode 14 surrounded by the open regions 15 will be referred to as a "unit solid portion". Each solid portion of the picture element electrode 14 (the portion where the conductive film exists) includes a number of unit solid portions 14a. In other words, the picture element electrode 14 includes a plurality of unit solid portions 14a as sub-picture element electrodes. The plurality of unit solid portions 14a are basically made of a single continuous conductive film.

A plurality of picture element regions are arranged in a matrix pattern. Thus, the picture element regions are periodically arranged in the row direction and in the column direction perpendicular to the row direction. The row direction and the column direction will be referred to as "periodic arrangement directions" of picture elements (picture element regions). Typically, the row direction and the column direction are perpendicular to each other. Moreover, in the present embodiment, each picture element region (picture element) has a generally oblong rectangular shape with a long side and a short side. Therefore, the picture element regions are arranged at different pitches (referred to as "picture element pitches") in the row direction and in the column direction.

In one picture element region, a number of unit solid portions 14a of the picture element electrode 14 are arranged in a line in either one of the periodic arrangement directions. In the illustrated example, the unit solid portions 14a are arranged in a column direction D1 as illustrated in FIG. 1A, which shows three picture element regions P1, P2 and P3 that are adjacent to one another in a row direction D2.

In the illustrated example, the unit solid portion 14a has a generally circular shape. Each of the open regions 15 has a generally star shape having four quarter-arc-shaped sides (edges) with a four-fold rotation axis at the center among the four sides. Each open region 15 is typically continuous with at least some of the adjacent open regions 15.

The open regions 15 have substantially the same shape and substantially the same size. Each unit solid portion 14a located in a unit lattice formed by the open regions 15 has a generally circular shape. The unit solid portions 14a have substantially the same shape and substantially the same size. The unit solid portions 14a that are adjacent to one another in one picture element region are connected together to form a solid portion (the picture element electrode 14) that functions substantially as a single conductive film.

When a voltage is applied between the picture element electrode 14 having such a structure as described above and the counter electrode 22, an inclined electric field is produced around (near the periphery of) the unit solid portion 14a, i.e., at the edge portion of open region 15, thereby producing a plurality of liquid crystal domains each having a radially-inclined orientation. The liquid crystal domain is produced in each region corresponding to the open region 15 and in each region corresponding to the unit solid portion 14a.

Figure 2:
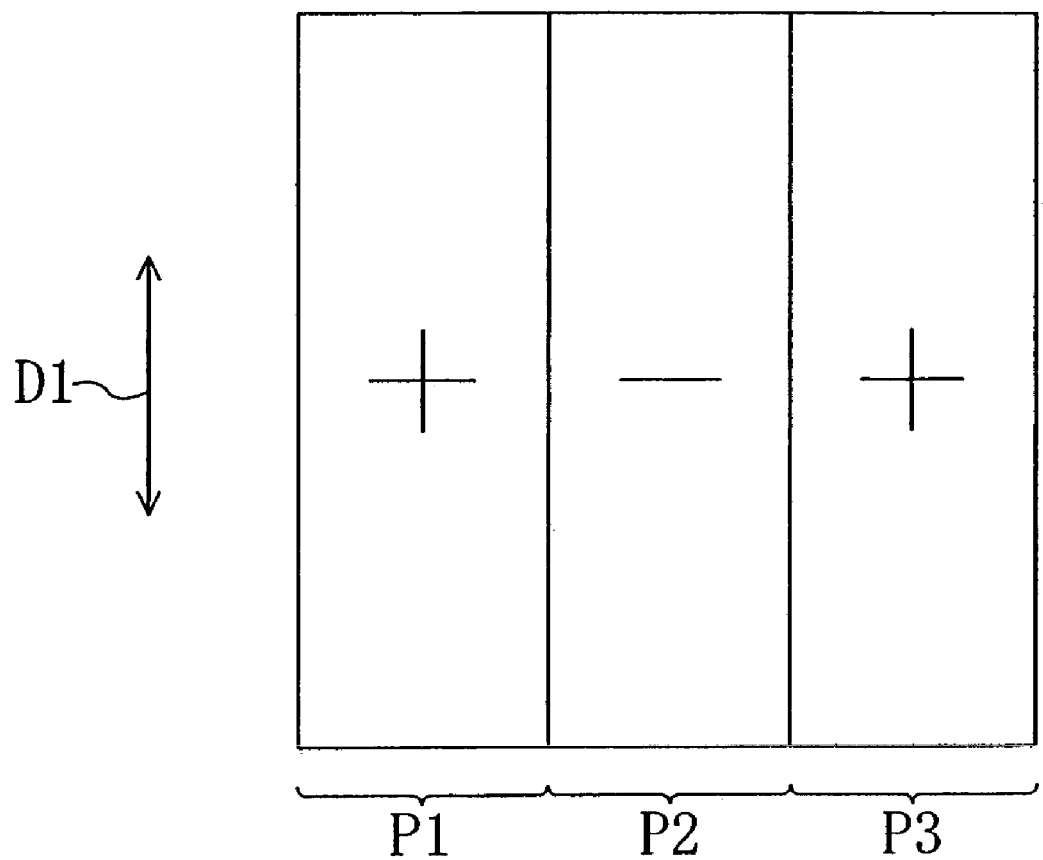
FIG. 2 schematically illustrates a state where voltages of different polarities are applied to picture element regions that are adjacent to each other in the row direction of the liquid crystal display device 100.

Note that in the present embodiment, picture elements that are adjacent to each other in the row direction D2 are driven with voltages of opposite polarities, as illustrated in FIG. 2, during a period in which data is written to all the picture elements (i.e., one frame). Referring to FIG. 2, a voltage of one polarity is applied across the liquid crystal layer 30 in the picture element regions P1 and P3 (picture element regions marked with "+" sign) while a voltage of a different (opposite) polarity is applied across the liquid crystal layer 30 in the picture element region P2 (a picture element region marked with "−" sign). In other words, in each frame, the polarity of the voltage applied across the liquid crystal layer 30 in one picture element region is different from that of the voltage applied across the liquid crystal layer 30 in another picture element region that is adjacent to the first picture element region in a direction (the row direction D2) perpendicular to the direction (the column direction D1) along which the unit solid portions 14a are arranged.

Figure 3A:
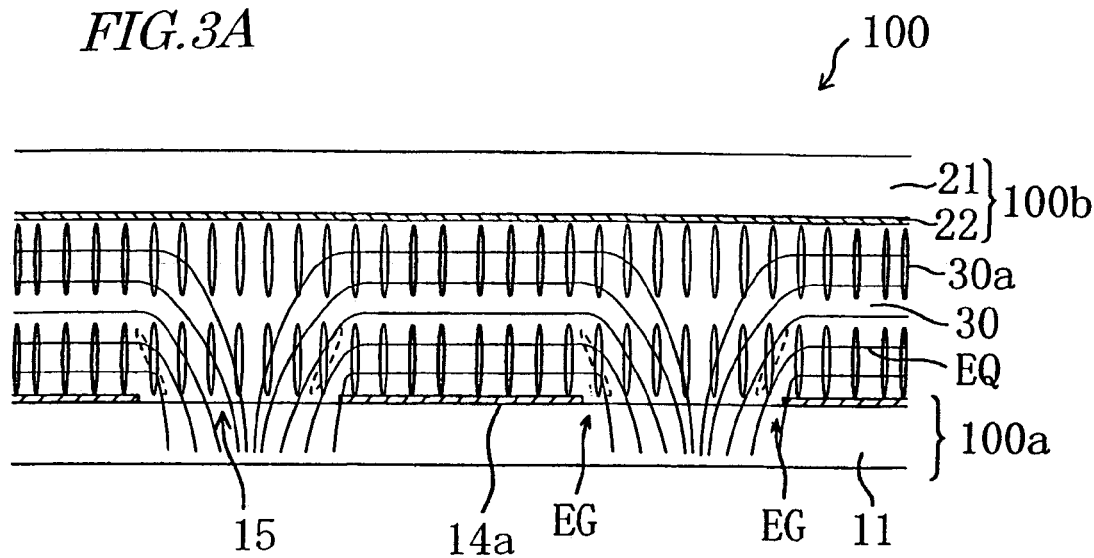
FIG. 3A and FIG. 3B illustrate a liquid crystal layer 30 of the liquid crystal display device 100 in the presence of an applied voltage thereacross, wherein FIG. 3A schematically illustrates a state where an orientation has just started to change (initial ON state), and FIG. 3B schematically illustrates a steady state.
Figure 3B:
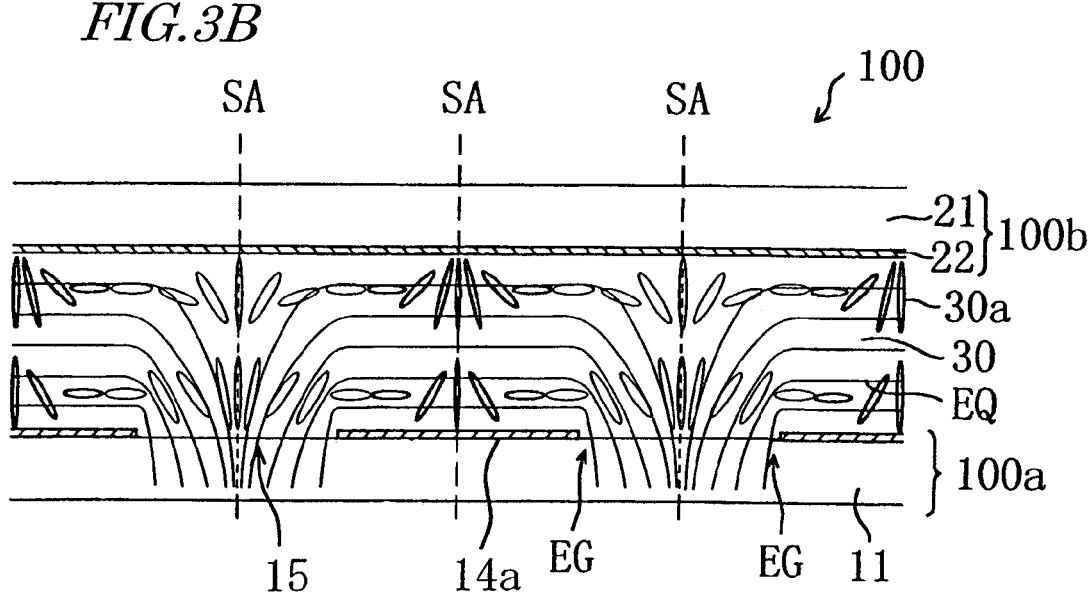

The mechanism by which liquid crystal domains are formed by an inclined electric field as described above will be described with reference to FIG. 3A and FIG. 3B. Each of FIG. 3A and FIG. 3B illustrates the liquid crystal layer 30 illustrated in FIG. 1B with a voltage being applied thereacross. FIG. 3A schematically illustrates a state where the orientation of the liquid crystal molecules 30a has just started to change (initial ON state) according to the voltage applied across the liquid crystal layer 30. FIG. 3B schematically illustrates a state where the orientation of the liquid crystal molecules 30a has changed and become steady according to the applied voltage. Curves EQ in FIG. 3A and FIG. 3B denote equipotential lines.

When the picture element electrode 14 and the counter electrode 22 are at the same potential (a state where no voltage is applied across the liquid crystal layer 30), the liquid crystal molecules 30a in each picture element region are aligned vertical to the surfaces of the substrates 11 and 21, as illustrated in FIG. 1B.

When a voltage is applied across the liquid crystal layer 30, a potential gradient represented by the equipotential lines EQ shown in FIG. 3A (perpendicular to the electric force line) is produced. The equipotential lines EQ are parallel to the surface of the unit solid portion 14a and the counter electrode 22 in the liquid crystal layer 30 located between the unit solid portion 14a of the picture element electrode 14 and the counter electrode 22, and drop in a region corresponding to the open region 15 of the picture element electrode 14. An inclined electric field represented by an inclined portion of the equipotential lines EQ is produced in the liquid crystal layer 30 above an edge portion EG of the open region 15 (the peripheral portion of and within the open region 15 including the boundary thereof). Note that in the present embodiment, two picture elements that are adjacent to each other in the row direction D2 are driven with voltages of opposite polarities, and thus the equipotential lines EQ drop sharply in the open region 15 located between these picture elements, whereby the equipotential lines EQ are not continuous across these picture elements.

A torque acts upon the liquid crystal molecules 30a having a negative dielectric anisotropy so as to direct the axial direction of the liquid crystal molecules 30a to be parallel to the equipotential lines EQ (perpendicular to the electric force line). Therefore, the liquid crystal molecules 30a above the right edge portion EG in FIG. 3A incline (rotate) clockwise and the liquid crystal molecules 30a above the left edge portion EG incline (rotate) counterclockwise as indicated by arrows in FIG. 3A. As a result, the liquid crystal molecules 30a above the edge portions EG are oriented parallel to the corresponding portions of the equipotential lines EQ.

Referring to FIG. 4A to FIG. 4D, the change in the orientation of the liquid crystal molecules 30a will now be described in greater detail.

Figure 4A:
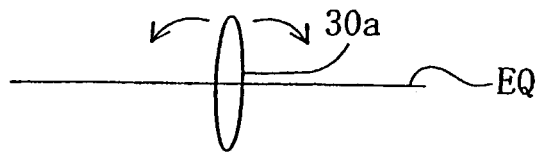

When an electric field is produced in the liquid crystal layer 30, a torque acts upon the liquid crystal molecules 30a having a negative dielectric anisotropy so as to direct the axial direction thereof to be parallel to an equipotential line EQ. As illustrated in FIG. 4A, when an electric field represented by an equipotential line EQ perpendicular to the axial direction of the liquid crystal molecule 30a is produced, either a torque urging the liquid crystal molecule 30a to incline clockwise or a torque urging the liquid crystal molecule 30a to incline counterclockwise occurs with the same probability. Therefore, the liquid crystal layer 30 between the pair of parallel plate-shape electrodes opposing each other has some liquid crystal molecules 30a that are subject to a clockwise torque and some other liquid crystal molecules 30a that are subject to a counterclockwise torque. As a result, the transition to the intended orientation according to the voltage applied across the liquid crystal layer 30 may not proceed smoothly.

Figure 4B:
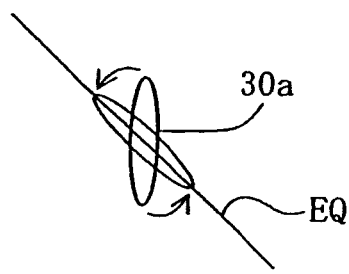
Figure 4C:
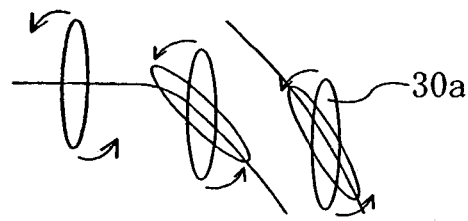
Figure 4D:
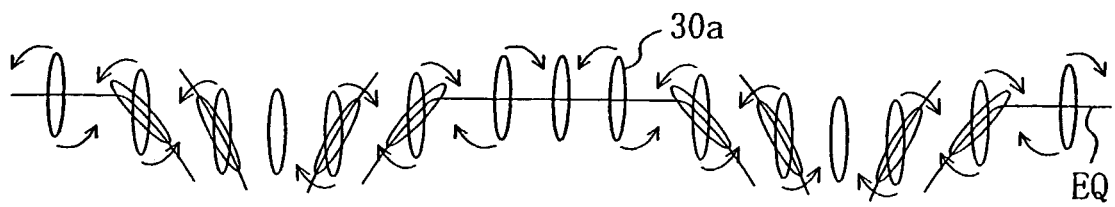

When an electric field represented by a portion of the equipotential lines EQ inclined with respect to the axial direction of the liquid crystal molecules 30a (an inclined electric field) is produced at the edge portion EG of the open region 15 of the liquid crystal display device 100 of the present invention, as illustrated in FIG. 3A, the liquid crystal molecules 30a incline in whichever direction (the counterclockwise direction in the illustrated example) that requires less rotation for the liquid crystal molecules 30a to be parallel to the equipotential line EQ, as illustrated in FIG. 4B. The liquid crystal molecules 30a in a region where an electric field represented by an equipotential line EQ perpendicular to the axial direction of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 4C. As illustrated in FIG. 4D, when an electric field such that the equipotential line EQ forms a continuous concave/convex pattern, the liquid crystal molecules 30a located on a flat portion of the equipotential line EQ are oriented so as to conform with the orientation direction defined by the liquid crystal molecules 30a located on adjacent inclined portions of the equipotential line EQ. The phrase "being located on an equipotential line EQ" as used herein means "being located within an electric field that is represented by the equipotential line EQ".

The change in the orientation of the liquid crystal molecules 30a, starting from those that are located on the inclined portion of the equipotential lines EQ, proceeds as described above and reaches a steady state, which is schematically illustrated in FIG. 3B. The liquid crystal molecules 30a located around the central portion of the open region 15 are influenced substantially equally by the respective orientations of the liquid crystal molecules 30a at the opposing edge portions EG of the open region 15, and therefore retain their orientation perpendicular to the equipotential lines EQ. The liquid crystal molecules 30a away from the center of the open region 15 incline by the influence of the orientation of other liquid crystal molecules 30a at the closer edge portion EG, thereby forming an inclined orientation that is symmetric about the center SA of the open region 15. The orientation as viewed in a direction perpendicular to the display plane of the liquid crystal display device 100 (a direction perpendicular to the surfaces of the substrates 11 and 21) is a state where the axial directions of the liquid crystal molecules 30a are oriented radially about the center of the open region 15 (not shown). In the present specification, such an orientation will be referred to as a "radially-inclined orientation". Moreover, a region of the liquid crystal layer 30 that takes a radially-inclined orientation about a single axis will be referred to as a "liquid crystal domain".

A liquid crystal domain in which the liquid crystal molecules 30a take a radially-inclined orientation is formed also in a region corresponding to the unit solid portion 14a substantially surrounded by the open regions 15. The liquid crystal molecules 30a in a region corresponding to the unit solid portion 14a are influenced by the orientation of the liquid crystal molecules 30a at each edge portion EG of the open region 15 so as to take a radially-inclined orientation that is symmetric about the center SA of the unit solid portion 14a (corresponding to the center of a unit lattice formed by the open regions 15).

The radially-inclined orientation in a liquid crystal domain formed in the unit solid portion 14a and the radially-inclined orientation formed in the open region 15 are continuous with each other, and are both in conformity with the orientation of the liquid crystal molecules 30a at the edge portion EG of the open region 15. The liquid crystal molecules 30a in the liquid crystal domain formed in the open region 15 are oriented in the shape of a cone that spreads upwardly (toward the substrate 100b), and the liquid crystal molecules 30a in the liquid crystal domain formed in the unit solid portion 14a are oriented in the shape of a cone that spreads downwardly (toward the substrate 100a). As described above, the radially-inclined orientation in a liquid crystal domain formed in the open region 15 and that in a liquid crystal domain formed in the unit solid portion 14a are continuous with each other. Therefore, no disclination line (orientation defect) is formed along the boundary therebetween, thereby preventing a decrease in the display quality due to occurrence of a disclination line.

Note that a sufficient voltage may not be applied across the liquid crystal layer 30 around the central portion of the open region 15, whereby the liquid crystal layer 30 around the central portion of the open region 15 does not contribute to the display. In other words, even if the radially-inclined orientation of the liquid crystal layer 30 around the central portion of the open region 15 is disturbed to some extent (e.g., even if the central axis is shifted from the center of the open region 15), the display quality may not be decreased. Therefore, as long as the liquid crystal domain is formed at least corresponding to a unit solid portion 14a, it is possible to obtain a continuity of the liquid crystal molecules in each picture element region and to realize a wide viewing angle characteristic and a high display quality.

In order to improve the viewing angle dependence, which is a display quality of a liquid crystal display device, in all azimuth angles, the existence probabilities of the liquid crystal molecules 30a oriented in various azimuth angle directions preferably have rotational symmetry, and more preferably have axial symmetry, in each picture element region. Therefore, it is preferred that the liquid crystal domains are arranged with a high degree of symmetry in each picture element region. In the present embodiment, the unit solid portions 14a are arranged in a line in a predetermined direction (the column direction D1) so as to have rotational symmetry and even axial symmetry. Therefore, the liquid crystal domains each corresponding to the unit solid portion 14a are also arranged with rotational symmetry and even axial symmetry.

As described above with reference to FIG. 3A and FIG. 3B, the picture element electrode 14 of the liquid crystal display device 100 of the present invention includes a plurality of unit solid portions 14a each surrounded by a plurality of open regions 15 and produces, in the liquid crystal layer 30 in the picture element region, an electric field represented by equipotential lines EQ having inclined portions. The liquid crystal molecules 30a having a negative dielectric anisotropy in the liquid crystal layer 30, which are in a vertical alignment in the absence of an applied voltage, change the orientation direction thereof, with the change in the orientation of those liquid crystal molecules 30a located on the inclined portion of the equipotential lines EQ serving as a trigger. Thus, a liquid crystal domain having a stable radially-inclined orientation is formed in the open region 15 and in the unit solid portion 14a. A display is produced by the change in the orientation of the liquid crystal molecules in the liquid crystal domain according to the voltage applied across the liquid crystal layer.

The shape (as viewed in the substrate normal direction) and arrangement of the unit solid portions 14a of the picture element electrode 14 of the liquid crystal display device 100 of the present embodiment and those of the open regions 15 of the TFT substrate 100a of the liquid crystal display device 100 will be described.

The display characteristics of a liquid crystal display device exhibit an azimuth angle dependence due to the orientation (optical anisotropy) of the liquid crystal molecules. In order to reduce the azimuth angle dependence of the display characteristics, it is preferred that the liquid crystal molecules are oriented in all azimuth angles with substantially the same probability. More preferably, the liquid crystal molecules in each picture element region are oriented in all azimuth angles with substantially the same probability.

Therefore, the unit solid portion 14a preferably has a shape such that liquid crystal domains are formed in each picture element region so that the liquid crystal molecules 30a in each liquid crystal domain corresponding to the unit solid portion 14a are oriented in all azimuth angles with substantially the same probability. More specifically, the shape of the unit solid portion 14a preferably has rotational symmetry (more preferably symmetry with at least a two-fold rotation axis) about a symmetry axis extending through the center of each unit solid portion (in the normal direction).

Moreover, since only a portion of the liquid crystal domain formed corresponding to the open region 15 is included in a picture element region and contributes to the display, it is preferred that the liquid crystal molecules included in a collection of liquid crystal domain portions (segments) that are included in a picture element region are oriented in all azimuth angles with substantially the same probability. Thus, it is preferred that the open regions 15 have a shape and an arrangement such that the liquid crystal domain segments together form a liquid crystal domain in a complementary manner. Specifically, it is preferred that the shape of the open region 15 has rotational symmetry and that the open regions 15 are arranged so as to have rotational symmetry. Note that since the liquid crystal domain formed in the open region 15 has a portion thereof located outside a picture element region, it may be difficult to arrange the open regions 15 so that the liquid crystal domain segments together form a liquid crystal domain in a complementary manner. Nevertheless, it is possible to sufficiently reduce the azimuth angle dependence of the display characteristics as long as the existence probabilities of the liquid crystal molecules oriented in various azimuth angles have rotational symmetry (more preferably axial symmetry) for each collection of liquid crystal domain segments.

The orientation of the liquid crystal molecules 30a when the generally star-shaped open regions 15 surrounding the generally circular unit solid portions 14a are arranged in a square lattice pattern, as illustrated in FIG. 1A, will be described with reference to FIG. 5A to FIG. 5C.

Each of FIG. 5A to FIG. 5C schematically illustrates an orientation of the liquid crystal molecules 30a as viewed in the substrate normal direction. In figures, such as FIG. 5B and FIG. 5C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the picture element electrode 14 is provided. This similarly applies to all of the subsequent figures. A single unit lattice (formed by four open regions 15) in the picture element region illustrated in FIG. 1A will be described below. Cross-sectional views taken along the respective diagonals of FIG. 5A to FIG. 5C correspond to FIG. 1B, FIG. 3A and FIG. 3B, respectively, and FIG. 1B, FIG. 3A and FIG. 3B will also be referred to in the following description.

When the picture element electrode 14 and the counter electrode 22 are at the same potential, i.e., in a state where no voltage is applied across the liquid crystal layer 30, the liquid crystal molecules 30a whose orientation direction is regulated by the vertical alignment layer (not shown) provided on one side of each of the TFT substrate 100a and the counter substrate 100b that is closer to the liquid crystal layer 30 take a vertical alignment as illustrated in FIG. 5A.

When an electric field is applied across the liquid crystal layer 30 so as to produce an electric field represented by equipotential lines EQ shown in FIG. 3A, a torque acts upon the liquid crystal molecules 30a having a negative dielectric anisotropy so as to direct the axial direction thereof to be parallel to the equipotential lines EQ. As described above with reference to FIG. 4A and FIG. 4B, for the liquid crystal molecules 30a under an electric field represented by equipotential lines EQ perpendicular to the molecular axis thereof, the direction in which the liquid crystal molecules 30a are to incline (rotate) is not uniquely defined (FIG. 4A), whereby the orientation change (inclination or rotation) does not easily occur. In contrast, for the liquid crystal molecules 30a placed under equipotential lines EQ inclined with respect to the molecular axis of the liquid crystal molecules 30a, the direction of inclination (rotation) is uniquely defined, whereby the orientation change easily occurs. Therefore, as illustrated in FIG. 5B, the liquid crystal molecules 30a start inclining from the edge portion of the open region 15 where the molecular axis of the liquid crystal molecules 30a is inclined with respect to the equipotential lines EQ. Then, the surrounding liquid crystal molecules 30a incline so as to conform with the orientation of the already-inclined liquid crystal molecules 30a at the edge portion of the open region 15, as described above with reference to FIG. 4C. Then, the axial direction of the liquid crystal molecules 30a becomes stable as illustrated in FIG. 5C (radially-inclined orientation).

As described above, when the shape of the open region 15 has rotational symmetry, the liquid crystal molecules 30a in the picture element region successively incline, starting from the edge portion of the open region 15 toward the center of the open region 15 upon application of a voltage. As a result, there is obtained an orientation in which those liquid crystal molecules 30a around the center of the open region 15, where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the open region 15, with the degree of inclination gradually increasing away from the center of the open region 15.

The liquid crystal molecules 30a in a region corresponding to the generally circular unit solid portion 14a surrounded by the four generally star-shaped open regions 15 arranged in a square lattice pattern also incline so as to conform with the orientation of the liquid crystal molecules 30a that have been inclined by an inclined electric field produced at the edge portion of each open region 15. As a result, there is obtained an orientation in which those liquid crystal molecules 30a around the center of the unit solid portion 14a, where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the unit solid portion 14a, with the degree of inclination gradually increasing away from the center of the unit solid portion 14a.

As described above, when liquid crystal domains in each of which the liquid crystal molecules 30a take a radially-inclined orientation are arranged in a square lattice pattern, the existence probabilities of the liquid crystal molecules 30a of the respective axial directions have rotational symmetry, whereby it is possible to realize a high-quality display without non-uniformity for any viewing angle. In order to reduce the viewing angle dependence of a liquid crystal domain having a radially-inclined orientation, the liquid crystal domain preferably has a high degree of rotational symmetry (preferably with at least a two-fold rotation axis, and more preferably with at least a four-fold rotation axis).

For the radially-inclined orientation of the liquid crystal molecules 30a, a radially-inclined orientation having a counterclockwise or clockwise spiral pattern as illustrated in FIG. 6B or FIG. 6C, respectively, is more stable than the simple radially-inclined orientation as illustrated in FIG. 6A. The spiral orientation is different from a normal twist orientation (in which the orientation direction of the liquid crystal molecules 30a spirally changes along the thickness of the liquid crystal layer 30). In the spiral orientation, the orientation direction of the liquid crystal molecules 30a does not substantially change along the thickness of the liquid crystal layer 30 for a minute region. In other words, the orientation in a cross section (in a plane parallel to the layer plane) at any thickness of the liquid crystal layer 30 is as illustrated in FIG. 6B or FIG. 6C, with substantially no twist deformation along the thickness of the liquid crystal layer 30. For a liquid crystal domain as a whole, however, there may be a certain degree of twist deformation.

When a material obtained by adding a chiral agent to a nematic liquid crystal material having a negative dielectric anisotropy is used, the liquid crystal molecules 30a take a radially-inclined orientation of a counterclockwise or clockwise spiral pattern about the open region 15 and the unit solid portion 14a, as illustrated in FIG. 6B or FIG. 6C, respectively, in the presence of an applied voltage. Whether the spiral pattern is counterclockwise or clockwise is determined by the type of chiral agent used. Thus, by controlling the liquid crystal layer 30 in the open region 15 into a radially-inclined orientation of a spiral pattern in the presence of an applied voltage, the direction of the spiral pattern of the radially-inclined liquid crystal molecules 30a about other liquid crystal molecules 30a standing vertical to the substrate plane can be constant in all liquid crystal domains, whereby it is possible to realize a uniform display without display non-uniformity. Since the direction of the spiral pattern around the liquid crystal molecules 30a standing vertical to the substrate plane is definite, the response speed upon application of a voltage across the liquid crystal layer 30 is also improved.

Moreover, when a large amount of a chiral agent is added, the orientation of the liquid crystal molecules 30a changes in a spiral pattern along the thickness of the liquid crystal layer 30 as in a normal twist orientation. In an orientation where the orientation of the liquid crystal molecules 30a does not change in a spiral pattern along the thickness of the liquid crystal layer 30, the liquid crystal molecules 30a which are oriented perpendicular or parallel to the polarization axis of the polarization plate do not give a phase difference to the incident light, whereby incident light passing through a region of such an orientation does not contribute to the transmittance. In contrast, in an orientation where the orientation of the liquid crystal molecules 30a changes in a spiral pattern along the thickness of the liquid crystal layer 30, the liquid crystal molecules 30a that are oriented perpendicular or parallel to the polarization axis of the polarization plate also give a phase difference to the incident light, and the optical rotatory power can also be utilized, whereby incident light passing through a region of such an orientation also contributes to the transmittance. Thus, it is possible to obtain a liquid crystal display device capable of producing a bright display.

FIG. 1A illustrates an example in which each unit solid portion 14a has a generally circular shape and each open region 15 has a generally star shape, wherein such unit solid portions 14a and such open regions 15 are arranged in a square lattice pattern. However, the shape of the unit solid portions 14a and the shape and arrangement of the open regions 15 are not limited to those of the example above.

FIG. 7A and FIG. 7B are plan views respectively illustrating the liquid crystal display devices 100A and 100B having respective open regions 15 and unit solid portions 14a of different shapes.

The open regions 15 and the unit solid portions 14a of the liquid crystal display devices 100A and 100B illustrated in FIG. 7A and FIG. 7B, respectively, are slightly distorted from those of the liquid crystal display device 100 illustrated in FIG. 1A. The open regions 15 and the unit solid portions 14a of the liquid crystal display devices 100A and 100B have a twofold rotation axis (not a four-fold rotation axis) and are regularly arranged so as to form oblong rectangular unit lattices. In both of the liquid crystal display devices 100A and 100B, the open region 15 has a distorted star shape, and the unit solid portion 14a has a generally elliptical shape (a distorted circular shape). The liquid crystal display devices 100A and 100B illustrated in FIG. 7A and FIG. 7B also have a high display quality and desirable viewing angle characteristic.

Moreover, liquid crystal display devices 100C and 100D as illustrated in FIG. 8A and FIG. 8B, respectively, also have a high display quality and desirable viewing angle characteristic.

In the liquid crystal display devices 100C and 100D, generally cross-shaped open regions 15 are arranged in a square lattice pattern so that each unit solid portion 14a has a generally square shape. Of course, these patterns may be distorted so that there are oblong rectangular unit lattices. As described above, it is possible to obtain a liquid crystal display device having a high display quality and a desirable viewing angle characteristic alternatively by regularly arranging the generally rectangular (including a square and oblong rectangle) unit solid portions 14a.

However, the shape of the open region 15 and/or the unit solid portion 14a is preferably a circle or an ellipse, rather than a rectangle, so that a radially-inclined orientation is more stable. It is believed that a radially-inclined orientation is more stable with a circular or elliptical opening and/or unit solid portion because the edge of the open region 15 is more continuous (smooth), whereby the orientation direction of the liquid crystal molecules 30a changes more continuously (smoothly).

In view of the continuity of the orientation direction of the liquid crystal molecules 30a described above, a liquid crystal display device 100E as illustrated in FIG. 9 is also desirable. The liquid crystal display device 100E illustrated in FIG. 9 is a variation of the liquid crystal display device 100D illustrated in FIG. 8B in which each side of the open region 15 on the unit solid portion 14a is an arc. In the liquid crystal display device 10E, the open regions 15 and the unit solid portions 14a have a four-fold rotation axis and are arranged in a square lattice pattern (having a four-fold rotation axis). Alternatively, the shape of the unit solid portion 14a of the open region 15 may be distorted into a shape having a two-fold rotation axis, and such unit solid portions 14a may be arranged so as to form oblong rectangular lattices (having a two-fold rotation axis), as illustrated in FIG. 7A and FIG. 7B.

The voltage applied through a liquid crystal domain formed in the open region 15 is lower than the voltage applied through another liquid crystal domain formed in the unit solid portion 14a. As a result, in a normally black mode display, for example, the liquid crystal domain formed in the open region 15 appears darker. Therefore, it is preferred that the area ratio of the unit solid portion 14a in a picture element region is high while that of the open region 15 is low.

In the liquid crystal display device of the present invention, the picture element electrode 14 includes a plurality of unit solid portions 14a, whereby it is possible to realize a stable radially-inclined orientation in a picture element region, without being restricted by the shape and size, etc., of the picture element region, by appropriately arranging the plurality of unit solid portions 14a in the picture element region according to the shape and size, etc., of the picture element region. In contrast, if the picture element electrode includes only one unit solid portion, it may not be possible to realize a stable radially-inclined orientation depending on the shape and size, etc., of the picture element region. The picture element electrode including only one unit solid portion is not a problem if the picture element region has a circular or square shape. However, if the picture element region has an oblong rectangular shape with a large aspect ratio as in a liquid crystal display device capable of producing a color display, for example, the unit solid portion needs to have a shape with a large aspect ratio, and it may not be possible to realize a stable radially-inclined orientation. Moreover, when the picture element region has a large size, for example, the unit solid portion needs to have a large size, in which case a stable orientation may not be obtained only by the inclined electric field produced around the unit solid portion.

Moreover, in the liquid crystal display device of the present invention, a plurality of unit solid portions 14a are arranged (in a line) in a predetermined direction in each picture element region, as illustrated in FIG. 1A, for example, whereby it is possible to increase the area ratio of the unit solid portion 14a and to increase the proportion of the area that contributes to the display with respect to the total area of the picture element region (effective aperture ratio), as compared with a case where the unit solid portions are arranged in two or more lines. The reason for this will be described with reference to FIG. 10.

As illustrated in FIG. 10, the liquid crystal display device 100E includes gate bus lines (scanning lines) 41 extending parallel to one another in the row direction D2, and source bus lines (signal lines) 42 extending parallel to one another in the column direction D1. Each gate bus line (scanning line) 41 is electrically connected to the gate electrode of a TFT (not shown) provided for each picture element region, and each source bus line (signal line) 42 is electrically connected to the source electrode of the TFT. Moreover, the drain electrode of the TFT is electrically connected to the picture element electrode 14. The liquid crystal display device 100E further includes a storage capacitance line 43.

In the liquid crystal display device 100E, a number of unit solid portions 14a are arranged in a line in each picture element region, and a portion of the open region 15 surrounding the unit solid portions 14a overlaps with the gate bus line 41 or the source bus line 42 and such a portion is located outside the picture element region. Thus, each of the plurality of open regions 15 has at least a portion thereof that is located outside the picture element region.

When a plurality of unit solid portions 14a are arranged in two or more lines, there exists an open region 15 that is surrounded by the unit solid portions 14a in each picture element region, and such an open region 15 is entirely located within the picture element region. For example, in a liquid crystal display device 1000 of a comparative example in which the unit solid portions 14a are arranged in two lines, as illustrated in FIG. 11, there exists an open region 15 that is surrounded by the unit solid portions 14a in each picture element region, and such an open region 15 is entirely located within the picture element region. Then, the area ratio of the open region 15 in the picture element region increases, thus decreasing the area ratio of the unit solid portion 14a.

In contrast, when a plurality of unit solid portions 14a are arranged in a line in each picture element region, as illustrated in FIG. 10, each of the plurality of open regions 15 has at least a portion thereof that is located outside the picture element region, whereby it is possible to reduce the area ratio of the open region 15 in the picture element region and to increase the area ratio of the unit solid portion 14a, and thus to improve the aperture ratio.

Now, how the aperture ratio can be improved will be described in greater detail with reference to data obtained by using a liquid crystal display device of particular specifications. The specifications of the liquid crystal display device were as follows: the display area was 15 inches long diagonally, the unit solid portion 14a had a generally square shape with generally arc-shaped corner portions (as illustrated in FIG. 9 and FIG. 10), the width of the gate bus line and the width of the light blocking layer on the source bus line were 12 µm, and the interval between the unit solid portions 14a was 8.5 µm. The transmittance of the liquid crystal display device when the unit solid portions 14a were arranged in a line was compared with that when the unit solid portions 14a were arranged in two lines. The transmittance when the unit solid portions 14a were arranged in a line was improved, as compared with that when the unit solid portions 14a were arranged in two lines, by 6% for SXGA (1280×1024 pixels), 9% for UXGA (1600×1200 pixels), and 11% for QXGA (2048×1536 pixels). Thus, the effect of improving the aperture ratio by arranging a plurality of unit solid portions 14a in a line in each picture element region is particularly significant for high definition type liquid crystal display devices.

Note that in a structure where the picture element electrode 14 overlaps with the gate bus line 41 or the source bus line 42 as illustrated in FIG. 10, it is preferred that an insulative film (e.g., an organic insulative film) is formed to be as thick as possible on the bus lines, and the picture element electrode 14 is formed thereon, in order to reduce the influence from these bus lines.

Referring to FIG. 12, "S" denotes the length of the gap between the square unit lattice formed by the open regions 15 and the unit solid portion 14a (hereinafter referred to as the "side spacing S"). The side spacing S needs to be equal to or greater than a predetermined length in order to produce an inclined electric field that is required for obtaining a stable radially-inclined orientation.

While the side spacing S is defined both in the row direction D2 and in the column direction D1, in the present embodiment, picture elements that are adjacent to each other along the row direction D2 are driven with voltages of opposite polarities in each frame as illustrated in FIG. 2. In this way, as compared with a case where picture elements that are adjacent to each other along the row direction D2 are not driven with voltages of opposite polarities, it is possible to obtain a sufficient orientation-regulating force even if the side spacing S in the row direction D2 is reduced. This is because a relatively strong inclined electric field can be produced when picture elements that are adjacent to each other along the row direction D2 are driven with voltages of opposite polarities. The reason for this will be described with reference to FIG. 13A and FIG. 13B.

FIG. 13A schematically illustrates equipotential lines EQ produced when a voltage of +5 V is applied across the liquid crystal layer in both of two picture element regions that are adjacent to each other in the row direction D2, and FIG. 13B schematically illustrates equipotential lines EQ produced when a voltage of +5 V is applied across the liquid crystal layer in one of two picture element regions that are adjacent to each other in the row direction D2 while applying a voltage of −5 V across the liquid crystal layer in the other one of the two picture element regions.

As illustrated in FIG. 13A, when voltages of the same polarity are applied across the liquid crystal layer in two adjacent picture element regions, there is produced an electric field such that the equipotential line EQ forms a continuous concave/convex pattern.

In contrast, as illustrated in FIG. 13B, when voltages of opposite polarities are applied across the liquid crystal layer in two adjacent picture element regions, the equipotential lines EQ representing the electric fields produced in the two picture element regions are not continuous, but the equipotential lines EQ drop sharply in the open region 15. Therefore, at the edge portion of the open region 15, i.e., around the unit solid portion 14a, a sharp potential gradient is formed, thereby producing an inclined electric field of a greater strength than that in the case as illustrated in FIG. 13A.

As described above, when picture elements that are adjacent to each other in the row direction D2 are driven with voltages of opposite polarities, it is possible to obtain a sufficient orientation-regulating force even if the side spacing S in the row direction D2 is reduced. Thus, it is possible to form a sufficiently stable radially-inclined orientation even when the distance between two picture element electrodes 14 that are adjacent to each other in the row direction D2 is reduced so as to increase the aperture ratio.

Further experiments were conducted with the liquid crystal display device having particular specifications as shown above (the liquid crystal display device in which the display area was 15 inches long diagonally, the unit solid portion 14a had a generally square shape with generally arc-shaped corner portions, the width of the gate bus line and the width of the light blocking layer on the source bus line were 12 µm, and the interval between the unit solid portions 14a was 8.5 µm). Specifically, a comparison was made between a case where picture elements that are adjacent to each other in the row direction D2 were driven with voltages of opposite polarities, and a case where they were not driven with voltages of opposite polarities. In a case where picture elements that are adjacent to each other in the row direction D2 were not driven with voltages of opposite polarities, the minimum distance between the picture element electrodes 14 required for realizing a stable radially-inclined orientation was 8.5 µm, i.e., equal to the distance between the unit solid portions 14a in each picture element region. In contrast, in a case where picture elements that are adjacent to each other in the row direction D2 were driven with voltages of opposite polarities, it was possible to obtain a stable radially-inclined orientation even if the distance between picture element electrodes 14 that are adjacent to each other in the row direction D2 was reduced to 3 µm.

In the present embodiment, the aperture ratio can sufficiently be improved when picture elements that are adjacent to each other in the row direction D2 are driven with voltages of opposite polarities, while picture elements that are adjacent to each other in the column direction D1 are not driven with voltages of opposite polarities as illustrated in FIG. 14A (so-called "source line reversal drive scheme"). Nevertheless, in order to gain other advantageous effects such as the effect of suppressing flicker, it is preferred that the polarity of the applied voltage is reversed for every n rows (where n is an integer of 1 or more) of picture elements, i.e., for every n picture elements in the column direction D1, while driving picture elements that are adjacent to each other in the row direction D2 with voltages of opposite polarities. In other words, it is preferred that the polarity of the voltage applied across the liquid crystal layer in picture element regions of the same column is reversed for every n rows in each frame.

For example, as illustrated in FIG. 14B, the polarity of the applied voltage may be reversed for every 2 rows of picture elements, i.e., for every 2 picture elements in the column direction D1 (so-called "2H dot reversal drive scheme"). Alternatively, as illustrated in FIG. 14C, the polarity of the applied voltage may be reversed for every row of picture elements, i.e., for every picture element in the column direction D1 (so-called "dot reversal drive scheme"). If picture elements that are adjacent to each other in the column direction D1 are driven with voltages of opposite polarities while picture elements that are adjacent to each other in the row direction D2 are driven with voltages of opposite polarities, as illustrated in FIG. 14C, it is possible to reduce the interval between picture element electrodes 14 that are adjacent to each other in the column direction D1 and thus to further improve the aperture ratio.

Now, the relationship between the shape of the unit solid portion 14a and the stability of a radially-inclined orientation and the relationship between the shape of the unit solid portion 14a and the transmittance value will be described.

A research by the present inventors revealed that with the spacing of the unit solid portion 14a (the side spacing S) being constant, the orientation stability is higher as the shape of the unit solid portion 14a is closer to a circle or an ellipse. This is because as the shape of the unit solid portion 14a is closer to a circle or an ellipse, the continuity in the orientation direction of the liquid crystal molecules 30a in a radially-inclined orientation is higher.

It was also revealed that the transmittance is higher as the shape of the unit solid portion 14a is closer to a rectangle such as a square or an oblong rectangle. This is because with the value of the side spacing S being constant, as the shape of the unit solid portion 14a is closer to a rectangle, the area ratio of the solid portion is increased, thereby increasing the area of the liquid crystal layer that is directly influenced by the electric field produced by electrodes (the area defined in the plane perpendicular to the substrate normal direction) and thus increasing the effective aperture ratio.

Therefore, the shape of the unit solid portion 14a can be determined in view of the intended orientation stability and the intended transmittance.

When the unit solid portion 14a has a generally square shape with generally arc-shaped corner portions, as illustrated in FIG. 9 and FIG. 10, for example, it is possible to realize a relatively high orientation stability and a relatively high transmittance. Of course, similar effects can be obtained also when the unit solid portion 14a has a generally rectangular shape with generally arc-shaped corner portions. Note that due to limitations on the production process, the corner portion of the unit solid portion 14a formed from a conductive film may not be arc-shaped, strictly speaking, but may instead be an obtuse polygonal shape (a shape made of a plurality of angles exceeding 90°), and the corner portion may have a slightly distorted arc shape (e.g., a portion of an ellipse) or a distorted polygonal shape, instead of a quarter-arc shape or a regular polygonal shape (e.g., a portion of a regular polygon). Alternatively, the corner portion may have a shape that is a combination of curves and obtuse angles. The term "generally arc shape" as used herein may be any of these shapes. Note that due to similar process-related reasons, the shape of the generally-circular unit solid portion 14a as illustrated in FIG. 1A may be a polygonal shape or a distorted shape instead of a strictly circular shape.

In view of the response speed, the unit solid portion 14a may be shaped as in a liquid crystal display device 100F illustrated in FIG. 15. In the liquid crystal display device 100F as illustrated in FIG. 15, the shape of the unit solid portion 14a of the picture element electrode 14 is a distorted square shape with acute angle corner portions. Note that a corner with an acute angle as used herein refers to a corner or a rounded corner having an angle less than 90°.

When the unit solid portion 14a has a shape with acute angle corner portions, as illustrated in FIG. 15, the total length of the edge portion along which an inclined electric field is produced is increased, whereby the inclined electric field can be acted upon more liquid crystal molecules 30a.

Thus, the number of liquid crystal molecules 30a that initially start inclining in response to an electric field is increased, thereby reducing the amount of time required for a radially-inclined orientation to be formed entirely across the picture element region. As a result, the response speed to the application of a voltage across the liquid crystal layer 30 is improved.

Moreover, when the unit solid portion 14a has a shape with acute angle corners, the existence probability of the liquid crystal molecules 30a that are oriented in a particular azimuth angle direction can be increased (or decreased) as compared to a case where the shape of the unit solid portion 14a is a generally circular shape or a generally rectangular shape. In other words, a high directionality can be introduced in the existence probabilities of the liquid crystal molecules 30a oriented in various azimuth angle directions. Therefore, when an acute angle corner is employed in the unit solid portion 14a in a liquid crystal display device having a polarization plate in which linearly-polarized light is incident upon the liquid crystal layer 30, it is possible to decrease the existence probability of the liquid crystal molecules 30a oriented vertical or horizontal to the polarization axis of the polarization plate, i.e., the liquid crystal molecules 30a that do not give a phase difference to the incident light. Thus, it is possible to improve the light transmittance and to realize a brighter display.

The liquid crystal display device of Embodiment 1 as described above may employ the same arrangement as a vertical alignment type liquid crystal display device known in the art, and may be produced by a known production method, except that the picture element electrode 14 includes a plurality of unit solid portions 14a arranged in a line in one of two periodic arrangement directions, in which picture elements are arranged periodically, and except that picture elements that are adjacent to each other in the other periodic arrangement direction are driven with voltages of opposite polarities.

Typically, a vertical alignment film (not shown) as a vertical alignment layer is provided on one side of each of the picture element electrode 14 and the counter electrode 22 that is closer to the liquid crystal layer 30 so as to vertically align the liquid crystal molecules having a negative dielectric anisotropy.

The liquid crystal material may be a nematic liquid crystal material having a negative dielectric anisotropy. A guest-host mode liquid crystal display device can be obtained by adding a dichroic dye to a nematic liquid crystal material having a negative dielectric anisotropy. A guest-host mode liquid crystal display device does not require a polarization plate.

Embodiment 2

The structure of one picture element region of a liquid crystal display device 200 according to Embodiment 2 of the present invention will now be described with reference to FIG. 16A and FIG. 16B. Moreover, in subsequent figures, each element having substantially the same function as the corresponding element in the liquid crystal display device 100 will be denoted by the same reference numeral and will not be further described below. FIG. 16A is a plan view as viewed in the substrate normal direction, and FIG. 16B is a cross-sectional view taken along line 16B-16B' of FIG. 16A. FIG. 16B illustrates a state where no voltage is applied across a liquid crystal layer.

As illustrated in FIG. 16A and FIG. 16B, the liquid crystal display device 200 is different from the liquid crystal display device 100 of Embodiment 1 illustrated in FIG. 1A and FIG. 1B in that a TFT substrate 200*a* includes a protrusion 40 in the open region 15 of the picture element electrode 14. A vertical alignment film (not shown) is provided on the surface of the protrusion 40.

The cross section of the protrusion 40 along the plane of the substrate 11 is a generally star-shaped cross section, i.e., the same shape as that of the open region 15, as illustrated in FIG. 16A. Note that adjacent protrusions 40 are connected to each other so as to completely surround each unit solid portion 14*a* in a generally circular pattern. The cross section of the protrusion 40 along a plane vertical to the substrate 11 is a trapezoidal shape as illustrated in FIG. 16B. Specifically, the cross section has a top surface 40*t* parallel to the substrate plane and a side surface 40*s* inclined by a taper angle θ (<90') with respect to the substrate plane. Since the vertical alignment film (not shown) is provided so as to cover the protrusion 40, the side surface 40*s* of the protrusion 40 has an orientation-regulating force of the same direction as that of an inclined electric field for the liquid crystal molecules 30*a* of the liquid crystal layer 30, thereby functioning to stabilize the radially-inclined orientation.

The function of the protrusion 40 will now be described with reference to FIG. 17A to FIG. 17D, FIG. 18A and FIG. 18B.

First, the relationship between the orientation of the liquid crystal molecules 30*a* and the configuration of the surface having a vertical alignment power will be described with reference to FIG. 17A to FIG. 17D.

Figure 17A:
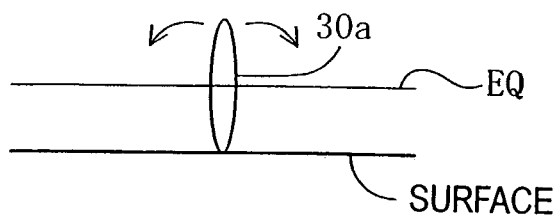

As illustrated in FIG. 17A, a liquid crystal molecule 30*a* on a horizontal surface is aligned vertical to the surface due to the orientation-regulating force of the surface having a vertical alignment power (typically, the surface of a vertical alignment film). When an electric field represented by an equipotential line EQ perpendicular to the axial direction of the liquid crystal molecule 30*a* is applied through the liquid crystal molecule 30*a* in a vertical alignment, a torque urging the liquid crystal molecule 30*a* to incline clockwise and a torque urging the liquid crystal molecule 30*a* to incline counterclockwise act upon the liquid crystal molecule 30*a* with the same probability. Therefore, in the liquid crystal layer 30 between a pair of opposing electrodes in a parallel plate arrangement include some liquid crystal molecules 30*a* that are subject to the clockwise torque and other liquid crystal molecules 30*a* that are subject to the counterclockwise torque. As a result, the transition to the orientation according to the voltage applied across the liquid crystal layer 30 may not proceed smoothly.

Figure 17B:
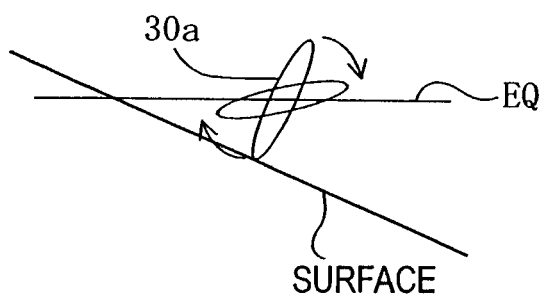
Figure 17C:
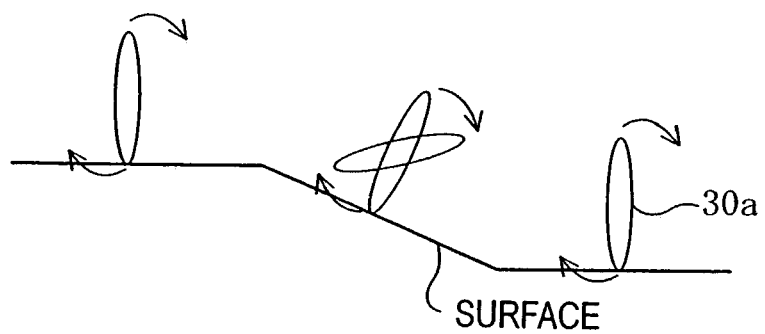

When an electric field represented by a horizontal equipotential line EQ is applied through a liquid crystal molecule 30*a* vertically aligned to an inclined surface, as illustrated in FIG. 17B, the liquid crystal molecule 30*a* inclines in whichever direction (the clockwise direction in the illustrated example) that requires less inclination for the liquid crystal molecule 30*a* to be parallel to the equipotential line EQ. Then, as illustrated in FIG. 17C, other adjacent liquid crystal molecules 30*a* aligned vertical to a horizontal surface incline in the same direction (the clockwise direction) as the liquid crystal molecule 30*a* located on the inclined surface so that the orientation thereof is continuous (in conformity) with the orientation of the liquid crystal molecule 30*a* aligned vertical to the inclined surface.

Figure 17D:
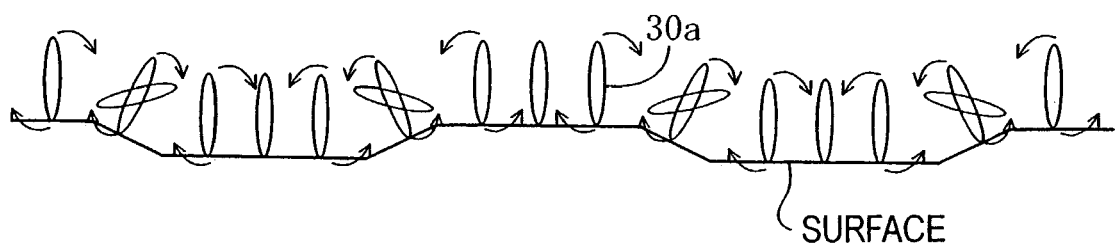

As illustrated in FIG. 17D, for a surface with concave/convex portions whose cross section includes a series of trapezoids, the liquid crystal molecules 30*a* on the top surface and those on the bottom surface are oriented so as to conform with the orientation direction regulated by other liquid crystal molecules 30*a* on the inclined portions of the surface.

In the liquid crystal display device of the present embodiment, the direction of the orientation-regulating force exerted by the configuration (protrusions) of the surface is aligned with the direction of the orientation-regulating force exerted by an inclined electric field, thereby stabilizing the radially-inclined orientation.

FIG. 18A and FIG. 18B each illustrate a state in the presence of an applied voltage across the liquid crystal layer 30 shown in FIG. 16B. FIG. 18A schematically illustrates a state where the orientation of the liquid crystal molecules 30*a* has just started to change (initial ON state) according to the voltage applied across the liquid crystal layer 30. FIG. 18B schematically illustrates a state where the orientation of the liquid crystal molecules 30*a* has changed and become steady according to the applied voltage. In FIG. 18A and FIG. 18B, curves EQ denote equipotential lines.

When the picture element electrode 14 and the counter electrode 22 are at the same potential (i.e., in a state where no voltage is applied across the liquid crystal layer 30), the liquid crystal molecules 30*a* in each picture element region are aligned vertical to the surfaces of the substrates 11 and 21 as illustrated in FIG. 16B. The liquid crystal molecules 30*a* in contact with the vertical alignment film (not shown) on the side surface 40*s* of the protrusion 40 are aligned vertical to the side surface 40*s*, and the liquid crystal molecules 30*a* in the vicinity of the side surface 40*s* take an inclined orientation as illustrated due to the interaction (the nature as an elastic continuum) with the surrounding liquid crystal molecules 30*a*.

When a voltage is applied across the liquid crystal layer 30, a potential gradient represented by equipotential lines EQ shown in FIG. 18A is produced. The equipotential lines EQ are parallel to the surfaces of the solid portion and the counter electrode 22 in a region of the liquid crystal layer 30 located between the solid portion of the picture element electrode 14 and the counter electrode 22, and drop in a region corresponding to the open region 15 of the picture element electrode 14, thereby producing an inclined electric field represented by the inclined portion of the equipotential lines EQ in each region of the liquid crystal layer 30 above an edge portion (the peripheral portion of and within the open region 15 including the boundary thereof) EG of the open region 15.

Due to the inclined electric field, the liquid crystal molecules 30*a* above the right edge portion EG in FIG. 18A incline (rotate) clockwise and the liquid crystal molecules 30*a* above the left edge portion EG incline (rotate) counterclockwise as indicated by arrows in FIG. 18A, as described above, so as to be parallel to the equipotential lines EQ. The direction of the orientation-regulating force exerted by the inclined electric field is the same as that of the orientation-regulating force exerted by the side surface 40*s* located at each edge portion EG.

As described above, the change in the orientation starts from the liquid crystal molecules 30*a* located on the inclined portion of the equipotential lines EQ, and reaches a steady state of the orientation schematically illustrated in FIG. 18B. The liquid crystal molecules 30*a* around the central portion of the open region 15, i.e., around the central portion of the top surface 40*t* of the protrusion 40, are substantially equally influenced by the respective orientations of the liquid crystal molecules 30*a* at the opposing edge portions EG of the open region 15, and therefore retain their orientation perpendicular to the equipotential lines EQ. The liquid crystal molecules 30a away from the center of the open region 15 (the top surface 40t of the protrusion 40) incline by the influence of the orientation of other liquid crystal molecules 30a at the closer edge portion EG, thereby forming an inclined orientation that is symmetric about the center SA of the open region 15 (the top surface 40t of the protrusion 40). An inclined orientation symmetric about the center SA of the unit solid portion 14a is formed also in the region corresponding to the unit solid portion 14a which is substantially surrounded by the open regions 15 and the protrusions 40.

As described above, in the liquid crystal display device 200 of Embodiment 2, as in the liquid crystal display device 100 of Embodiment 1, liquid crystal domains each having a radially-inclined orientation are formed corresponding to the open regions 15 and the unit solid portions 14a. Since the protrusions 40 are provided so as to completely surround each unit solid portion 14a in a generally circular pattern, each liquid crystal domain is formed corresponding to the generally circular region surrounded by the protrusions 40. Moreover, the side surface of the protrusion 40 provided in the open region 15 functions to incline the liquid crystal molecules 30a in the vicinity of the edge portion EG of the open region 15 in the same direction as the direction of the orientation-regulating force exerted by the inclined electric field, thereby stabilizing the radially-inclined orientation.

Of course, the orientation-regulating force exerted by the inclined electric field only acts in the presence of an applied voltage, and the strength thereof depends upon the strength of the electric field (the level of the applied voltage). Therefore, when the electric field strength is small (i.e., when the applied voltage is low), the orientation-regulating force exerted by the inclined electric field is weak, in which case the radially-inclined orientation may collapse due to floating of the liquid crystal material when a stress is applied to the liquid, crystal panel. Once the radially-inclined orientation collapses, it is not restored until application of a voltage sufficient to produce an inclined electric field that exerts a sufficiently strong orientation-regulating force. On the other hand, the orientation-regulating force from the side surface 40s of the protrusion 40 is exerted regardless of the applied voltage, and is very strong as it is known in the art as the "anchoring effect" of the alignment film. Therefore, even when floating of the liquid crystal material occurs and the radially-inclined orientation once collapses, the liquid crystal molecules 30a in the vicinity of the side surface 40s of the protrusion 40 retain the same orientation direction as that of the radially-inclined orientation. Therefore, the radially-inclined orientation is easily restored once the floating of the liquid crystal material stops.

Thus, the liquid crystal display device 200 of Embodiment 2 has an additional advantage of being strong against a stress in addition to the advantages of the liquid crystal display device 100 of Embodiment 1. Therefore, the liquid crystal display device 200 can be suitably used in apparatuses that are often subject to a stress, such as PCs that are often carried around and PDAs.

When the protrusion 40 is made of a dielectric material having a high transparency, there is obtained an advantage of improving the contribution to the display of a liquid crystal domain that is formed in a region corresponding to the open region 15. When the protrusion 40 is made of an opaque dielectric material, there is obtained an advantage that it is possible to prevent light leakage caused by the retardation of the liquid crystal molecules 30a that are in an inclined orientation due to the side surface 40s of the protrusion 40. Whether to employ a transparent dielectric material or an opaque dielectric material can be determined in view of the application of the liquid crystal display device, for example. In either case, the use of a photosensitive resin provides an advantage that the step of patterning the protrusions 40 corresponding to the open regions 15 can be simplified. In order to obtain a sufficient orientation-regulating force, the height of the protrusion 40 is preferably in the range of about 0.5 μm to about 2 μm, when the thickness of the liquid crystal layer 30 is about 3 μm. Typically, the height of the protrusion 40 is preferably in the range of about ⅙ to about ⅔ of the thickness of the liquid crystal layer 30.

As described above, the liquid crystal display device 200 includes the protrusion 40 in the open region 15 of the picture element electrode 14, and the side surface 40s of the protrusion 40 exerts an orientation-regulating force in the same direction as that of the orientation-regulating force exerted by an inclined electric field for the liquid crystal molecules 30a of the liquid crystal layer 30. Preferred conditions for the side surface 40s to exert an orientation-regulating force of the same direction as that of the orientation-regulating force exerted by the inclined electric field will now be described with reference to FIG. 19A to FIG. 19C.

FIG. 19A to FIG. 19C schematically illustrate cross-sectional views of liquid crystal display devices 200A, 200B and 200C, respectively. FIG. 19A to FIG. 19C correspond to FIG. 18A. The liquid crystal display devices 200A, 200B and 200C all have a protrusion in the open region 15, but differ from the liquid crystal display device 200 in terms of the positional relationship between the entire protrusion 40 as a single structure and the corresponding open region 15.

In the liquid crystal display device 200 described above, the entire protrusion 40 as a structure is formed in the open region 15, and the bottom surface of the protrusion 40 is smaller than the open region 15, as illustrated in FIG. 18A. In the liquid crystal display device 200A illustrated in FIG. 19A, the bottom surface of a protrusion 40A is aligned with the open region 15. In the liquid crystal display device 200B illustrated in FIG. 19B, the bottom surface of a protrusion 40B is greater than the open region 15 so as to cover a portion of the solid portion (conductive film) surrounding the open region 15. The solid portion is not formed on the side surface 40s of any of the protrusions 40, 40A and 40B. As a result, the equipotential lines EQ are substantially flat over the solid portion and drop into the open region 15, as illustrated in the respective figures. Therefore, as the protrusion 40 of the liquid crystal display device 200, the side surface 40s of the protrusion 40A of the liquid crystal display device 200A and that of the protrusion 40B of the liquid crystal display device 200B both exert an orientation-regulating force of the same direction as that of the orientation-regulating force exerted by the inclined electric field, thereby stabilizing the radially-inclined orientation.

In contrast, in the liquid crystal display device 200C illustrated in FIG. 19C, the bottom surface of a protrusion 40C is greater than the open region 15, and a portion of the solid portion extending into a region above the open region 15 is formed on the side surface 40s of the protrusion 40C. Due to the influence of the portion of the solid portion formed on the side surface 40s, a ridge portion is created in the equipotential lines EQ. The ridge portion of the equipotential lines EQ has a gradient opposite to that of the other portion of the equipotential lines EQ dropping into the open region 15. This indicates that an inclined electric field has been produced whose direction is opposite to that of an inclined electric field for orienting the liquid crystal molecules 30a into a radially-inclined orientation. Therefore, in order for the side surface 40s to have an orientation-regulating force of the same direction as that of the orientation-regulating force exerted by the inclined electric field, it is preferred that the solid portion (conductive film) is not formed on the side surface 40s.

Next, a cross-sectional structure of the protrusion 40 taken along line 20A-20A' of FIG. 16A will be described with reference to FIG. 20.

Since the protrusions 40 illustrated in FIG. 16A are formed so as to completely surround each unit solid portion 14a in a generally circular pattern, as described above, the portions serving to connect adjacent unit solid portions 14a together (the branch portions extending in four directions from the circular portion) are formed on the protrusion 40 as illustrated in FIG. 20. Therefore, in the step of depositing the conductive film to be the solid portions of the picture element electrode 14, there is a considerable possibility that disconnection may occur on the protrusion 40 or delamination may occur in an after-treatment of the production process.

In view of this, in a liquid crystal display device 200D illustrated in FIG. 21A and FIG. 21B, protrusions 40D independent of one another are formed so that each of the protrusions 40D is completely included within the open region 15 so that the conductive film to be the solid portion is formed on the flat surface of the substrate 11, thereby eliminating the possibility of disconnection or delamination. Although the protrusions 40D do not completely surround each unit solid portion 14a in a generally circular pattern, a generally circular liquid crystal domain corresponding to each unit solid portion 14a is formed, and the radially-inclined orientation of the unit solid portion 14a is stabilized as in the above-described examples.

The effect of stabilizing the radially-inclined orientation, which is obtained by forming the protrusion 40 in the open region 15, is not limited to the pattern of the open region 15 described above, but may similarly be applied to any of the patterns of the open region 15 described in Embodiment 1 to obtain effects as those described above. In order for the protrusion 40 to sufficiently exert the effect of stabilizing the orientation against a stress, it is preferred that the pattern of the protrusion 40 (the pattern as viewed in the substrate normal direction) covers as much area as possible of the liquid crystal layer 30. Therefore, for example, a greater orientation stabilizing effect of the protrusion 40 can be obtained with the positive pattern with circular unit solid portions 14a than with the negative pattern with circular open regions 15.

Embodiment 3

The liquid crystal display device according to Embodiment 3 of the present invention is different from the liquid crystal display device 100 of Embodiment 1 illustrated in FIG. 1A and FIG. 1B in that the counter substrate includes an orientation-regulating structure.

FIG. 22A to FIG. 22E schematically illustrate a counter substrate 300b having an orientation-regulating structure 28. Each element having substantially the same function as that of the liquid crystal display devices described above will be denoted by the same reference numeral and will not be further described.

Figure 22A:
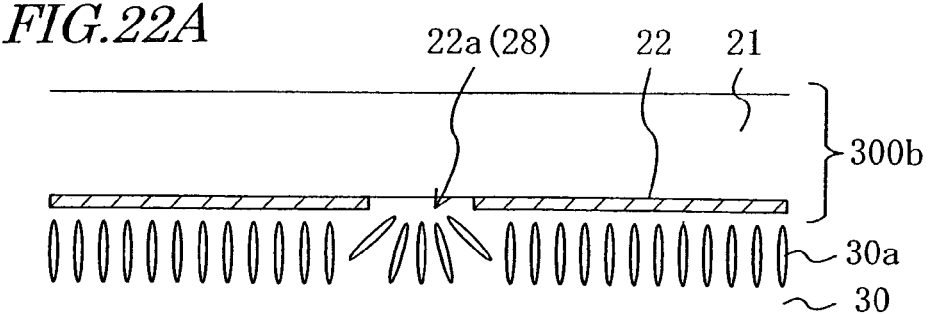
Figure 22B:
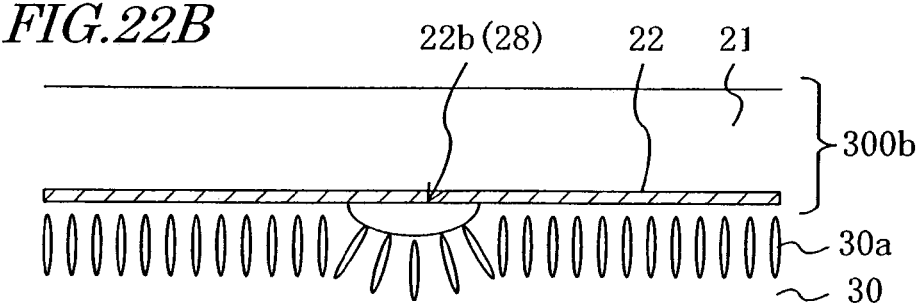
Figure 22C:
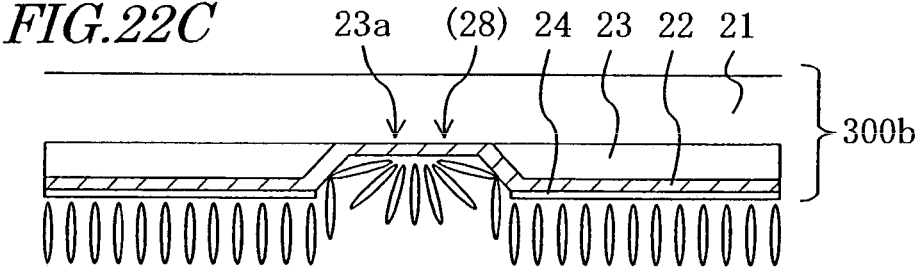
Figure 22D:
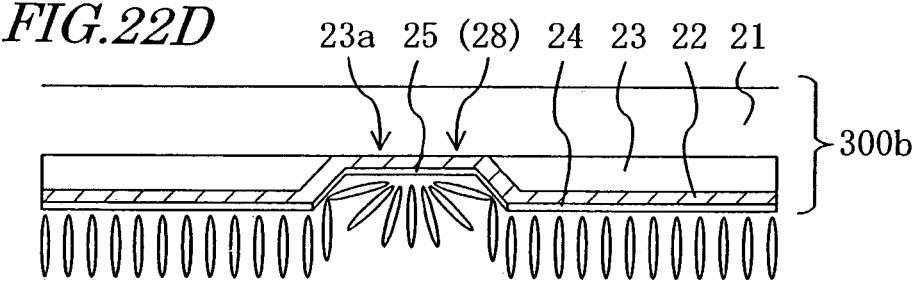
Figure 22E:
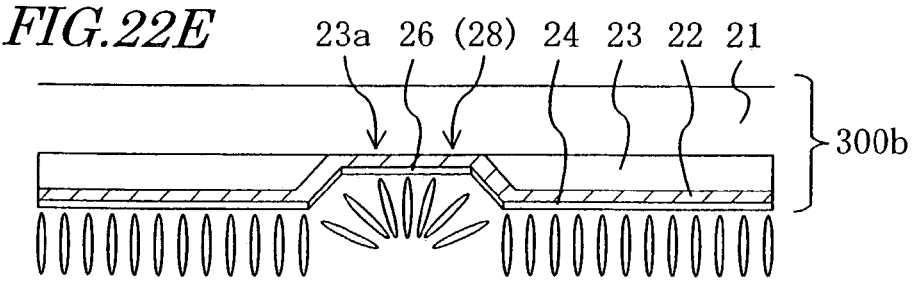

The orientation-regulating structure 28 illustrated in FIG. 22A to FIG. 22E functions to orient the liquid crystal molecules 30a of the liquid crystal layer 30 into a radially-inclined orientation. Note that the orientation-regulating structure 28 illustrated in FIG. 22A to FIG. 22D and that illustrated in FIG. 22E are different in terms of the direction in which the liquid crystal molecules 30a are to be inclined.

The direction in which the liquid crystal molecules are inclined by the orientation-regulating structure 28 illustrated in FIG. 22A to FIG. 22D is aligned with the orientation direction of the radially-inclined orientation of each liquid crystal domain that is formed in a region corresponding to the unit solid portion 14a (see, for example, FIG. 1A and FIG. 1B) of the picture element electrode 14. In contrast, the direction in which the liquid crystal molecules are inclined by the orientation-regulating structure 28 illustrated in FIG. 22E is aligned with the orientation direction of the radially-inclined orientation of each liquid crystal domain that is formed in a region corresponding to the open region 15 (see, for example, FIG. 1A and FIG. 1B) of the picture element electrode 14.

The orientation-regulating structure 28 illustrated in FIG. 22A is formed by an opening 22a of the counter electrode 22 and the unit solid portion 14a of the picture element electrode (not shown in FIG. 22A; see, for example, FIG. 1A) 14 opposing the opening 22a. A vertical alignment film (not shown) is provided on one surface of the counter substrate 300b that is closer to the liquid crystal layer 30.

The orientation-regulating structure 28 exerts an orientation-regulating force only in the presence of an applied voltage. Since the orientation-regulating structure 28 is only required to exert an orientation-regulating force upon the liquid crystal molecules in each liquid crystal domain in a radially-inclined orientation formed by the electrode structure of the TFT substrate 100a, the size of the opening 22a is smaller than the open region 15 provided in the TFT substrate 100a, and smaller than the unit solid portion 14a (see, for example, FIG. 1A) which is surrounded by the open regions 15. For example, a sufficient effect can be obtained only with an area less than or equal to one half of that of the open region 15 or the unit solid portion 14a. When the opening 22a of the counter electrode 22 is provided so as to oppose the central portion of the unit solid portion 14a of the picture element electrode 14, the continuity of the orientation of the liquid crystal molecules increases, and it is possible to fix the position of the central axis of the radially-inclined orientation.

As described above, when a structure exerting an orientation-regulating force only in the presence of an applied voltage is employed as the orientation-regulating structure, substantially all of the liquid crystal molecules 30a of the liquid crystal layer 30 take a vertical alignment in the absence of an applied voltage. Therefore, when employing a normally black mode, substantially no light leakage occurs in a black display, thereby realizing a display with a desirable contrast ratio.

However, in the absence of an applied voltage, the orientation-regulating force is not exerted and thus the radially-inclined orientation is not formed. Moreover, when the applied voltage is low, there is only a weak orientation-regulating force, whereby an after image may be observed when a considerable stress is applied upon the liquid crystal panel.

Each of the orientation-regulating structures 28 illustrated in FIG. 22B to FIG. 22D exerts an orientation-regulating force regardless of the presence/absence of an applied voltage, whereby it is possible to obtain a stable radially-inclined orientation at any display gray level, and there is provided a high resistance to a stress.

First, the orientation-regulating structure 28 illustrated in FIG. 22B includes a protrusion 22b that is provided on the counter electrode 22 so as to protrude into the liquid crystal layer 30. While there is no particular limitation on the material of the protrusion 22b, the protrusion 22b can be easily provided by using a dielectric material such as a resin. A vertical alignment film (not shown) is provided on one surface of the counter substrate 300b that is closer to the liquid crystal layer 30. The protrusion 22b orients the liquid crystal molecules 30a into a radially-inclined orientation by virtue of the configuration of the surface thereof (with a vertical alignment power). It is preferred to use a resin material that deforms by heat, in which case it is possible to easily form the protrusion 22b having a slightly-humped cross section as illustrated in FIG. 22B through a heat treatment after patterning. The protrusion 22b having a slightly-humped cross section with a vertex (e.g., a portion of a sphere) as illustrated in the figure or a conical protrusion provides a desirable effect of fixing the central position of the radially-inclined orientation.

The orientation-regulating structure 28 illustrated in FIG. 22C is provided as a surface having a horizontal alignment power facing the liquid crystal layer 30 that is provided in an opening (or a depressed portion) 23a in a dielectric layer 23 formed under the counter electrode 22 (i.e., on one side of the counter electrode 22 that is closer to the substrate 21). A vertical alignment film 24 is provided so as to cover one side of the counter substrate 300b that is closer to the liquid crystal layer 30 while leaving a region corresponding to the opening 23a uncovered, whereby the surface in the opening 23a functions as a horizontal alignment surface. Alternatively, a horizontal alignment film 25 may be provided only in the opening 23a as illustrated in FIG. 22D.

The horizontal alignment film illustrated in FIG. 22D can be provided by, for example, once providing the vertical alignment film 24 across the entire surface of the counter substrate 300b, and then selectively irradiating a portion of the vertical alignment film 24 in the opening 23a with UV light so as to reduce the vertical alignment power thereof. The horizontal orientation power required for the orientation-regulating structure 28 does not have to be so high that the resulting pretilt angle is as small as that resulting from an alignment film used in a TN type liquid crystal display device. For example, a pretilt angle of 45° or less is sufficient.

As illustrated in FIG. 22C and FIG. 22D, on the horizontal orientation surface in the opening 23a, the liquid crystal molecules 30a are urged to be horizontal with respect to the substrate plane. As a result, the liquid crystal molecules 30a form an orientation that is continuous with the orientation of the surrounding, vertically aligned liquid crystal molecules 30a on the vertical alignment film 24, thereby obtaining a radially-inclined orientation as illustrated in the figure.

A radially-inclined orientation can be obtained only by selectively providing a horizontal orientation surface (e.g., the surface of the electrode, or a horizontal alignment film) on the flat surface of the counter electrode 22 without providing a depressed portion (that is formed by the opening in the dielectric layer 23) on the surface of the counter electrode 22. However, the radially-inclined orientation can be further stabilized by virtue of the surface configuration of the depressed portion.

It is preferred to use a color filter layer or an overcoat layer of a color filter layer as the dielectric layer 23, for example, to form the depressed portion in the surface of the counter substrate 300b that is closer to the liquid crystal layer 30, because it adds nothing to the process. In the structures illustrated in FIG. 22C and FIG. 22D, there is little decrease in light efficiency because there is no region where a voltage is applied across the liquid crystal layer 30 via the protrusion 22b as in the structure illustrated in FIG. 22A.

In the orientation-regulating structure 28 illustrated in FIG. 22E, a depressed portion is formed on one side of the counter substrate 300b that is closer to the liquid crystal layer 30 by using the opening 23a of the dielectric layer 23, as in the orientation-regulating structure 28 illustrated in FIG. 22D, and a horizontal alignment film 26 is formed only in the bottom portion of the depressed portion. Instead of forming the horizontal alignment film 26, the surface of the counter electrode 22 may be exposed as illustrated in FIG. 22C.

A liquid crystal display device 300 having the orientation-regulating structure as described above is shown in FIG. 23A and FIG. 23B. FIG. 23A is a plan view, and FIG. 23B is a cross-sectional view taken along line 23B-23B' of FIG. 23A.

The liquid crystal display device 300 includes the TFT substrate 100a having the picture element electrode 14 including the unit solid portions 14a and the open regions 15, and the counter substrate 300b having the orientation-regulating structure 28. The structure of the TFT substrate 100a is not limited to the structure illustrated herein, but may be any other structure described above. Moreover, while a structure that exerts an orientation-regulating force even in the absence of an applied voltage (FIG. 22B to FIG. 22D and FIG. 22E) will be used as the orientation-regulating structure 28, the orientation-regulating structure 28 illustrated in FIG. 22B to FIG. 22D can be replaced with that illustrated in FIG. 22A.

Among the orientation-regulating structures 28 provided in the counter substrate 300b of the liquid crystal display device 300, the orientation-regulating structure 28 provided around the center of a region opposing the unit solid portion 14a of the picture element electrode 14 is one of those illustrated in FIG. 22B to FIG. 22D, and the orientation-regulating structure 28 provided around the center of a region opposing the open region 15 of the picture element electrode 14 is one illustrated in FIG. 22E.

With such an arrangement, in the presence of an applied voltage across the liquid crystal layer 30, i.e., in the presence of an applied voltage between the picture element electrode 14 and the counter electrode 22, the direction of the radially-inclined orientation formed by the unit solid portion 14a of the picture element electrode 14 is aligned with the direction of the radially-inclined orientation formed by the orientation-regulating structure 28, thereby stabilizing the radially-inclined orientation. This is schematically shown in FIG. 24A to FIG. 24C. FIG. 24A illustrates a state in the absence of an applied voltage, FIG. 24B illustrates a state where the orientation has just started to change (initial ON state) after application of a voltage, and FIG. 24C schematically illustrates a steady state during the voltage application.

As illustrated in FIG. 24A, the orientation-regulating force exerted by the orientation-regulating structure (FIG. 22B to FIG. 22D) 28 acts upon the liquid crystal molecules 30a in the vicinity thereof even in the absence of an applied voltage, thereby forming a radially-inclined orientation.

When voltage application begins, an electric field represented by equipotential lines EQ shown in FIG. 24B is produced (by the electrode structure of the TFT substrate 100a), and a liquid crystal domain in which the liquid crystal molecules 30a are in a radially-inclined orientation is formed in each region corresponding to the open region 15 and each region corresponding to the unit solid portion 14a, and the liquid crystal layer 30 reaches a steady state as illustrated in FIG. 24C. The inclination direction of the liquid crystal molecules 30a in each liquid crystal domain coincides with the direction in which the liquid crystal molecules 30a are inclined by the orientation-regulating force exerted by the orientation-regulating structure 28 that is provided in a corresponding region.

When a stress is applied upon the liquid crystal display device 300 in a steady state, the radially-inclined orientation of the liquid crystal layer 30 once collapses, but upon removal of the stress, the radially-inclined orientation is restored because of the orientation-regulating forces from the unit solid portion 14a and the orientation-regulating structure 28 acting upon the liquid crystal molecules 30a. Therefore, the occurrence of an after image due to a stress is suppressed. When the orientation-regulating force from the orientation-regulating structure 28 is excessively strong, retardation occurs even in the absence of an applied voltage due to the radially-inclined orientation, whereby the display contrast ratio may decrease. However, the orientation-regulating force from the orientation-regulating structure 28 does not have to be strong because it is only required to have an effect of stabilizing a radially-inclined orientation formed by the unit solid portion 14a and fixing the central axis position thereof. Therefore, an orientation-regulating force that would not cause such a degree of retardation as to deteriorate the display quality is sufficient.

For example, when the protrusion 22b illustrated in FIG. 22B is employed, each protrusion 22b may have a diameter of about 15 μm and a height (thickness) of about 1 μm for the unit solid portion 14a having a diameter of about 30 μm to about 35 μm, thereby obtaining a sufficient orientation-regulating force and suppressing the reduction in the contrast ratio due to retardation to a practical level.

FIG. 25A and FIG. 25B illustrate another liquid crystal display device 400 including an orientation-regulating structure.

The liquid crystal display device 400 does not have the orientation-regulating structure in a region opposing the open region 15 of the TFT substrate 100a. Formation of the orientation-regulating structure 28 illustrated in FIG. 22E which should be formed in a region opposing the open region 15 introduces difficulties into the process. Therefore, in view of the productivity, it is preferred to use only one of the orientation-regulating structures 28 illustrated in FIG. 22A to FIG. 22D. Particularly, the orientation-regulating structure 28 illustrated in FIG. 22B is preferred because it can be produced by a simple process.

Even if no orientation-regulating structure is provided in a region corresponding to the open region 15 as in the liquid crystal display device 400, substantially the same radially-inclined orientation as that of the liquid crystal display device 300 is obtained, as schematically illustrated in FIG. 26A to FIG. 26C, and also the stress resistance thereof is at a practical level.

An example of a liquid crystal display device having an orientation-regulating structure is illustrated in FIG. 27A, FIG. 27B and FIG. 27C. FIG. 27A, FIG. 27B and FIG. 27C are cross-sectional views each schematically illustrating a liquid crystal display device 500 having an orientation-regulating structure. FIG. 27A illustrates a state in the absence of an applied voltage, FIG. 27B illustrates a state where the orientation has just started to change (initial ON state) after application of a voltage, and FIG. 27C schematically illustrates a steady state during the voltage application.

The liquid crystal display device 500 includes the protrusion 40 illustrated in FIG. 16B in the open region 15 of the TFT substrate 200a. The liquid crystal display device 500 further includes the protrusion 22b illustrated in FIG. 22B as the orientation-regulating structure 28 provided around the center of a region opposing the unit solid portion 14a of the picture element electrode 14.

In the liquid crystal display device 500, the radially-inclined orientation is stabilized by the orientation-regulating force exerted by the side surface 40s of the protrusion 40 and the orientation-regulating force exerted by the surface of the protrusion 22b. Since the orientation-regulating force exerted by virtue of the surface configuration of the protrusion 40 and the protrusion 22b described above stabilizes the radially-inclined orientation regardless of the applied voltage, the liquid crystal display device 500 has a desirable stress resistance.

In a case where the protrusion 22b protruding from the counter electrode 22 into the liquid crystal layer 30 as illustrated in FIG. 22B is employed as the orientation-regulating structure 28, the thickness of the liquid crystal layer 30 may be defined by the protrusion 22b. In other words, the protrusion 22b may function also as a spacer that controls the cell gap (the thickness of the liquid crystal layer 30).

FIG. 28A and FIG. 28B illustrate a liquid crystal display device 600 having the protrusion 22b that also functions as a spacer. FIG. 28A is a plan view as viewed in the substrate normal direction, and FIG. 28B is a cross-sectional view taken along line 28B-28B' of FIG. 28A.

As illustrated in FIG. 28A and FIG. 28B, in the liquid crystal display device 600, the thickness of the liquid crystal layer 30 is defined by the protrusion 22b provided around the center of a region opposing the unit solid portion 14a of the picture element electrode 14 as the orientation-regulating structure 28. Such an arrangement is advantageous in that it is not necessary to separately provide a spacer for defining the thickness of the liquid crystal layer 30, thereby simplifying the production process.

In the illustrated example, the protrusion 22b has a truncated cone shape as illustrated in FIG. 28B with a side surface 22b1 that is inclined by a taper angle θ less than 90° with respect to the substrate plane of the substrate 21. When the side surface 22b1 is inclined by an angle less than 90° with respect to the substrate plane, the side surface 22b1 of the protrusion 22b has an orientation-regulating force of the same direction as that of the orientation-regulating force exerted by the inclined electric field for the liquid crystal molecules 30a of the liquid crystal layer 30, thereby functioning to stabilize the radially-inclined orientation.

As schematically illustrated in FIG. 29A to FIG. 29C, a radially-inclined orientation can be obtained also with the liquid crystal display device 600 having the protrusion 22b that functions also as a spacer, as with the liquid crystal display devices 300 and 400.

While the protrusion 22b has the side surface 22b1 that is inclined by an angle less than 90° with respect to the substrate plane in the example illustrated in FIG. 28B, the protrusion 22b may alternatively have the side surface 22b1 that is inclined by an angle of 90° or more with respect to the substrate plane. In view of the stability of the radially-inclined orientation, it is preferred that the inclination angle of the side surface 22b1 does not substantially exceed 90°, and it is more preferred that the inclination angle is less than 90°. Even if the inclination angle exceeds 90°, as long as it is close to 90° (as long as it does not substantially exceed 90°), the liquid crystal molecules 30a in the vicinity of the side surface 22b1 of the protrusion 22b are inclined in a direction substantially parallel to the substrate plane and thus take a radially-inclined orientation conforming with the inclination direction of the liquid crystal molecules 30a at the edge portion, with only a slight twist. However, if the inclination angle of the side surface 22b1 of the protrusion 22b substantially exceeds 90° as illustrated in FIG. 30, the side surface 22b1 of the protrusion 22b will have an orientation-regulating force of the opposite direction to the orientation-regulating force exerted by the inclined electric field for the liquid crystal molecules 30a of the liquid crystal layer 30, whereby the radially-inclined orientation may not be stable.

The protrusion 22b that functions also as a spacer is not limited to a protrusion having a truncated cone shape as illustrated in FIG. 28A and FIG. 28B. For example, the protrusion 22b may have a shape as illustrated in FIG. 31 such that the cross section thereof in a plane vertical to the substrate plane is a part of an ellipse (i.e., a shape such as a part of an elliptical sphere). In the protrusion 22b illustrated in FIG. 31, while the inclination angle (taper angle) of the side surface 22b1 with respect to the substrate plane varies along the thickness of the liquid crystal layer 30, the inclination angle of the side surface 22b1 is less than 90° regardless of the position along the thickness of the liquid crystal layer 30. Thus, the protrusion 22b having such a shape may suitably be used as a protrusion for stabilizing a radially-inclined orientation.

The protrusion 22b as described above that is in contact with both the upper and lower substrates (the TFT substrate and the counter substrate) and functions also as a spacer defining the thickness of the liquid crystal layer 30 may be formed either on the upper substrate or on the lower substrate in the process of producing a liquid crystal display device. Regardless of whether it is formed on the upper or lower substrate, the protrusion 22b will be in contact with both substrates, functioning as a spacer and as the orientation-regulating structure, once the upper and lower substrates are attached to each other.

It is not necessary that all of the protrusions 22b provided in regions opposing the unit solid portions 14a function as spacers. By forming some of the protrusions 22b to be lower than the other protrusions 22b that function as spacers, it is possible to suppress the occurrence of light leakage.

FIG. 32, FIG. 33 and FIG. 34 illustrate other liquid crystal display devices 600A, 600B and 600C, respectively, including an orientation-regulating structure. Each of the liquid crystal display devices 600A, 600B and 600C illustrated in FIG. 32, FIG. 33 and FIG. 34 includes the protrusion 22b as an orientation-regulating structure in a region opposing the unit solid portion 14a of the picture element electrode 14.

In the liquid crystal display device 600A illustrated in FIG. 32, each unit solid portion 14a that is located on the storage capacitance line 43 is slightly smaller than the other unit solid portions 14a. In the liquid crystal display device 600B illustrated in FIG. 33, each unit solid portions 14a that is located on the storage capacitance line 43 is slightly larger than the other unit solid portions 14a. The plurality of unit solid portions 14a of the picture element electrode 14 do not need to be of the same size in each picture element region. Since the liquid crystal domain formed in the unit solid portion 14a that is located on an opaque element such as the storage capacitance line 43 does not contribute to the display in a transmission type liquid crystal display device, it is not necessary that a sufficiently stable radially-inclined orientation is formed in the unit solid portion 14a that is located on an opaque element, and such a unit solid portion 14a may have a different shape and/or size from those of the other unit solid portions 14a. For example, in the liquid crystal display device 600C illustrated in FIG. 34, each unit solid portion 14a that is located on the storage capacitance line 43 has a barrel-like shape (a generally rectangular shape with generally arc-shaped corner portions), while the other unit solid portions 14a have a generally star shape.

Although examples where some unit solid portions 14a are located on the storage capacitance line 43 are shown above, it is possible to increase the proportion of the area that contributes to the display with respect to the total area of the picture element region and thus to improve the brightness by employing an arrangement where the region on an opaque element such as the storage capacitance line 43 is occupied by the open regions 15 as much as possible.

Arrangement of Polarization Plate and Phase Plate

A so-called "vertical alignment type liquid crystal display device", including a liquid crystal layer in which liquid crystal molecules having a negative dielectric anisotropy are vertically aligned in the absence of an applied voltage, is capable of displaying an image in various display modes. For example, a vertical alignment type liquid crystal display device may be used in an optical rotation mode or in a display mode that is a combination of an optical rotation mode and a birefringence mode, in addition to a birefringence mode in which an image is displayed by controlling the birefringence of the liquid crystal layer with an electric field. It is possible to obtain a birefringence-mode liquid crystal display device by providing a pair of polarization plates on the outer side (the side away from the liquid crystal layer 30) of the pair of substrates (e.g., the TFT substrate and the counter substrate) of any of the liquid crystal display devices described above. Moreover, a phase difference compensator (typically a phase plate) may be provided as necessary. Furthermore, a liquid crystal display device with a high brightness can be obtained also by using generally circularly-polarized light.

According to the present invention, a liquid crystal domain having a radially-inclined orientation is stably formed with a high degree of continuity. Therefore, it is possible to further improve the display quality of a conventional liquid crystal display device having a wide viewing angle characteristic.

Moreover, in each picture element region, a plurality of unit solid portions are arranged in a line in a first predetermined direction, whereby it is possible to increase the area ratio of the unit solid portions in the picture element region and thus to improve the aperture ratio.

Furthermore, picture elements that are adjacent to each other in a second predetermined direction that is different from the first predetermined direction in which the unit solid portions are arranged are driven with voltages of opposite polarities in each frame. Therefore, it is possible to produce an inclined electric field having a sharp potential gradient between picture elements that are adjacent to each other in the second predetermined direction. Thus, it is possible to form a sufficiently stable radially-inclined orientation even when employing an arrangement with a short inter-electrode distance and a high aperture ratio.

As described above, the present invention provides a liquid crystal display device having a wide viewing angle characteristic, a high display quality and a high aperture ratio and being capable of producing a bright display.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A liquid crystal display device, comprising:
a first substrate;
a second substrate; and
a liquid crystal layer provided between the first substrate and the second substrate, wherein:
a plurality of picture element regions are defined each by a first electrode provided on one side of the first substrate that is closer to the liquid crystal layer and a second electrode provided on the second substrate so as to oppose the first electrode via the liquid crystal layer therebetween;
the first electrode includes, in each of the plurality of picture element regions, a plurality of unit solid portions arranged in a first direction so that for the first electrode the unit solid portions are arranged only in the first direction, whereby the liquid crystal layer takes a substantially vertical alignment in the absence of an applied voltage between the first electrode and the second electrode, and forms a plurality of liquid crystal domains in the plurality of unit solid portions of the first electrode by inclined electric fields produced around the plurality of unit solid portions in response to a voltage applied between the first electrode and the second electrode, each of the plurality of liquid crystal domains taking a radially-inclined orientation;
the plurality of picture element regions are arranged in a matrix pattern including a plurality of rows extending in the second direction different from the first direction and a plurality of columns extending in the first direction;
a polarity of a voltage applied across the liquid crystal layer in a first picture element region among the plurality of picture element regions is different from a polarity of a voltage applied across the liquid crystal layer in a second picture element region among the plurality of picture element regions that belongs to the same row as that of the first picture element region and belongs to a column adjacent to a column to which the first picture element region belongs in each frame;
the first substrate includes a plurality of open regions that do not overlap with the first electrode; and
when a voltage is applied between the first electrode and the second electrode, the liquid crystal layer forms a plurality of additional liquid crystal domains in the plurality of open regions by the inclined electric fields, each of the additional liquid crystal domains taking a radially-inclined orientation.

2. The liquid crystal display device according to claim 1, wherein the plurality of picture element regions each have a shape whose longitudinal direction is defined in the first direction and whose width direction is defined in the second direction.

3. The liquid crystal display device according to claim 1, wherein a polarity of a voltage applied across the liquid crystal layer in a plurality of picture element regions belonging to one column among the plurality of picture element regions is reversed for every n rows (where n is an integer of 1 or more) in each frame.

4. The liquid crystal display device according to claim 1, wherein a polarity of a voltage applied across the liquid crystal layer in the first picture element region is different from a polarity of a voltage applied across the liquid crystal layer in a third picture element region that belongs to the same column as that of the first picture element region and belongs to a row adjacent to a row to which the first picture element region belongs in each frame.

5. The liquid crystal display device according to claim 1, wherein a shape of each of the plurality of unit solid portions has rotational symmetry.

6. The liquid crystal display device according to claim 5, wherein each of the plurality of unit solid portions has a generally circular shape.

7. The liquid crystal display device according to claim 5, wherein each of the plurality of unit solid portions has a generally rectangular shape with generally arc-shaped corner portions.

8. The liquid crystal display device according to claim 5, wherein each of the plurality of unit solid portions has a shape with acute angle corners.

9. The liquid crystal display device according to claim 1, wherein the second substrate includes, in a region corresponding to at least one of the plurality of liquid crystal domains, an orientation-regulating structure that exerts an orientation-regulating force for orienting liquid crystal molecules in the at least one liquid crystal domain into a radially-inclined orientation at least in the presence of an applied voltage.

10. The liquid crystal display device according to claim 9, wherein the orientation-regulating structure is provided in a region in the vicinity of a center of the at least one liquid crystal domain.

11. The liquid crystal display device according to claim 9, wherein the orientation-regulating structure exerts an orientation-regulating force for orienting the liquid crystal molecules into a radially-inclined orientation even in the absence of an applied voltage.

12. The liquid crystal display device according to claim 11, wherein the orientation-regulating structure is a first protrusion protruding from the second substrate into the liquid crystal layer.

13. The liquid crystal display device according to claim 12, wherein a thickness of the liquid crystal layer is defined by the first protrusion protruding from the second substrate into the liquid crystal layer.

14. The liquid crystal display device according to claim 1, wherein a shape of each of the at least some of the plurality of open regions has rotational symmetry.

15. A liquid crystal display device, comprising:
a first substrate;
a second substrate; and
a liquid crystal layer provided between the first substrate and the second substrate, wherein:
a plurality of picture element regions are defined each by a first electrode provided on one side of the first substrate that is closer to the liquid crystal layer and a second electrode provided on the second substrate so as to oppose the first electrode via the liquid crystal layer therebetween;
the first electrode includes, in each of the plurality of picture element regions, a plurality of unit solid portions arranged only in a first direction, whereby the liquid crystal layer takes a substantially vertical alignment in the absence of an applied voltage between the first electrode and the second electrode, and forms a plurality of liquid crystal domains in the plurality of unit solid portions of the first electrode by inclined electric fields produced around the plurality of unit solid portions in response to a voltage applied between the first electrode and the second electrode, each of the plurality of liquid crystal domains taking a radially-inclined orientation;

the plurality of picture element regions are arranged in a matrix pattern including a plurality of rows extending in the second direction different from the first direction and a plurality of columns extending in the first direction;

a polarity of a voltage applied across the liquid crystal layer in a first picture element region among the plurality of picture element regions is different from a polarity of a voltage applied across the liquid crystal layer in a second picture element region among the plurality of picture element regions that belongs to the same row as that of the first picture element region and belongs to a column adjacent to a column to which the first picture element region belongs in each frame;

the first substrate includes a plurality of open regions that do not overlap with the first electrode;

when a voltage is applied between the first electrode and the second electrode, the liquid crystal layer forms a plurality of additional liquid crystal domains in the plurality of open regions by the inclined electric fields, each of the additional liquid crystal domains taking a radially-inclined orientation;

a second protrusion within each of the plurality of open regions of the first substrate, wherein a side surface of the protrusion exerts, for liquid crystal molecules of the liquid crystal layer, an orientation-regulating force of the same direction as a direction of orientation regulation by the inclined electric field.

16. The liquid crystal display device according to claim 15, wherein each of the at least some of the plurality of open regions has a generally circular shape.

17. The liquid crystal display device according to claim 1, wherein:

the first substrate further comprises a plurality of switching elements provided respectively for the plurality of picture element regions; and the first electrode comprises a plurality of picture element electrodes provided respectively for the plurality of picture element regions and switched respectively by the switching elements, and the second electrode is at least one counter electrode opposing the plurality of picture element electrodes.

18. The liquid crystal display device of claim 1, wherein at least one protrusion extends all the way across the liquid crystal layer and contacts each of the first and second substrates.

* * * * *